United States Patent
Kali et al.

(10) Patent No.: US 9,494,972 B2
(45) Date of Patent: *Nov. 15, 2016

(54) DISPLAYS AND INFORMATION INPUT DEVICES

(75) Inventors: Eran Kali, Jerusalem (IL); Sarah Michelle Lipman, Jerusalem (IL); (Continued)

(73) Assignee: Power2B, Inc., Santa Monica, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 12/066,238

(22) PCT Filed: Sep. 7, 2006

(86) PCT No.: PCT/IL2006/001047
§ 371 (c)(1),
(2), (4) Date: Sep. 3, 2008

(87) PCT Pub. No.: WO2007/029257
PCT Pub. Date: Mar. 15, 2007

(65) Prior Publication Data
US 2009/0021488 A1  Jan. 22, 2009

Related U.S. Application Data

(60) Provisional application No. 60/715,546, filed on Sep. 8, 2005, provisional application No. 60/734,027, filed on Nov. 3, 2005.

(51) Int. Cl.
*G06F 3/046* (2006.01)
*G06F 1/16* (2006.01)
(Continued)

(52) U.S. Cl.
CPC ............. *G06F 1/1626* (2013.01); *G06F 1/169* (2013.01); *G06F 1/1637* (2013.01);
(Continued)

(58) Field of Classification Search
CPC ................. G06F 3/0428; G06F 3/0386; G06F 3/042; G06F 3/03542
(Continued)

(56) References Cited

U.S. PATENT DOCUMENTS 4,320,292 A  3/1982  Oikawa et al.
4,703,316 A  10/1987  Sherbeck
(Continued)

FOREIGN PATENT DOCUMENTS

EP  0 509 589 A2  10/1992
EP  0572182  12/1993
(Continued)

OTHER PUBLICATIONS

EPO Search Report, EP Oct. 14, 2010, Arranz, Jose.
(Continued)

*Primary Examiner* — Premal Patel
(74) *Attorney, Agent, or Firm* — Adam P. Daniels; Polsinelli LLP

(57) ABSTRACT

An integrated display and input device including a first pixel array operative to provide a visually sensible output, a second pixel array operative to sense at least a position of an object with respect to the first pixel array and circuitry receiving an output from the second pixel array and providing a non-imagewise input to utilization circuitry.

10 Claims, 25 Drawing Sheets

(75) Inventors: Boris Gutin, Jerusalem (IL); Moti Margalit, Zichron Yaacov (IL)

(51) Int. Cl.
*G06F 3/0354* (2013.01)
*G06F 3/038* (2013.01)
*G06F 3/042* (2006.01)

(52) U.S. Cl.
CPC ......... *G06F 3/0386* (2013.01); *G06F 3/03542* (2013.01); *G06F 3/042* (2013.01); *G06F 3/0428* (2013.01)

(58) Field of Classification Search
USPC .......................................... 345/173–176, 87
See application file for complete search history.

(56) References Cited

U.S. PATENT DOCUMENTS

| | | | |
|---|---|---|---|
| 4,949,079 | A | 8/1990 | Loebner |
| 5,122,656 | A | 6/1992 | Williams et al. |
| 5,227,985 | A | 7/1993 | DeMenthon |
| 5,448,261 | A | 9/1995 | Koike et al. |
| 5,506,605 | A | 4/1996 | Paley |
| 5,793,361 | A | 8/1998 | Kahn et al. |
| 5,892,501 | A | 4/1999 | Kim et al. |
| 5,926,168 | A | 7/1999 | Fan |
| 5,949,402 | A | 9/1999 | Garwin et al. |
| 5,959,617 | A | 9/1999 | Bird et al. |
| 6,028,649 | A | 2/2000 | Faris et al. |
| 6,081,255 | A | 6/2000 | Narabu et al. |
| 6,094,188 | A | 7/2000 | Horton et al. |
| 6,172,667 | B1* | 1/2001 | Sayag ........................... 345/175 |
| 6,184,863 | B1 | 2/2001 | Sibert et al. |
| 6,897,854 | B2 | 5/2005 | Cho et al. |
| 7,034,866 | B1 | 4/2006 | Colmenarez et al. |
| 2001/0031067 | A1 | 10/2001 | Kennedy et al. |
| 2001/0050672 | A1 | 12/2001 | Kobayashi |
| 2002/0075243 | A1* | 6/2002 | Newton ........................ 345/173 |
| 2003/0034439 | A1* | 2/2003 | Reime et al. ................. 250/221 |
| 2004/0012565 | A1 | 1/2004 | Cok |
| 2004/0174324 | A1* | 9/2004 | Yamazaki et al. ............... 345/76 |
| 2004/0252091 | A1 | 12/2004 | Ma et al. |
| 2004/0263483 | A1* | 12/2004 | Aufderheide ................. 345/173 |
| 2005/0110781 | A1 | 5/2005 | Geaghan |
| 2005/0128190 | A1 | 6/2005 | Ryynanen |
| 2005/0156914 | A1 | 7/2005 | Lipman et al. |
| 2006/0007222 | A1 | 1/2006 | Uy |
| 2006/0044283 | A1 | 3/2006 | Eri et al. |
| 2006/0132463 | A1 | 6/2006 | Lee et al. |

FOREIGN PATENT DOCUMENTS

| | | |
|---|---|---|
| GB | 2289756 | 11/1995 |
| GB | 2299856 | 10/1996 |
| JP | 08-050526 | 2/1996 |
| KR | 1997-006406 | 10/1989 |
| WO | 9502801 | 1/1995 |
| WO | 0243045 | 5/2002 |
| WO | WO 03/104965 | 12/2003 |
| WO | WO-2005094176 | 10/2005 |

OTHER PUBLICATIONS

JPO Office Action, JP Sep. 28, 2010, Tomoya, Hatori.
U.S. Appl. No. 60/715,546, filed Sep. 8, 2005.
U.S. Appl. No. 60/734,027, filed Nov. 3, 2005.
U.S. Appl. No. 60/789,188, filed Apr. 3, 2006.
U.S. Appl. No. 60/682,604, filed May 18, 2005.
European Patent Application No. 06 780 474.0; EPO Communication pursuant to Article 94(3) EPC, Examination Report, dated Oct. 25, 2011.
Applicant's 4 May 2012 Response to EP Official Communication Pursuant to Article 94(3) EPC dated Oct. 25, 2011.
Jun. 4, 2012 EPO Summons to Attend Oral Proceedings.
EPO Examining Division, "Minutes of Oral Proceeding," Nov. 23, 2012, from counterpart EPO patent application No. 06780474.0, pp. 1-22.
KIPO Notice of Preliminary Rejection dated Mar. 12, 2014, from Korean Application No. 10-2013-7033913, which priority is based on U.S. Appl. No. 12/066,238; Korean associate English translation.

* cited by examiner

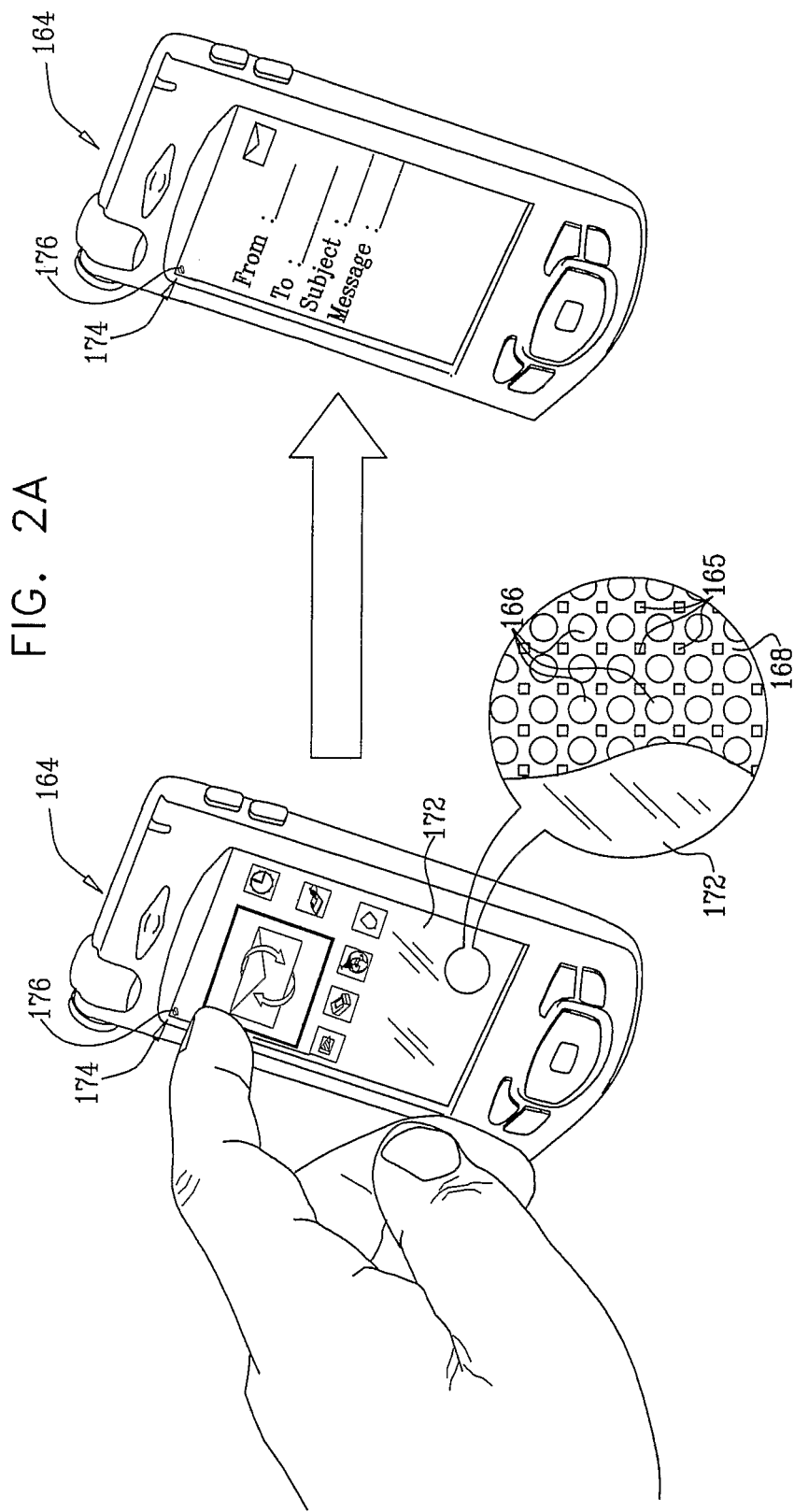

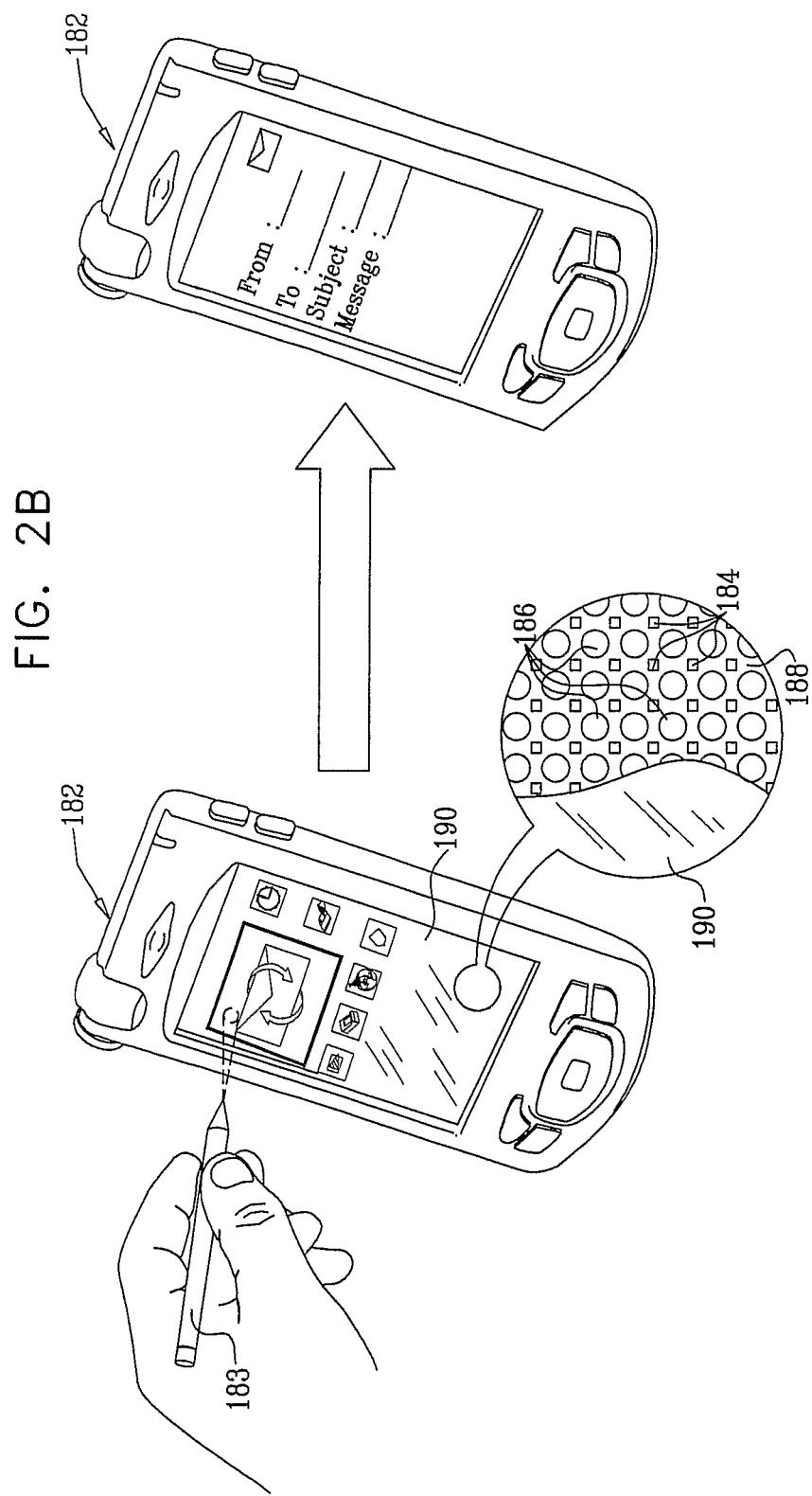

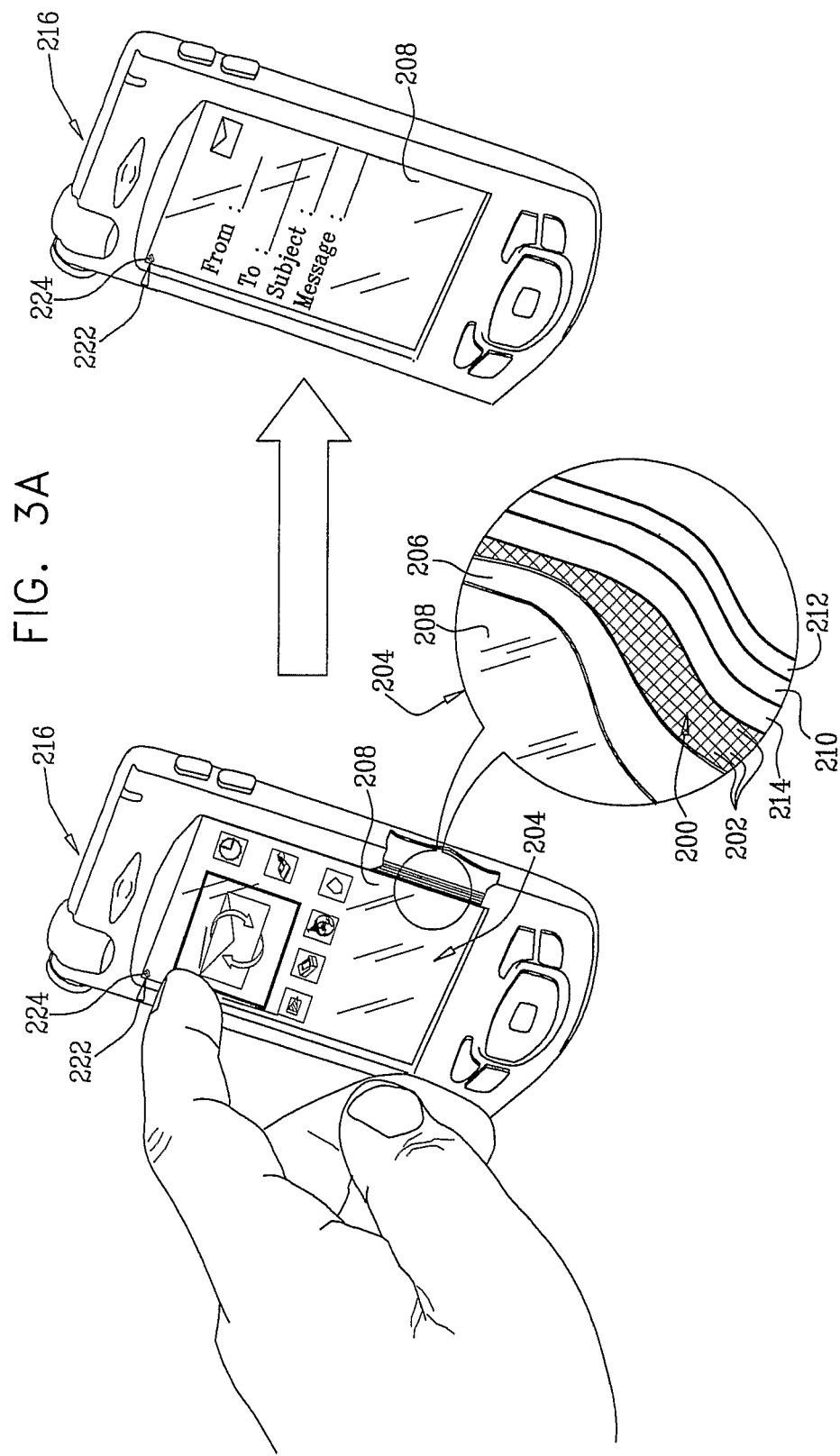

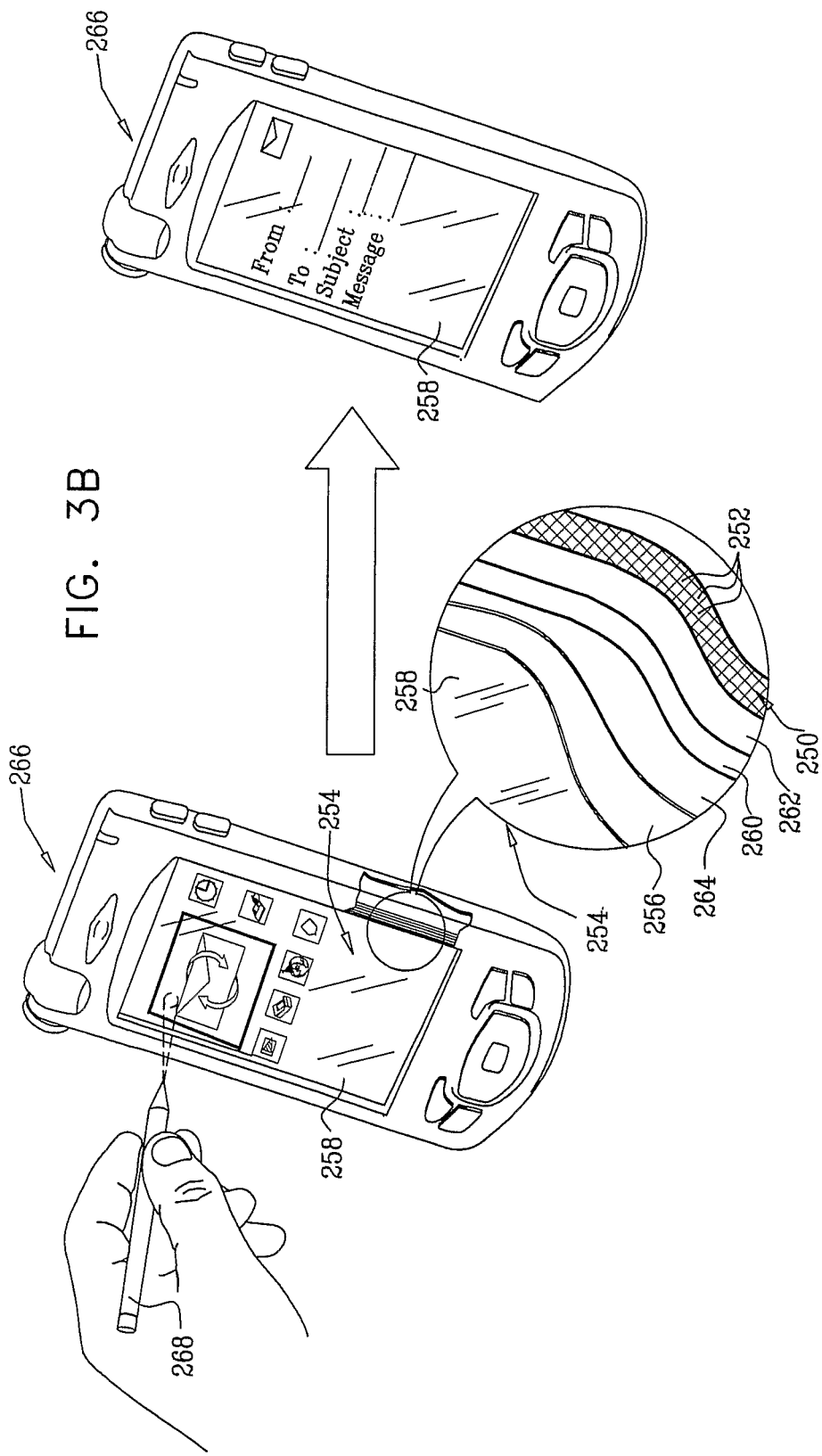

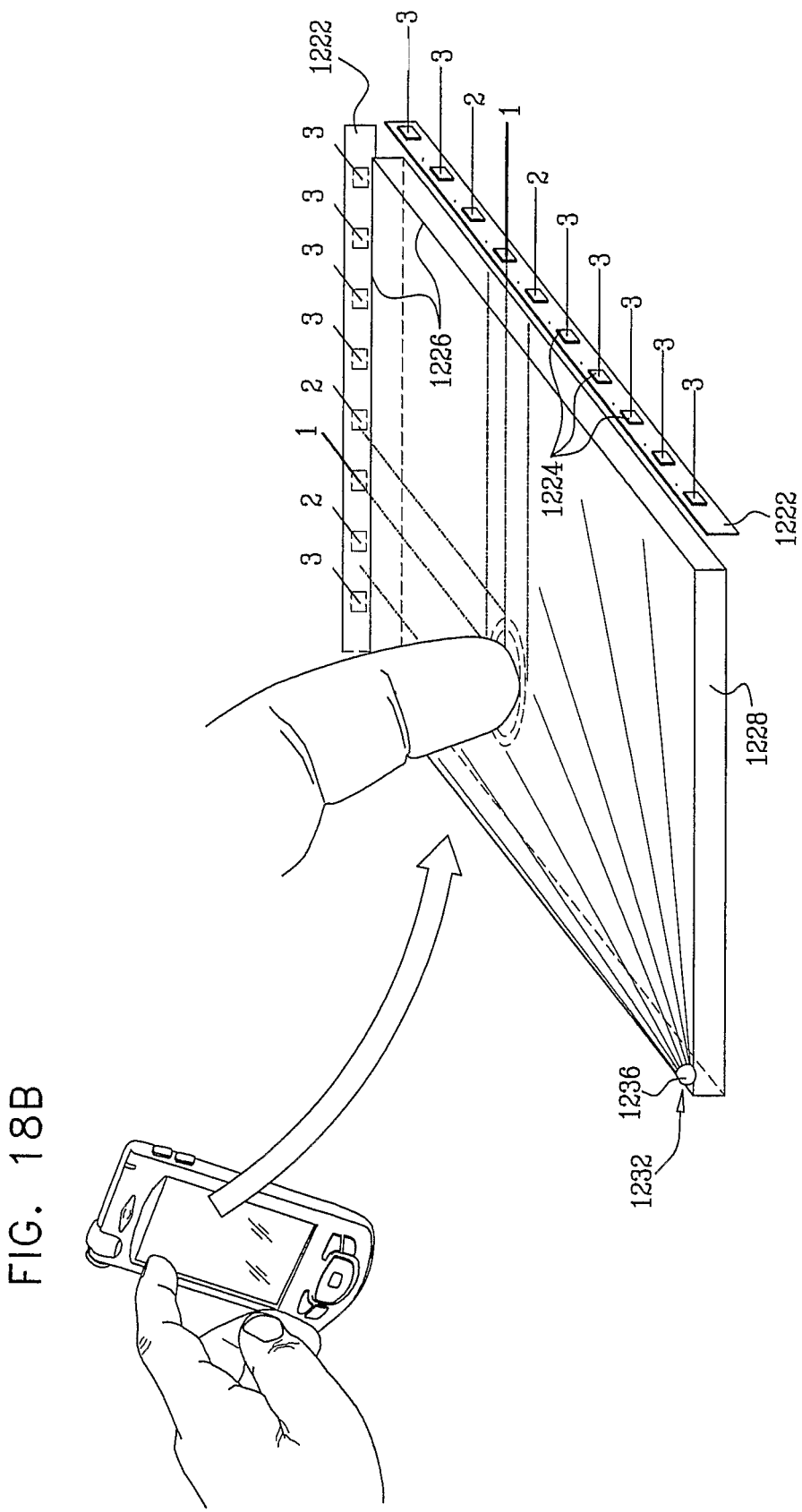

DISPLAYS AND INFORMATION INPUT DEVICES

CROSS-REFERENCE TO RELATED APPLICATIONS

This application is a 371 National Phase of International Application No. PCT/IL/2006/001047 which claims priority to U.S. Provisional Patent Application No. 60/715,549 filed Sep. 8, 2005, and entitled OPTICAL SENSOR FOR MEASURMENT OF LIGHT SCATTERING and to U.S. Provisional Patent Application No. 60/734,027 filed Nov. 3, 2005, and entitled CONTROL APPARATUS, the disclosures of which are hereby incorporated by reference and priority of which is hereby claimed pursuant to 37 CFR 1.78(a)(4) and (5)(i).

The present application is also related to U.S. Provisional Patent Application No. 60/789,188, U.S. Provisional Patent Application No. 60/682,604, U.S. Patent Application Publication No. 2005/0156914A1 and to PCT Application Publication No. WO 2005/094176, the disclosures of which are hereby incorporated by reference.

FIELD OF THE INVENTION

The present invention relates to displays and information input devices.

BACKGROUND OF THE INVENTION

The following published patent documents, the disclosures of which are hereby incorporated by reference, are believed to represent the current state of the art:

Great Britain Patent Numbers: GB2299856 and GB2289756;

European Patent Number: EP0572182;

PCT Patent Application Publication Numbers: WO02/043045 and WO95/02801; and

U.S. Pat. Nos. 6,094,188; 6,081,255; 5,926,168; 5,892,501; 5,448,261; 5,227,985; 5,949,402; 5,959,617; 5,122,656; 5,506,605 and 4,320,292.

SUMMARY THE INVENTION

The present invention seeks to provide an integrated display and input device.

There is thus provided in accordance with a preferred embodiment of the present invention an integrated display and input device including a first pixel array operative to provide a visually sensible output, a second pixel array operative to sense at least a position of an object with respect to the first pixel array and circuitry receiving an output from the second pixel array and providing a non-imagewise input to utilization circuitry.

In accordance with a preferred embodiment of the present invention the integrated display and input device also includes utilization circuitry providing one or more of portable communicator functionality, interactive television functionality and portable computer functionality. Preferably, the second pixel array includes a plurality of detector elements arranged in a plane parallel to a viewing plane. Additionally or alternatively, the second pixel array is coplanar with the first pixel array.

In accordance with another preferred embodiment of the present invention the first and second pixel arrays include a plurality of elements arranged in parallel planes, parallel to a viewing plane. Preferably, the second pixel array includes a detector assembly arranged at least one edge of a viewing plane defining plate. Additionally, the detector assembly is arranged about the at least one edge of the viewing plane defining plate. Alternatively, the detector assembly is arranged along the at least one edge of the viewing plane defining plate.

In accordance with yet another preferred embodiment of the present invention the detector assembly includes a support substrate and an arrangement of detector elements. Preferably the detector assembly also includes a cover layer. Additionally or alternatively, the support substrate is integrated with a housing of the integrated display and input device.

In accordance with still another preferred embodiment of the present invention the arrangement of detector elements includes a plurality of discrete single-element detectors. Alternatively, the arrangement of detector elements includes an integrally formed multi-element detector array. As a further alternative, the arrangement of detector elements includes a plurality of discrete multi-element detectors.

In accordance with a further preferred embodiment of the present invention the cover layer is formed of a light transmissive material. Alternatively, the cover layer includes a mask having apertures defined therein. As a further alternative the cover layer includes a field-of-view defining mask having light-collimating tunnel-defining apertures. As yet a further alternative the cover layer includes lenses.

In accordance with yet a further preferred embodiment of the present invention the at least one edge includes a mask having apertures defined therein. Alternatively, the at least one edge includes a field-of-view defining mask having light-collimating tunnel-defining apertures. As a further alternative the at least one edge includes lenses. Preferably, the second pixel array includes a plurality of generally forward-facing detectors arranged about edges of a display element.

In accordance with still another preferred embodiment of the present invention at least one detector in the arrangement detects electromagnetic radiation at a baseline level and senses the position of the object with respect to the first pixel array and the circuitry provides the non-imagewise input according to location of at least one detector in the arrangement for which at least one of the amount of radiation detected and the change in the amount of radiation detected exceed a first predetermined threshold.

In accordance with an additional preferred embodiment of the present invention the change in the amount of radiation detected results from at least one detector in the arrangement detecting reflected light from the object in addition to detecting the radiation at the baseline level. Preferably, the reflected light propagates within the viewing plane defining plate to at least one detector in the arrangement. Alternatively, the reflected light propagates above the viewing plane defining plate to at least one detector in the arrangement. As a further alternative, the reflected light is transmitted through the viewing plane defining plate directly to at least one detector in the arrangement.

In accordance with another preferred embodiment of the present invention the at least one detector in the arrangement detects radiation at the baseline level, senses the position of the object with respect to the first pixel array and the circuitry provides the non-imagewise input according to location of at least one detector in the arrangement at which the amount of radiation detected is below a second predetermined threshold.

In accordance with yet another preferred embodiment of the present invention the integrated display and input device also includes a processing subassembly including detector analyzing processing circuitry operative to receive detector outputs of individual detectors in the arrangement, to determine at least one of whether the amount of radiation detected by the individual detectors exceeds the first predetermined threshold, whether the change in the amount of radiation detected by the individual detectors exceeds the first predetermined threshold and whether the amount of radiation detected by the individual detectors is below the second predetermined threshold, and to provide detector analysis outputs for the individual detectors, array processing circuitry operative to receive the detector analysis outputs of individual detectors in the arrangement and to generate an array detection output therefrom and position determining circuitry operative to receive the array detection output of the arrangement and to determine the position of the object therefrom.

In accordance with still another preferred embodiment of the present invention the array detection output includes information corresponding to the location of an impingement point of the object on the viewing plane defining plate. Additionally or alternatively, the array detection output includes information corresponding to the location of the object relative to the viewing plane defining plate.

In accordance with a further preferred embodiment of the present invention the radiation at the baseline level is provided by at least one source of illumination external to the integrated display and input device. Preferably the at least one source of illumination includes at least one of sunlight, artificial room lighting and IR illumination emitted from a human body. Additionally, the integrated display and input device also includes an illumination subassembly operative to provide illumination for augmenting the radiation at the baseline level. Alternatively, the integrated display and input device also includes an illumination subassembly operative to provide the radiation at the baseline level.

In accordance with yet a further preferred embodiment of the present invention the illumination subassembly includes at least one electromagnetic radiation emitting source. Preferably, the at least one electromagnetic radiation emitting source includes at least one of at least one IR emitting LED and at least one visible light emitting LED.

In accordance with another preferred embodiment of the present invention the at least one electromagnetic radiation emitting source is disposed at an intersection of two mutually perpendicular edges of the viewing plane defining plate. Alternatively, the at least one electromagnetic radiation emitting source forms part of a linear arrangement of display backlights underlying the viewing plane defining plate.

In accordance with yet another preferred embodiment of the present invention the illumination subassembly includes at least one generally linear arrangement of a plurality of electromagnetic radiation emitting sources arranged in parallel to at least one edge of the viewing plane defining plate. Alternatively, at least one of the at least one generally linear arrangement is arranged behind the second pixel array.

There is also provided in accordance with another preferred embodiment of the present invention a detector assembly including an array of discrete photodiode detectors arranged in mutually spaced relationship in a plane and field-of-view limiting functionality associated with the array of discrete photodiode detectors.

There is further provided in accordance with a further preferred embodiment of the present invention a position sensing assembly including a detector subassembly including an array of discrete photodiode detectors arranged in mutually spaced relationship in a plane and field-of-view limiting functionality associated with the array of discrete photodiode detectors, and a position sensing subassembly operative to receive outputs from the array of discrete photodiode detectors and to provide an output indication of position of an object from which light is received by the array of discrete photodiode detectors.

In accordance with a preferred embodiment of the present invention the array of discrete photodiode detectors includes a one-dimensional linear array. Additionally or alternatively, the field-of-view limiting functionality limits the field-of-view of at least one of the discrete photodiode detectors to a solid angle of less than or equal to 15 degrees. Preferably, the field-of-view limiting functionality limits the field-of-view of at least one of the discrete photodiode detectors to a solid angle of less than or equal to 7 degrees.

In accordance with another preferred embodiment of the present invention the field-of-view limiting functionality includes an apertured mask having a thickness of less than approximately 200 microns. Alternatively, the field-of-view limiting functionality includes an apertured mask having a thickness of less than 500 microns. As a further alternative, the field-of-view limiting functionality includes an array of microlenses aligned with the array of discrete photodiode detectors.

There is also provided in accordance with an additional preferred embodiment of the present invention a position sensing assembly including a plate defining a surface and at least one pixel array including a plurality of detector elements detecting electromagnetic radiation at a baseline level, the at least one pixel array being operative to sense a position of an object with respect to the surface according to locations of ones of the plurality of detector elements at which at least one of the amount of radiation detected and the change in the amount of radiation detected exceed a predetermined threshold.

In accordance with a preferred embodiment of the present invention the change in the amount of radiation detected results from ones of the plurality of detector elements detecting reflected light from the object in addition to detecting the radiation at the baseline level. Preferably, the reflected light propagates within the plate to ones of the plurality of detector elements. Alternatively, the reflected light propagates above the surface to ones of the plurality of detector elements. As a further alternative, the reflected light is transmitted through the plate directly to at least one of the plurality of detector elements.

In accordance with another preferred embodiment of the present invention the position sensing assembly also includes a processing subassembly including detector analyzing processing circuitry operative to receive detector outputs of individual ones of the plurality of detector elements, to determine whether at least one of the amount of radiation and the change in the amount of radiation detected by the individual ones of the plurality detector element exceeds the predetermined threshold, and to provide detector analysis outputs for the individual ones of the plurality of detector elements, array processing circuitry operative to receive the detector analysis outputs of the plurality of detector elements of a single one of the at least one pixel array and to generate an array detection output therefrom and position determining circuitry operative to receive the array detection output of the at least one pixel array and to determine the position of the object therefrom.

In accordance with yet another preferred embodiment of the present invention the array detection output includes information corresponding to the location of an impingement point of the object on the surface. Preferably, the array detection output includes information corresponding to the location of the object relative to the surface. Additionally or alternatively, the position of the object includes at least one of a two-dimensional position of the object, a three-dimensional position of the object and angular orientation of the object.

In accordance with still another preferred embodiment of the present invention the radiation at the baseline level is provided by at least one source of radiation external to the position sensing assembly. Preferably the at least one source of radiation includes at least one of sunlight, artificial room lighting and IR illumination emitted from a human body. Additionally, the position sensing assembly also includes an illumination subassembly operative to provide illumination for augmenting the radiation at the baseline level. Alternatively, the position sensing assembly also includes an illumination subassembly operative to provide the radiation at the baseline level to the plurality of detector elements.

In accordance with a further preferred embodiment of the present invention the illumination subassembly includes at least one electromagnetic radiation emitting source. Preferably the at least one electromagnetic radiation emitting source includes at least one of at least one IR emitting LED and at least one visible light emitting LED.

In accordance with yet a further preferred embodiment of the present invention the at least one pixel array includes at least two pixel arrays arranged at mutually perpendicular edges of the plate. Preferably, the illumination subassembly includes an electromagnetic radiation emitting source disposed at an intersection of two of the at least two pixel arrays. Alternatively, the illumination subassembly includes an electromagnetic radiation emitting source disposed at an intersection of two mutually perpendicular edges of the plate, and across from an intersection point of the two of the at least two pixel arrays. As a further alternative, the illumination subassembly includes at least one electromagnetic radiation emitting source forming part of a linear arrangement of display backlights underlying the plate, which are preferably IR emitting LEDs. As yet a further alternative, the illumination subassembly includes at least one generally linear arrangement of a plurality of electromagnetic radiation emitting sources arranged in parallel to at least one edge of the plate, preferably arranged such that at least one of the at least one generally linear arrangement is arranged behind at least one of the at least two pixel arrays.

In accordance with still a further preferred embodiment of the present invention the at least one pixel array is arranged in a plane parallel to the surface. Preferably, the illumination subassembly includes at least one generally linear arrangement of a plurality of electromagnetic radiation emitting sources arranged in parallel to at least one edge of the plate. Alternatively, the illumination subassembly includes an electromagnetic radiation emitting source disposed at an intersection of two mutually perpendicular edges of the plate.

In accordance with another preferred embodiment of the present invention the at least one pixel array includes a single pixel array arranged along an edge of the plate. Preferably, the illumination subassembly includes an electromagnetic radiation emitting source disposed at an intersection of edges of the plate. Alternatively, the illumination subassembly includes at least one electromagnetic radiation emitting source forming part of a linear arrangement of display backlights underlying the plate, arranged such that the at least one electromagnetic radiation emitting source includes an IR emitting LED. As a further alternative the illumination subassembly includes at least one generally linear arrangement of a plurality of electromagnetic radiation emitting sources arranged in parallel to at least one edge of the plate, arranged such that at least one of the at least one generally linear arrangement is arranged behind the single pixel array.

It is to be appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-4D, and along edges as in the embodiments shown in FIGS. 4-7, 8A-8D, 12A-12D and 13A-13D.

BRIEF DESCRIPTION OF THE DRAWINGS

The present invention will be more fully understood and appreciated from the following detailed description, taken in conjunction with the drawings in which:

FIGS. 2A and 2B are simplified illustrations of portions of two types of integrated display and input devices constructed and operative in accordance with another preferred embodiment of the present invention, including detectors arranged in a plane parallel to a viewing plane;

FIGS. 3A and 3B are simplified illustrations of portions of two types of integrated display and input devices constructed and operative in accordance with yet another preferred embodiment of the present invention, employing elements arranged in parallel planes, parallel to a viewing plane;

FIGS. 18A, 18B, 18C, 18D, 18E and 18F are simplified illustrations of six alternative embodiments of an illumination subassembly forming part of an integrated display and input device constructed and operative in accordance with a preferred embodiment of the present invention.

DETAILED DESCRIPTION OF PREFERRED EMBODIMENTS

Reference is now made to FIGS. 1A, 1B, 1C and 1D, which are simplified illustrations of four types of integrated display and input devices constructed and operative in accordance with a preferred embodiment of the present invention.

Figure 1A:
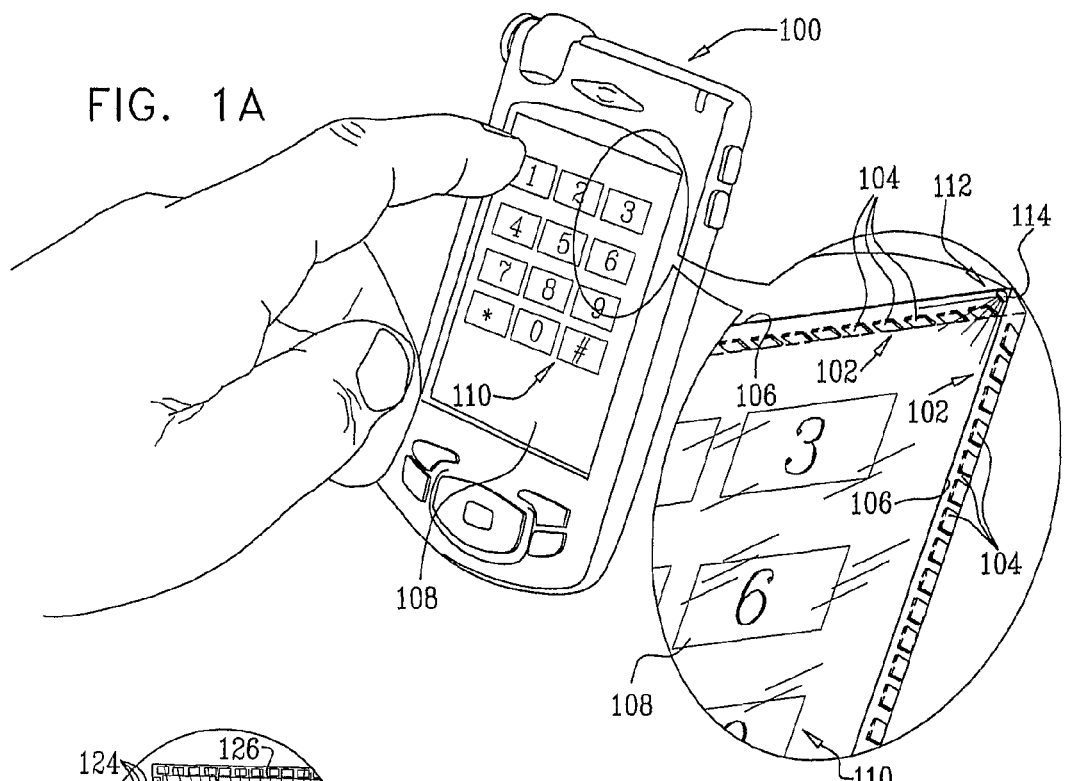
FIGS. 1A, 1B, 1C and 1D are simplified illustrations of four types of integrated display and input devices constructed and operative in accordance with a preferred embodiment of the present invention.

FIG. 1A illustrates a mobile telephone 100 having a touch responsive input functionality employing light reflection in accordance with a preferred embodiment of the present invention. As seen in FIG. 1A, arrays 102 of light detector elements 104 are arranged along at least two mutually perpendicular edge surfaces 106 of a viewing plane defining plate 108 overlying a keyboard template display 110. Suitable detector elements are, for example, Solderable Silicon Photodiodes commercially available from Advanced Photonix Incorporated of Camarillo, Calif., USA under catalog designator PDB-C601-1. Arrays 102 may be provided along all or most of edge surfaces 106. Alternatively, a single array 102 may be provided along only one edge surface 106 of plate 108. Viewing plane defining plate 108 may be a single or multiple layer plate and may have one or more coating layers associated therewith.

Light, preferably including light in the IR band, is reflected from a user's finger, a stylus (not shown) or any other suitable reflective object, touching or located in propinquity to plate 108. The light is propagated within plate 108 and is detected by detector elements 104. The source of the reflected light is preferably external to the mobile telephone 100, for example as shown in FIG. 19. Suitable external light sources include sunlight, artificial room lighting and IR illumination emitted from a human body or other heat source. In an alternate preferred embodiment, the source of the reflected light may comprise an illumination subassembly 112 which typically includes one or more electromagnetic radiation emitting sources, here shown as a single IR emitting LED 114. The illumination subassembly 112 preferably forms part of the integrated display and input device. Examples of various suitable configurations of illumination subassembly 112 are described hereinbelow in FIGS. 18A-18F. Optionally, the light emitted by LED 114 may be modulated by modulating circuitry (not shown).

Figure 1B:
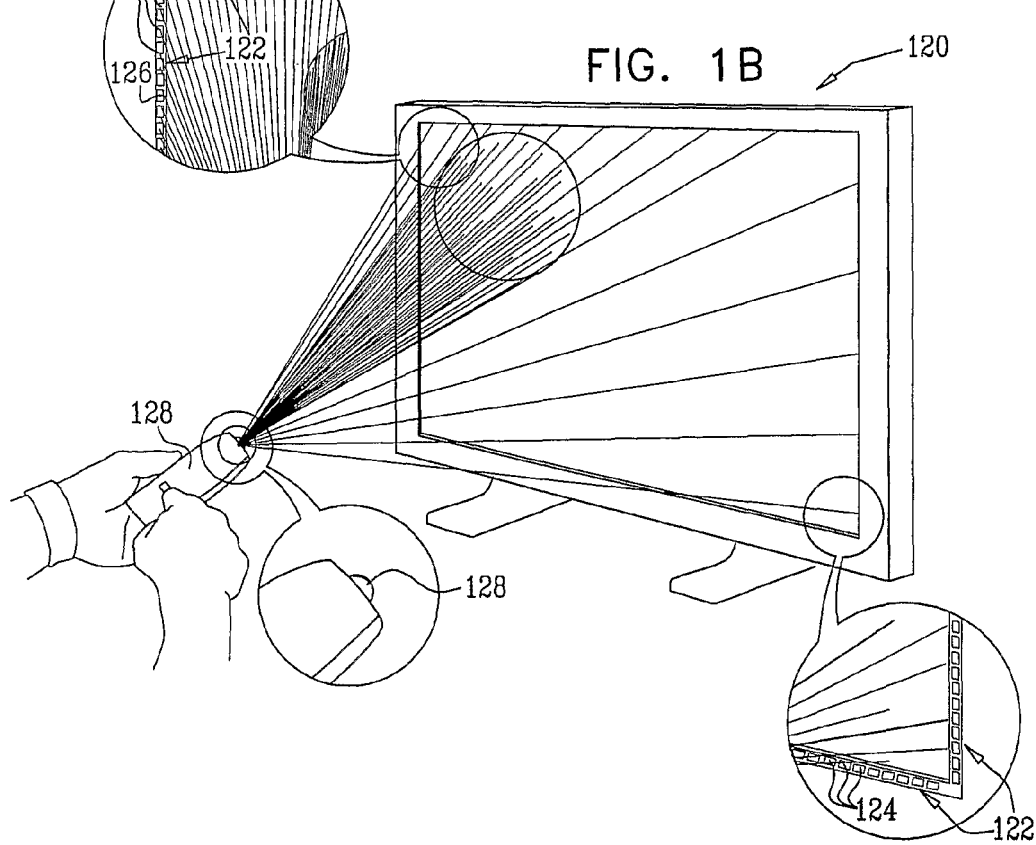

FIG. 1B illustrates a large screen display 120, such as a television display, having a light beam responsive input functionality operative in accordance with a preferred embodiment of the present invention. As seen in FIG. 1B, arrays 122 of generally forward-looking light detector elements 124 are arranged generally along at least two mutually perpendicular edges 126 of display 120. Arrays 122 may be provided along all or most of edges 126. Alternatively, a single array 122 may be provided along only one edge 126 of display 120. Light, preferably including light in the IR band emitted by a light beam emitter 128, is detected directly by one or more of detector elements 124.

Figure 1C:
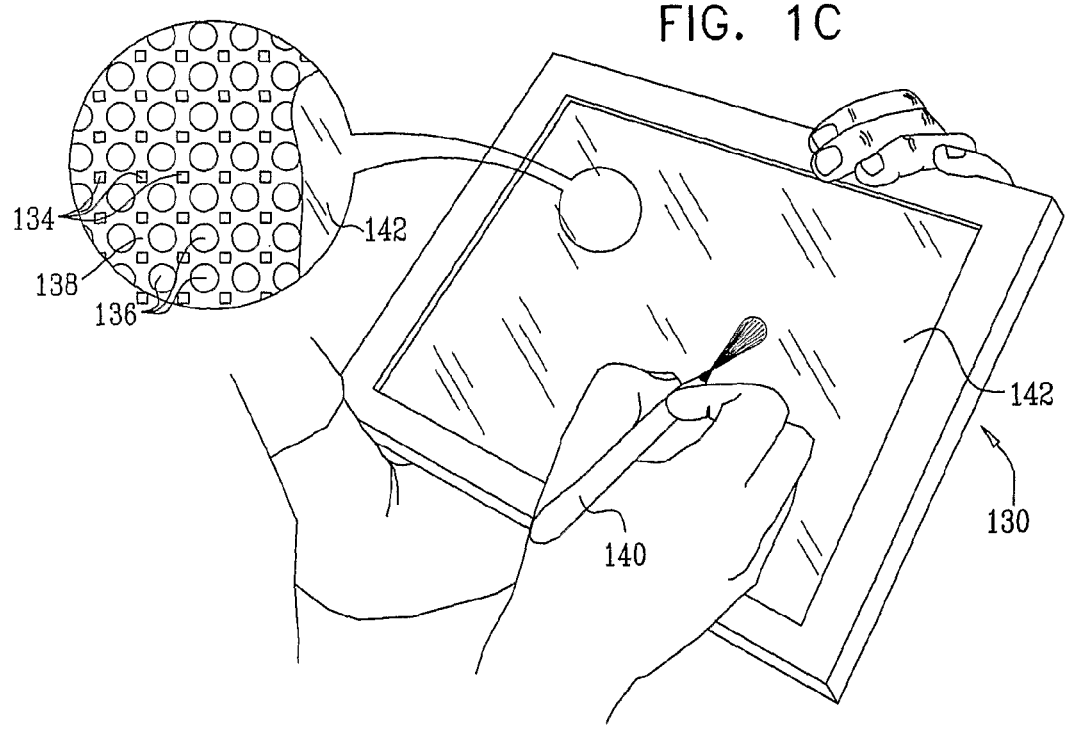

FIG. 1C illustrates a tablet computer 130 having a light beam responsive input functionality operative in accordance with a preferred embodiment of the present invention. As seen in FIG. 1C, a multiplicity of light detector elements 134 are interspersed among light emitters 136 arranged in a plane 138. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference. Light, preferably including light in the IR band, emitted by a light beam emitter 140, propagates through at least one cover layer 142 and is detected by one or more of detector elements 134.

Figure 1D:
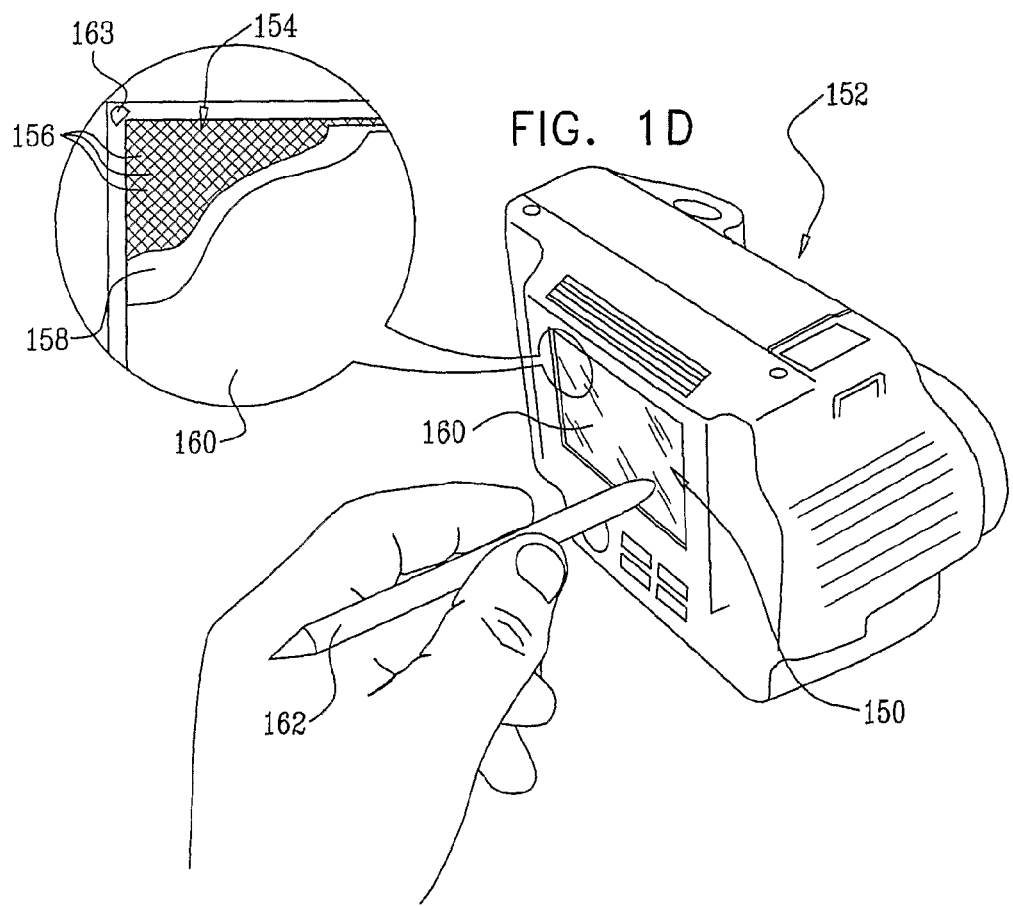

FIG. 1D illustrates a display 150 of a digital camera 152 having a touch responsive input functionality employing light reflection in accordance with a preferred embodiment of the present invention. As seen in FIG. 1D, an array 154 of light detector elements 156 is arranged behind an IR transmissive display panel 158, such as an LCD or OLED, underlying a viewing plane defining plate 160. Viewing plane defining plate 160 may be a single or multiple layer plate and may have one or more coating layers associated therewith. The array 154 of light detector elements 156 may be formed of a plurality of discrete detector arrays mounted on a substrate or integrally formed therewith. Alternatively, the array 154 may be formed of one or more CCD or CMOS arrays, or may created by photolithography.

Light, preferably including light in the IR band, is reflected from a stylus 162, a user's finger (not shown) or any other suitable reflective object, touching or located in propinquity to plate 160. The light propagates through plate 160 and panel 158 and is detected by detector elements 156.

The source of the reflected light is preferably external to the digital camera 152, for example as shown in FIG. 19. Suitable external light sources include sunlight, artificial room lighting and IR illumination emitted from a human body or other heat source. In an alternate preferred embodiment, the source of the reflected light may comprise an illumination subassembly which typically includes one or more electromagnetic radiation emitting sources, here shown as a single IR emitting LED 163. The illumination subassembly preferably forms part of the integrated display and input device. Examples of various suitable configurations of the illumination subassembly are described hereinbelow in FIGS. 18A-18F. Optionally, the light emitted by LED 163 may be modulated by modulating circuitry (not shown).

Reference is now made to FIGS. 2A and 2B, which are simplified illustrations of portions of two types of integrated display and input devices constructed and operative in accordance with another preferred embodiment of the present invention. FIG. 2A shows an integrated display and input device having touch responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIG. 2A illustrates launching an application, such as an e-mail application, on a mobile telephone 164, by employing object detection functionality of the type described hereinabove with reference to FIG. 1C. As shown, a position of a user's finger is detected by means of a touch responsive input functionality operative in accordance with a preferred embodiment of the present invention.

As seen in FIG. 2A, a multiplicity of light detector elements 165 are interspersed among light emitters 166 arranged in a plane 168. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference. Light, preferably including light in the IR band, reflected by the user's finger, propagates through at least one cover layer 172 and is detected by one or more of detector elements 165. The outputs of detector elements 165 are processed to indicate one or more of the X, Y, or Z positions and/or angular orientation of the user's finger. This detected position is utilized, as taught inter alia in the aforesaid U.S. Provisional Patent Application No. 60/789,188, to launch an application or control any of the other functionalities described in U.S. Provisional Patent Application No. 60/789,188.

The source of the reflected light is preferably external to the mobile telephone 164, for example as shown in FIG. 19. Suitable external light sources include sunlight, artificial room lighting and IR illumination emitted from a human body or other heat source. In an alternate preferred embodiment, the source of the reflected light may comprise an illumination subassembly 174 which typically includes one or more electromagnetic radiation emitting sources, here shown as a single IR emitting LED 176. The illumination subassembly 174 preferably forms part of the integrated display and input device. Examples of various suitable configurations of illumination subassembly 174 are described hereinbelow in FIGS. 18A-18F. Optionally, the light emitted by LED 176 may be modulated by modulating circuitry (not shown).

FIG. 2B shows an integrated display and input device having light beam impingement responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIG. 2B illustrates launching an application, such as an e-mail application, on a mobile telephone 182, by employing object detection functionality of the type described hereinabove with reference to FIG. 1C. A position of a stylus 183 is detected by means of a light beam responsive input functionality operative in accordance with a preferred embodiment of the present invention. As seen in FIG. 2B, a multiplicity of light detector elements 184 are interspersed among light emitters 186 arranged in a plane 188. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference. Light, preferably including light in the IR band, emitted by stylus 183, propagates through at least one cover layer 190 and is detected by one or more of detector elements 184. The outputs of detector elements 184 are processed to indicate one or more of the X, Y or Z positions and/or angular orientation of the stylus 183. This detected position is utilized, as taught inter alia in the aforesaid U.S. Provisional Patent Application No. 60/789,188, to launch an application or control any of the other functionalities described in U.S. Provisional Patent Application No. 60/789,188.

Reference is now made to FIGS. 3A and 3B, which are simplified illustrations of portions of two types of integrated display and input devices constructed and operative in accordance with yet another preferred embodiment of the present invention, employing elements arranged in parallel planes, parallel to a viewing plane.

FIG. 3A shows an integrated display and input system having touch responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

The touch responsive functionality preferably employs an integrated display and input system including an array 200 of detector elements 202 arranged in a plane, parallel to a viewing plane 204. In accordance with a preferred embodiment of the present invention the array 200 is formed of a plurality of discrete detector elements 204 placed on a plane integrally formed therewith. Alternatively, the array 154 may be formed of one or more CCD or CMOS arrays, or may created by photolithography.

As seen in FIG. 3A, in one example of a display and input system structure, array 200 is arranged behind an IR transmissive display panel 206, such as a panel including LCD or OLED elements, underlying a viewing plane defining plate 208. Viewing plane defining plate 208 may be a single or multiple layer plate and may have one or more coating layers associated therewith. In one example of an integrated display and input system employing an LCD, there are provided one or more light diffusing layers 210 overlying a reflector 212. One or more collimating layers 214 are typically interposed between reflector 212 and IR transmissive display panel 206.

FIG. 3A illustrates launching an application, such as an e-mail application, on a mobile telephone 216, by employing object detection functionality of the type described hereinabove with reference to FIG. 1D. As shown, a position of a user's finger is detected by means of a touch responsive input functionality operative in accordance with a preferred embodiment of the present invention. Light, preferably including light in the IR band, reflected by the user's finger, propagates through plate 208 and panel 206 and is detected by detector elements 202. The outputs of detector elements 202 are processed to indicate one or more of the X, Y or Z positions and/or angular orientation of the user's finger. This detected position is utilized, as taught inter alia in the aforesaid U.S. Provisional Patent Application No. 60/789,188, to launch an application or control any of the other functionalities described in U.S. Provisional Patent Application No. 60/789,188.

The source of the reflected light is preferably external to the mobile telephone 216, for example as shown in FIG. 19. Suitable external light sources include sunlight, artificial room lighting and IR illumination emitted from a human body or other heat source. In an alternate preferred embodiment, the source of the reflected light may comprise an illumination subassembly 222 which typically includes one or more electromagnetic radiation emitting sources, here shown as a single IR emitting LED 224. The illumination subassembly 222 preferably forms part of the integrated display and input device. Examples of various suitable configurations of illumination subassembly 222 are described hereinbelow in FIGS. 18A-18F. Optionally, the light emitted by LED 224 may be modulated by modulating circuitry (not shown).

FIG. 3B shows an integrated display and input device having light beam impingement responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

The light beam impingement responsive functionality preferably employs an integrated display and input system including an array 250 of detector elements 252 arranged in a plane, parallel to a viewing plane 254. In accordance with a preferred embodiment of the present invention the array 250 is formed of a plurality of discrete detector elements 252 placed on a plane integrally formed therewith. Alternatively, the array 250 may be formed of one or more CCD or CMOS arrays, or may be created by photolithography.

As seen in FIG. 3B, array 250 is arranged behind an IR transmissive display panel 256, such as a panel including LCD or OLED elements, underlying a viewing plane defining plate 258. Viewing plane defining plate 258 may be a single or multiple layer plate and may have one or more coating layers associated therewith. In another example of an integrated display and input device employing an LCD, interposed between array 250 and IR transmissive display panel 256, there are provided one or more light diffusing layers 260 overlying an IR transmissive reflector 262. One or more collimating layers 264 are typically interposed between IR transmissive reflector 262 and IR transmissive display panel 256.

FIG. 3B illustrates launching an application, such as an e-mail application on a mobile telephone 266, by employing object detection functionality of the type described hereinabove with reference to FIG. 1D. A position of a stylus 268 is detected by means of a light beam responsive input functionality operative in accordance with a preferred embodiment of the present invention. Light, preferably including light in the IR band, emitted by stylus 268, propagates through plate 258, panel 256, one or more of layers 264 and layers 260 and through IR transmissive reflector 262, and is detected by one or more of detector elements 252. The outputs of detector elements 252 are processed to indicate one or more of the X, Y or Z positions and/or angular orientation of the stylus 268. This detected position is utilized, as taught inter alia in the aforesaid U.S. Provisional Patent Application No. 60/789,188, to launch an application or control any of the other functionalities described in U.S. Provisional Patent Application No. 60/789,188.

Figure 4:
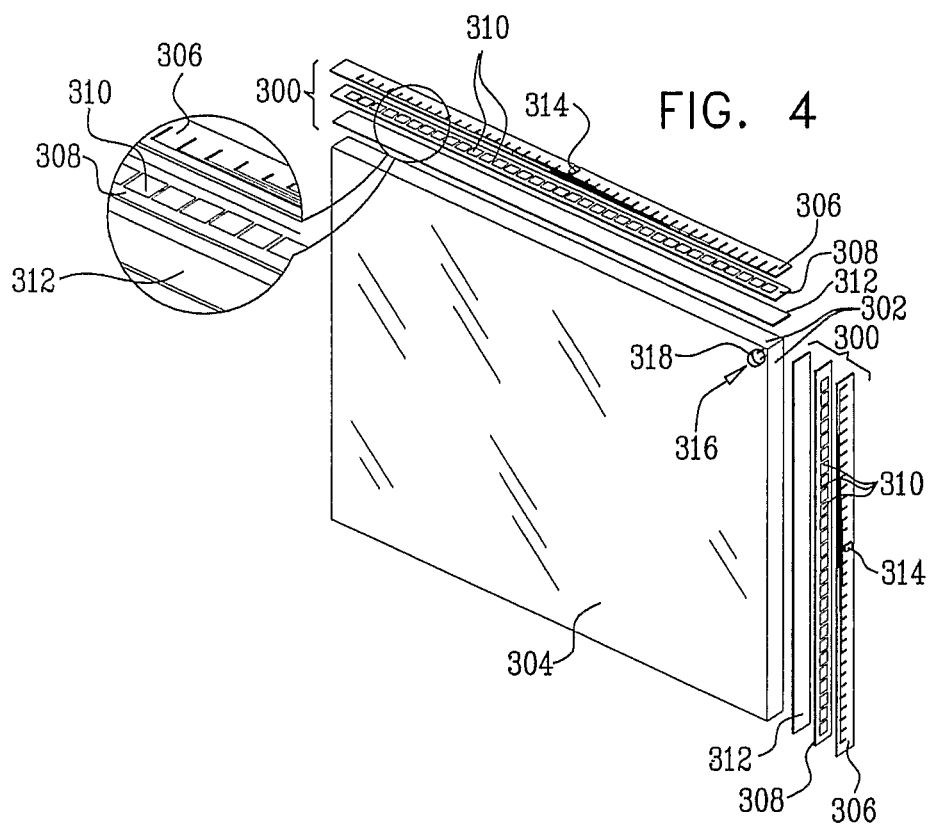
FIG. 4 is a simplified illustration of a portion of an input device constructed and operative in accordance with still another preferred embodiment of the present invention, employing detectors arranged along edges of a display element.

Reference is now made to FIG. 4, which is a simplified illustration of a portion of an input device constructed and operative in accordance with still another preferred embodiment of the present invention, employing detector elements arranged along edges of a display element. In the structure of FIG. 4, at least one detector assembly 300 is arranged along at least one edge 302 of a viewing plane defining plate 304 to sense light impinging on plate 304 and propagating within the plate to the edges 302 thereof. Viewing plane defining plate 304 may be a single or multiple layer plate and may have one or more coating layers associated therewith. Preferably, detector assemblies 300 are provided along at least two mutually perpendicular edges 302, as shown, though detector assemblies 300 may be provided along all or most of edges 302. Alternatively a single detector assembly 300 may be provided along only one edge 302 of plate 304.

In accordance with a preferred embodiment of the present invention, the detector assembly 300 comprises a support substrate 306 onto which is mounted a linear arrangement 308 of detector elements 310. Interposed between linear arrangement 308 and edge 302 is a cover layer 312. Cover layer 312 may have multiple functions including physical protection, light intensity limitation, and field-of-view limitation and may have optical power. Cover layer 312 may be formed of glass or any other suitable light transparent material, or of a suitably apertured opaque material, such as metal.

The support substrate 306 may be mounted onto a display housing (not shown) or may be integrally formed therewith. The support substrate 306 may alternatively be mounted onto an edge 302 of plate 304. The support substrate 306 may be formed of a ceramic material, a material such as FR-4 which is commonly used for PCBs, glass, plastic or a metal such as aluminum. The support substrate may also provide mounting for and electrical connections to the detector elements 310. A processor 314 for processing the outputs of the detector elements 310 may also be mounted on the support substrate 306.

It is a particular feature of this embodiment of the present invention that the detector assembly 300 is extremely thin, preferably under 1 mm overall. Accordingly, the support substrate 306 is preferably 50-200 microns in thickness, the linear arrangement 308 of detector elements 310 is preferably 100-400 microns in thickness and the cover layer 312 is preferably 100-500 microns in thickness.

The input device shown in FIG. 4 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 316 which typically includes one or more electromagnetic radiation emitting sources, here shown as a single IR emitting LED 318. The illumination subassembly 316 preferably forms part of the integrated display and input device. Examples of various suitable configurations of illumination subassembly 316 are described hereinbelow in FIGS. 18A-18F. Optionally, the light emitted by LED 318 may be modulated by modulating circuitry (not shown).

Figure 5:
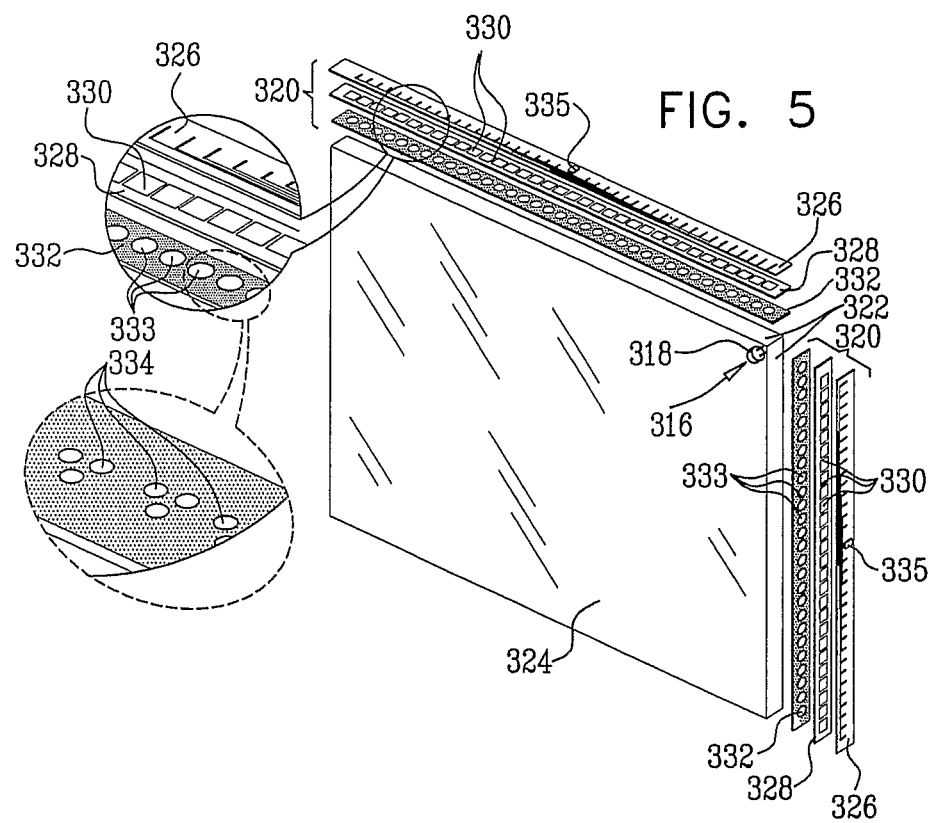
FIG. 5 is a simplified illustration of a portion of an input device constructed and operative in accordance with a further preferred embodiment of the present invention, employing detectors arranged along edges of a display element.

Reference is now made to FIG. 5, which is a simplified illustration of a portion of an input device constructed and operative in accordance with a further preferred embodiment of the present invention, employing detector elements arranged along edges of a display element. In the structure of FIG. 5, at least one detector assembly 320 is arranged along at least one edge 322 of a viewing plane defining plate 324 to sense light impinging on plate 324 and propagating within the plate to the edges 322 thereof. Viewing plane defining plate 324 may be a single or multiple layer plate and may have one or more coating layers associated therewith. Preferably, detector assemblies 320 are provided along at least two mutually perpendicular edges 322, as shown, though detector assemblies 320 may be provided along all or most of edges 322. Alternatively a single detector assembly 320 may be provided along only one edge 322 of plate 324.

In accordance with a preferred embodiment of the present invention, the detector assembly 320 comprises a support substrate 326 onto which is mounted a linear arrangement 328 of detector elements 330. Interposed between linear arrangement 328 and edge 322 is a cover layer 332. In the illustrated embodiment, cover layer 332 is a field-of-view defining mask having apertures 333 formed therein, in sizes and arrangements which provide desired fields-of-view for the various corresponding detector elements 330. Depending on the thickness of layer 332, each detector element 330 may have associated therewith a single aperture 333 or a plurality of smaller apertures, here designated by reference numeral 334. The selection of aperture size and distribution is determined in part by the mechanical strength of layer 332. Layer 332 may have multiple functions including physical protection, field-of-view limitation and light intensity limitation, and may have optical power.

Field-of-view limiting functionality may be desirable in this context because it enhances position discrimination by limiting overlap between the fields-of-view of adjacent detector elements 330. Extent of field-of-view limiting may be controlled by the size, pitch and arrangement of apertures 333 and their locations with respect to and distances from detector elements 330. In accordance with a preferred embodiment, the field-of-view limiting functionality limits the field-of-view of at least one of detector elements 330 to a solid angle of less than or equal to 15 degrees. In accordance with another preferred embodiment, the field-of-view limiting functionality limits the field-of-view of at least one of detector elements 330 to a solid angle of less than or equal to 7 degrees.

The support substrate 326 may be mounted onto a display housing (not shown) or may be integrally formed therewith. The support substrate 326 may alternatively be mounted onto an edge 322 of plate 324. The support substrate 326 may be formed of a ceramic material, a material such as FR-4 which is commonly used for PCBs, glass, plastic or a metal such as aluminum. The support substrate may also provide mounting for and electrical connections to the detector elements 330. A processor 335 for processing the outputs of the detector elements 330 may also be mounted on the support substrate 326.

The input device shown in FIG. 5 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 336 which typically includes one or more electromagnetic radiation emitting sources, here shown as a single IR emitting LED 338. The illumination subassembly 336 preferably forms part of the integrated display and input device. Examples of various suitable configurations of illumination subassembly 336 are described hereinbelow in FIGS. 18A-18F. Optionally, the light emitted by LED 338 may be modulated by modulating circuitry (not shown).

Figure 6:
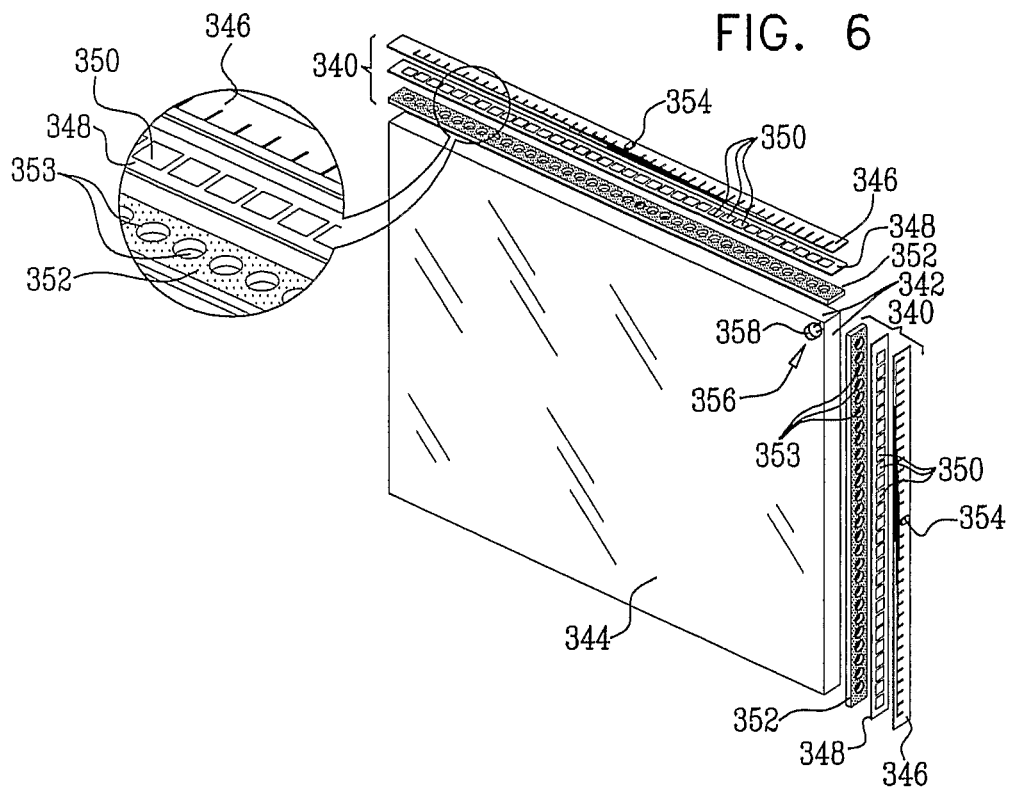
FIG. 6 is a simplified illustration of a portion of an input device constructed and operative in accordance with a yet further preferred embodiment of the present invention, employing detectors arranged along edges of a display element.

Reference is now made to FIG. 6, which is a simplified illustration of a portion of an input device constructed and operative in accordance with a yet further preferred embodiment of the present invention, employing detector elements arranged along edges of a display element. In the structure of FIG. 6, at least one detector assembly 340 is arranged along at least one edge 342 of a viewing plane defining plate 344 to sense light impinging on plate 344 and propagating within the plate to the edges 342 thereof. Viewing plane defining plate 344 may be a single or multiple layer plate and may have one or more coating layers associated therewith. Preferably, detector assemblies 340 are provided along at least two mutually perpendicular edges 342, as shown, though detector assemblies 340 may be provided along all or most of edges 342. Alternatively, a single detector assembly 340 may be provided along only one edge 342 of plate 344.

In accordance with a preferred embodiment of the present invention, the detector assembly 340 comprises a support substrate 346 onto which is mounted a linear arrangement 348 of detector elements 350. Interposed between linear arrangement 348 and edge 342 is a cover layer 352.

The embodiment of FIG. 6 differs from that of FIG. 5 in that the cover layer 352 is substantially thicker than cover layer 332 and is preferably at least 200 microns in thickness. Layer 352 has apertures 353 formed therein, which apertures define light collimating tunnels. Apertures 353 are formed in layer 352, in sizes and arrangements which provide desired fields-of-view for the various corresponding detector elements 350. Depending on the thickness of layer 352, each detector element 350 may have associated therewith a single tunnel-defining aperture 353 as shown or a plurality of smaller tunnel-defining apertures. The selection of aperture size and distribution is determined in part by the mechanical strength of layer 352. Layer 352 may have multiple functions including physical protection, field-of-view limitation and light intensity limitation, and may have optical power.

Field-of-view limiting functionality may be desirable in this context because it enhances position discrimination by limiting overlap between the fields-of-view of adjacent detector elements 350. Extent of field-of-view limiting may be controlled by the size, pitch and arrangement of apertures 353 and their locations with respect to and distances from detector elements 350. In accordance with a preferred embodiment, the field-of-view limiting functionality limits the field-of-view of at least one of detector elements 350 to a solid angle of less than or equal to 15 degrees. In accordance with another preferred embodiment, the field-of-view limiting functionality limits the field-of-view of at least one of detector elements 350 to a solid angle of less than or equal to 7 degrees.

The support substrate 346 may be mounted onto a display housing (not shown) or may be integrally formed therewith. The support substrate 346 may alternatively be mounted onto an edge 342 of plate 344. The support substrate 346 may be formed of a ceramic material, a material such as FR-4 which is commonly used for PCBs, glass, plastic or a metal such as aluminum. The support substrate 346 may also provide mounting for and electrical connections to the detector elements 350. A processor 354 for processing the outputs of the detector elements 350 may also be mounted on the support substrate 346.

The input device shown in FIG. 6 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 356 which typically includes one or more electromagnetic radiation emitting sources, here shown as a single IR emitting LED 358. The illumination subassembly 356 preferably forms part of the integrated display and input device. Examples of various suitable configurations of illumination subassembly 356 are described hereinbelow in FIGS. 18A-18F. Optionally, the light emitted by LED 358 may be modulated by modulating circuitry (not shown).

Figure 7:
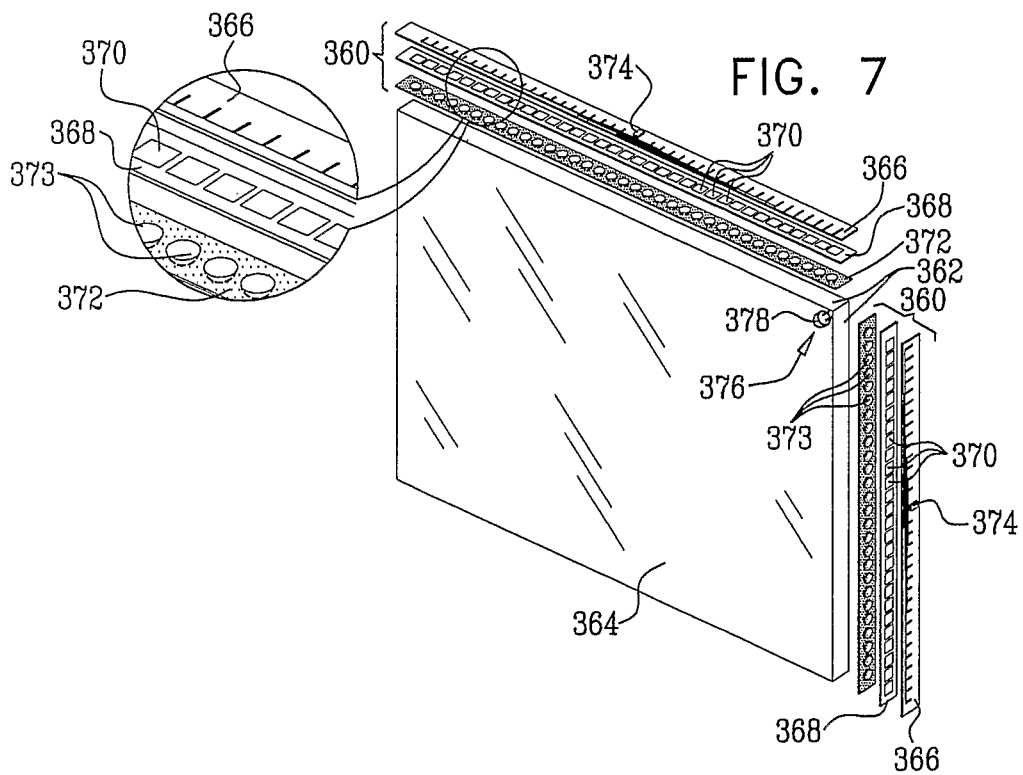
FIG. 7 is a simplified illustration of a portion of an input device constructed and operative in accordance with an additional preferred embodiment of the present invention, employing detectors arranged along edges of a display element.

Reference is now made to FIG. 7, which is a simplified illustration of a portion of an input device constructed and operative in accordance with an additional preferred embodiment of the present invention, employing detector elements arranged along edges of a display element. In the structure of FIG. 7, at least one detector assembly 360 is arranged along at least one edge 362 of a viewing plane defining plate 364 to sense light impinging on plate 364 and propagating within the plate to the edges 362 thereof. Viewing plane defining plate 364 may be a single or multiple layer plate and may have one or more coating layers associated therewith. Preferably, detector assemblies 360 are provided along at least two mutually perpendicular edges 362, as shown, though detector assemblies 360 may be provided along all or most of edges 362. Alternatively, a single detector assembly 360 may be provided along only one edge 362 of plate 364.

In accordance with a preferred embodiment of the present invention, the detector assembly 360 comprises a support substrate 366 onto which is mounted a linear arrangement 368 of detector elements 370. Interposed between linear arrangement 368 and edge 362 is a cover layer 372.

The embodiment of FIG. 7 differs from that of FIGS. 5 and 6 in that apertures in the cover layer in FIGS. 5 and 6 are replaced by lenses 373 formed in cover layer 372. Lenses 373 may be integrally formed with layer 372 or may be discrete elements fitted within suitably sized and positioned apertures in an opaque substrate. Lenses 373 may be associated with tunnel-defining apertures or may comprise an array of microlenses aligned with one or more of detector elements 370.

Layer 372 may have multiple functions including physical protection, field-of-view limitation and light intensity limitation, and may have optical power. Field-of-view limiting functionality may be desirable in this context because it enhances position discrimination by limiting overlap between the fields-of-view of adjacent detector elements 370.

The support substrate 366 may be mounted onto a display housing (not shown) or may be integrally formed therewith. The support substrate 366 may alternatively be mounted onto an edge 362 of plate 364. The support substrate 366 may be formed of a ceramic material, a material such as FR-4 which is commonly used for PCBs, glass, plastic or a metal such as aluminum. The support substrate may also provide mounting for and electrical connections to the detector elements 370. A processor 374 for processing the outputs of the detector elements 370 may also be mounted on the support substrate 366.

The input device shown in FIG. 7 may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 376 which typically includes one or more electromagnetic radiation emitting sources, here shown as a single IR emitting LED 378. The illumination subassembly 376 preferably forms part of the integrated display and input device. Examples of various suitable configurations of illumination subassembly 376 are described hereinbelow in FIGS. 18A-18F. Optionally, the light emitted by LED 378 may be modulated by modulating circuitry (not shown).

Reference is now made to FIGS. 8A-8D, which are simplified illustrations of four alternative embodiments of a portion of an input device constructed and operative in accordance with another preferred embodiment of the present invention, employing detector elements arranged along edges of a display element.

In the structure of FIGS. 8A-8D, at least one detector assembly 400 is arranged along at least one edge 402 of a viewing plane defining plate 404 to sense light impinging on plate 404 and propagating within the plate to the edges 402 thereof. Viewing plane defining plate 404 may be a single or multiple layer plate and may have one or more coating layers associated therewith. Preferably, detector assemblies 400 are provided along at least two mutually perpendicular edges 402, though detector assemblies 400 may be provided along all or most of edges 402. Alternatively, a single detector assembly 400 may be provided along only one edge 402 of plate 404.

In accordance with a preferred embodiment of the present invention, the detector assembly 400 comprises a support substrate 406 onto which is mounted a linear arrangement 408 of detector elements 410. As distinct from the embodiments of FIGS. 4-7, in the embodiments of FIGS. 8A-8D, the cover layer is obviated and its functionality is provided by suitable conditioning of edge 402 of viewing plane defining plate 404. This functionality may provide multiple functions including physical protection, light intensity limitation and field-of-view limitation, and may have optical power.

The support substrate 406 may be mounted onto a display housing (not shown) or may be integrally formed therewith. The support substrate 406 may alternatively be mounted onto an edge 402 of plate 404. The support substrate 406 may be formed of a ceramic material, a material such as FR-4 which is commonly used for PCBs, glass, plastic or a metal such as aluminum. The support substrate may also provide mounting for and electrical connections to the detector elements 410. A processor 414 for processing the outputs of the detector elements 410 may also be mounted on the support substrate 406.

It is a particular feature of this embodiment of the present invention that the detector assembly 400 is extremely thin, preferably under 1 mm overall. Accordingly, the support substrate 406 is preferably 50-200 microns in thickness and the linear arrangement 408 of detector elements 410 is preferably 100-400 microns in thickness.

The input devices shown in FIG. 8A-8D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 416 which typically includes one or more electromagnetic radiation emitting sources, here shown as a single IR emitting LED 418. The illumination subassembly 416 preferably forms part of the integrated display and input device. Examples of various suitable configurations of illumination subassembly 416 are described hereinbelow in FIGS. 18A-18F. Optionally, the light emitted by LED 418 may be modulated by modulating circuitry (not shown).

Figure 8A:
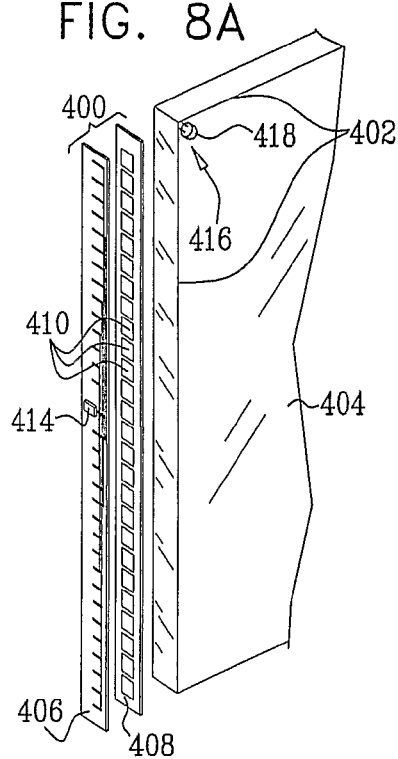
FIGS. 8A, 8B, 8C and 8D are simplified illustrations of four alternative embodiments of a portion of an input device constructed and operative in accordance with another preferred embodiment of the present invention employing detectors arranged along edges of a display element.

In the embodiment of FIG. 8A, edge 402 is uniformly polished for unimpeded light transmission therethrough to linear arrangement 408 of detector elements 410.

Figure 8B:
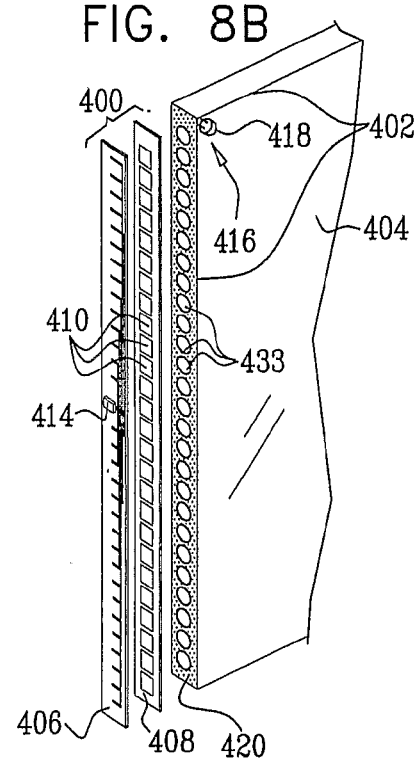

Reference is now made to FIG. 8B, in which it is seen that edge 402 is conditioned to define a field-of-view defining mask 420 having apertures 433 formed therein in sizes and arrangements which provide desired fields-of-view for the various corresponding detector elements 410. Each detector element 410 may have associated therewith a single aperture 433, as shown, or a plurality of smaller apertures.

Field-of-view limiting functionality may be desirable in this context because it enhances resolution by limiting overlap between the fields-of-view of adjacent detector elements 410. Extent of field-of-view limiting may be controlled by the size, pitch and arrangement of apertures 433 and their locations with respect to and distances from detector elements 410. In accordance with a preferred embodiment, the field-of-view limiting functionality limits the field-of-view of at least one of detector elements 410 to a solid angle of less than or equal to 15 degrees. In accordance with another preferred embodiment, the field-of-view limiting functionality limits the field-of-view of at least one of detector elements 410 to a solid angle of less than or equal to 7 degrees.

Figure 8C:
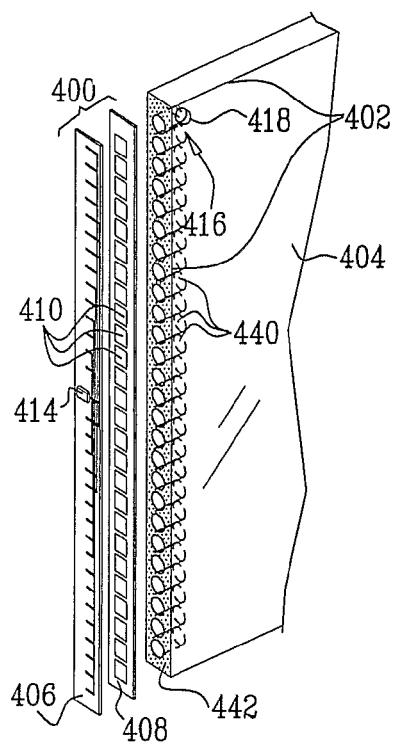

Reference is now made to FIG. 8C, which differs from that of FIG. 8B in that apertures 433 in mask 420 are replaced by light collimating tunnel-defining apertures 440 in a mask 442.

Each detector element 410 may have associated therewith a single tunnel-defining aperture 440 as shown or a plurality of smaller tunnel-defining apertures.

Field-of-view limiting functionality may be desirable in this context because it enhances resolution by limiting overlap between the fields-of-view of adjacent detector elements 410. Extent of field-of-view limiting may be controlled by the size, pitch and arrangement of apertures 440 and their locations with respect to and distances from detector elements 410. In accordance with a preferred embodiment, the field-of-view limiting functionality limits the field-of-view of at least one of detector elements 410 to a solid angle of less than or equal to 15 degrees. In accordance with another preferred embodiment, the field-of-view limiting functionality limits the field-of-view of at least one of detector elements 410 to a solid angle of less than or equal to 7 degrees.

Figure 8D:
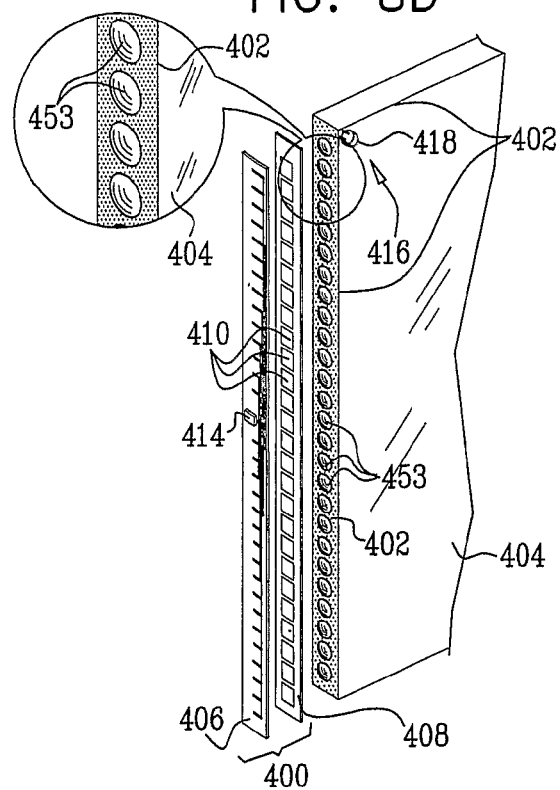

Reference is now made to FIG. 8D, which differs from that of FIGS. 5B and 8C in that the apertures in FIGS. 8B and 8C are replaced by lenses 453. Lenses 453 may be integrally formed at edges 402 or may be discrete elements fitted within suitably sized and positioned apertures in plate 404. Lenses 453 may be associated with tunnel-defining apertures or may comprise an array of microlenses aligned with one or more of detector elements 410.

Field-of-view limiting functionality may be desirable in this context because it enhances resolution by limiting overlap between the fields-of-view of adjacent detector elements 410. Extent of field-of-view limiting may be controlled by the size, pitch and arrangement of lenses 453 and their locations with respect to and distances from detector elements 410. In accordance with a preferred embodiment, the field-of-view limiting functionality limits the field-of-view of at least one of detector elements 410 to a solid angle of less than or equal to 15 degrees. In accordance with another preferred embodiment, the field-of-view limiting functionality limits the field-of-view of at least one of detector elements 410 to a solid angle of less than or equal to 7 degrees.

Reference is now made to FIGS. 9A, 9B, 9C and 9D, which are simplified illustrations of four alternative embodiments of a portion of an input device constructed and operative in accordance with yet another preferred embodiment of the present invention, employing forward-facing detector elements arranged about edges of a display element.

In the structure of FIGS. 9A-9D, at least one detector assembly 500 is arranged about at least one edge 502 of a viewing plane defining plate 504 to sense light impinging directly onto detector assembly 500. Viewing plane defining plate 504 may be a single or multiple layer plate and may have one or more coating layers associated therewith. Light, preferably including light in the IR band, is emitted by a light beam emitter such as light beam emitter 128 in the embodiment of FIG. 1B or a light reflecting object as in the embodiment of FIG. 1A. Preferably, detector assemblies 500 are provided along at least two mutually perpendicular edges 502, though detector assemblies 500 may be provided along all or most of edges 502. Alternatively, a single detector assembly 500 may be provided along only one edge 502 of plate 504.

In accordance with a preferred embodiment of the present invention, the detector assembly 500 comprises a support substrate 506 onto which is mounted a linear arrangement 508 of detector elements 510. As distinct from the embodiments of FIGS. 8A-8D, there is provided a cover layer 512 and as distinct from the embodiments of FIGS. 4-7, the detector assembly 500 and the detector elements 510 are generally forward facing, in the sense illustrated generally in FIG. 1B and described hereinabove with respect thereto. The cover layer 512 may provide multiple functions including physical protection, light intensity limitation and field-of-view limitation, and may have optical power.

The support substrate 506 may be mounted onto a display housing (not shown) or may be integrally formed therewith.

The support substrate 506 may alternatively be mounted onto an edge 502 of plate 504. The support substrate 506 may be formed of a ceramic material, a material such as FR-4 which is commonly used for PCBs, glass, plastic or a metal such as aluminum. The support substrate may also provide mounting for and electrical connections to the detector elements 510. A processor 514 for processing the outputs of the detector elements 510 may also be mounted on the support substrate 506.

It is a particular feature of this embodiment of the present invention that the detector assembly 500 is extremely thin, preferably under 1 mm overall. Accordingly, the support substrate 506 is preferably 50-200 microns in thickness and the linear arrangement 508 of detector elements 510 is preferably 100-400 microns in thickness and the cover layer 512 is preferably 100-500 microns in thickness.

The input devices shown in FIG. 9A-9D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 516 which typically includes one or more electromagnetic radiation emitting sources, here shown as a single IR emitting LED 518. The illumination subassembly 516 preferably forms part of the integrated display and input device. Examples of various suitable configurations of illumination subassembly 516 are described hereinbelow in FIGS. 18A-18F. Optionally, the light emitted by LED 518 may be modulated by modulating circuitry (not shown).

Figure 9A:
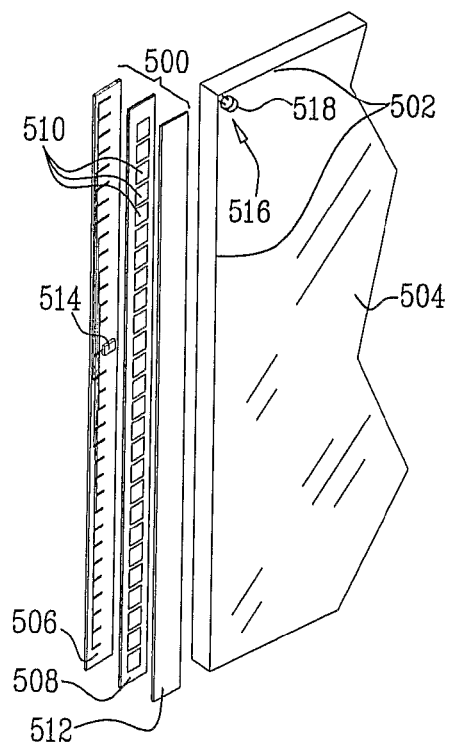
FIGS. 9A, 9B, 9C and 9D are simplified illustrations of four alternative embodiments of a portion of an input device constructed and operative in accordance with yet another preferred embodiment of the present invention, employing forward-facing detectors arranged about edges of a display element.

In the embodiment of FIG. 9A, cover layer 512 is formed of glass or any other suitable light transparent material.

Figure 9B:
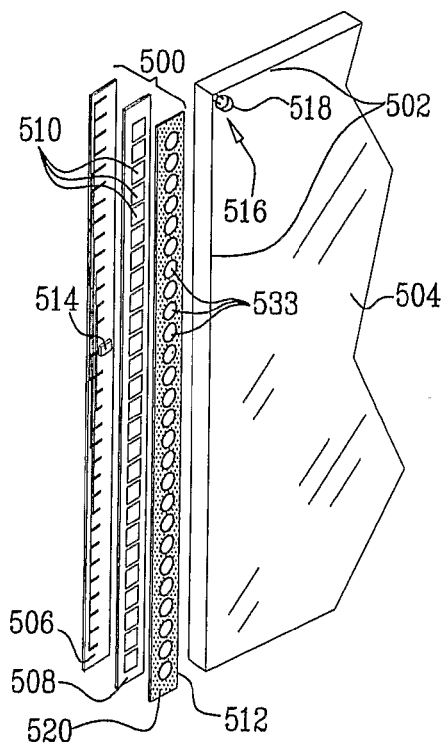

Reference is now made to FIG. 9B, in which it is seen that cover layer 512 includes a field-of-view defining mask 520 having apertures 533 formed therein in sizes and arrangements which provide desired fields-of-view for the various corresponding detector elements 510. Each detector element 510 may have associated therewith a single aperture 533, as shown, or a plurality of smaller apertures.

Field-of-view limiting functionality may be desirable in this context because it enhances resolution by limiting overlap between the fields-of-view of adjacent detector elements 510. Extent of field-of-view limiting may be controlled by the size, pitch and arrangement of apertures 533 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Figure 9C:
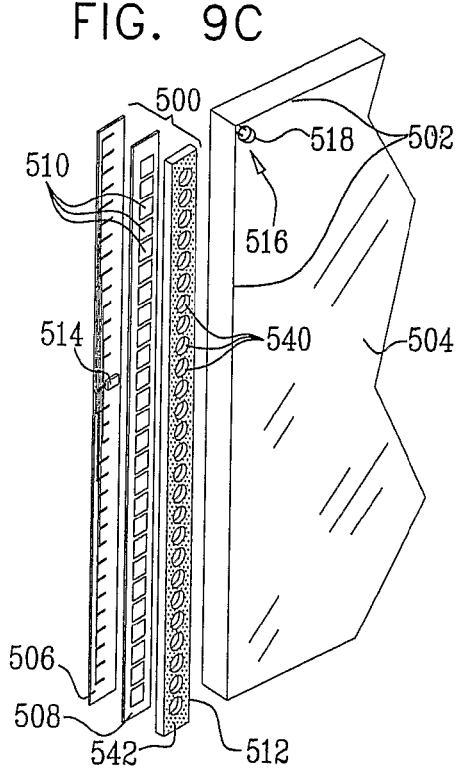

Reference is now made to FIG. 9C, which differs from that of FIG. 9B in that apertures 533 in mask 520 are replaced by light collimating tunnel-defining apertures 540 in a mask 542.

Each detector element 510 may have associated therewith a single tunnel-defining aperture 540 as shown or a plurality of smaller tunnel-defining apertures.

Field-of-view limiting functionality may be desirable in this context because it enhances resolution by limiting overlap between the fields-of-view of adjacent detector elements 510. Extent of field-of-view limiting may be controlled by the size, pitch and arrangement of apertures 540 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Figure 9D:
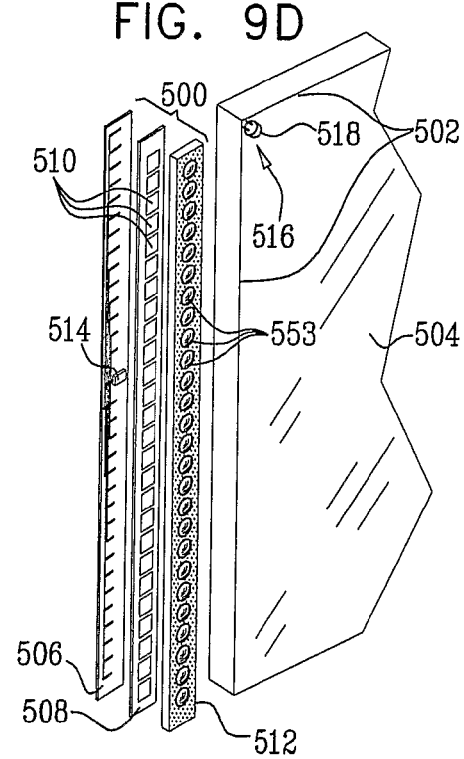

Reference is now made to FIG. 9D, which differs from that of FIGS. 9B and 9C in that the apertures in FIGS. 9B and 9C are replaced by lenses 553. Lenses 553 may be integrally formed with cover layer 512 or may be discrete elements fitted within suitably sized and positioned apertures in cover layer 512. Lenses 553 may be associated with tunnel-defining apertures or may comprise an array of microlenses aligned with one or more of detector elements 510.

Field-of-view limiting functionality may be desirable in this context because it enhances resolution by limiting overlap between the fields-of-view of adjacent detector elements 510. Extent of field-of-view limiting may be controlled by the size, pitch and arrangement of lenses 553 and their locations with respect to and distances from detector elements 510. In accordance with a preferred embodiment, the field-of-view limiting functionality limits the field-of-view of at least one of detector elements 510 to a solid angle of less than or equal to 15 degrees. In accordance with another preferred embodiment, the field-of-view limiting functionality limits the field-of-view of at least one of detector elements 510 to a solid angle of less than or equal to 7 degrees.

Reference is now made to FIGS. 10A, 10B, 10C and 10D, which are simplified illustrations of four alternative embodiments of a portion of an input device constructed and operative in accordance with still another preferred embodiment of the present invention, employing forward-facing detector elements arranged behind edges of a display element.

In the structure of FIGS. 10A-10D, at least one detector assembly 600 is arranged behind at least one edge 602 of a viewing plane defining plate 604 to sense light impinging onto detector assembly 600 after propagating through plate 604. Viewing plane defining plate 604 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A. Preferably, detector assemblies 600 are provided behind at least two mutually perpendicular edges 602, though detector assemblies 600 may be provided behind all or most of edges 602. Alternatively, a single detector assembly 600 may provided behind only one of edges 602.

In accordance with a preferred embodiment of the present invention, the detector assembly 600 comprises a support substrate 606 onto which is mounted a linear arrangement 608 of detector elements 610. Similarly to the embodiments of FIGS. 9A-9D, there is provided a cover layer 612 and as distinct from the embodiments of FIGS. 4-7, the detector assembly 600 and the detector elements 610 are generally forward facing, in the sense illustrated generally in FIG. 1B and described hereinabove with respect thereto. The cover layer 612 may provide multiple functions including physical protection, light intensity limitation and field-of-view limitation, and may have optical power.

The support substrate 606 may be mounted onto a display housing (not shown) or may be integrally formed therewith.

The support substrate 606 may alternatively be mounted onto a rearward facing surface 613 of plate 604 at the edge 602 lying in front of the linear arrangement 608. The support substrate 606 may be formed of a ceramic material, a material such as FR-4 which is commonly used for PCBs, glass, plastic or a metal such as aluminum. The support substrate may also provide mounting for and electrical connections to the detector elements 610. A processor 614 for processing the outputs of the detector elements 610 may also be mounted on the support substrate 606.

It is a particular feature of this embodiment of the present invention that the detector assembly 600 is extremely thin, preferably under 1 mm overall. Accordingly, the support substrate 606 is preferably 50-200 microns in thickness and the linear arrangement 608 of detector elements 610 is preferably 100-400 microns in thickness and the cover layer 612 is preferably 100-500 microns in thickness.

The input devices shown in FIG. 10A-10D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 616 which typically includes one or more electromagnetic radiation emitting sources, here shown as a single IR emitting LED 618. The illumination subassembly 616 preferably forms part of the integrated display and input device. Examples of various suitable configurations of illumination subassembly 616 are described hereinbelow in FIGS. 18A-18F. Optionally, the light emitted by LED 618 may be modulated by modulating circuitry (not shown).

Figure 10A:
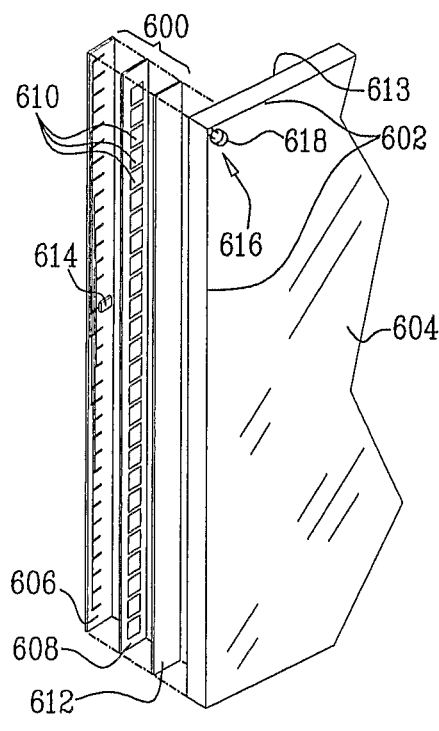
FIGS. 10A, 10B, 10C and 10D are simplified illustrations of four alternative embodiments of a portion of an input device constructed and operative in accordance with still another preferred embodiment of the present invention, employing forward-facing detectors arranged behind edges of a display element.

In the embodiment of FIG. 10A, cover layer 612 is formed of glass or any other suitable light transparent material.

Figure 10B:
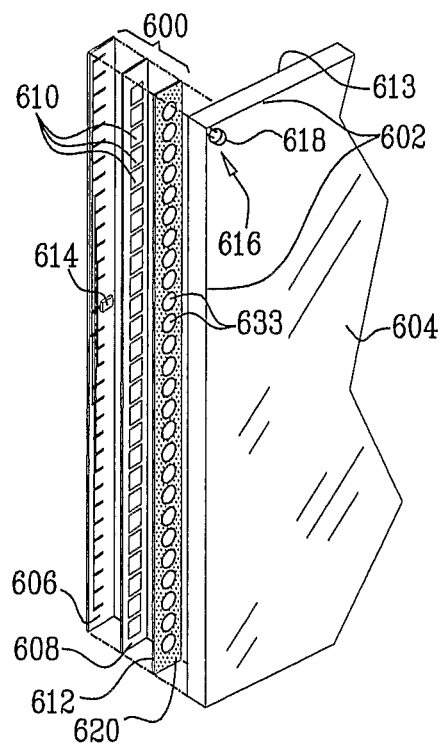

Reference is now made to FIG. 10B, in which it is seen that cover layer 612 includes a field-of-view defining mask 620 having apertures 633 formed therein in sizes and arrangements which provide desired fields-of-view for the various corresponding detector elements 610. Each detector element 610 may have associated therewith a single aperture 633 as shown or a plurality of smaller apertures.

Field-of-view limiting functionality may be desirable in this context because it enhances resolution by limiting overlap between the fields-of-view of adjacent detector elements 610. Extent of field-of-view limiting may be controlled by the size, pitch and arrangement of apertures 633 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Figure 10C:
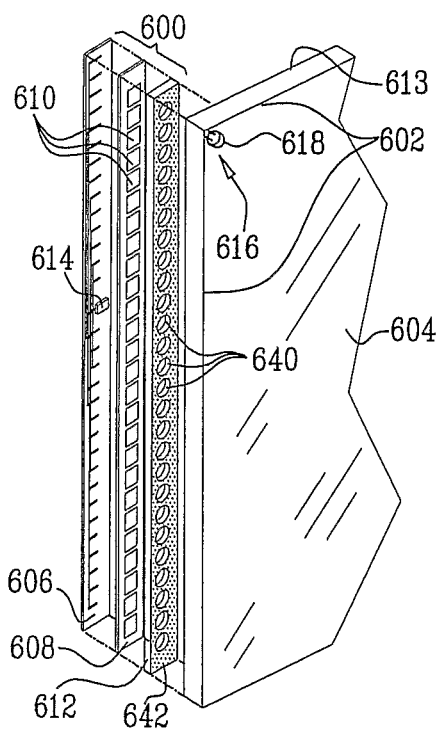

Reference is now made to FIG. 10C, which differs from that of FIG. 10B in that apertures 633 in mask 620 are replaced by light collimating tunnel-defining apertures 640 in a mask 642.

Each detector element 610 may have associated therewith a single tunnel-defining aperture 640 as shown or a plurality of smaller tunnel-defining apertures.

Field-of-view limiting functionality may be desirable in this context because it enhances resolution by limiting overlap between the fields-of-view of adjacent detector elements 610. Extent of field-of-view limiting may be controlled by the size, pitch and arrangement of apertures 640 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Figure 10D:
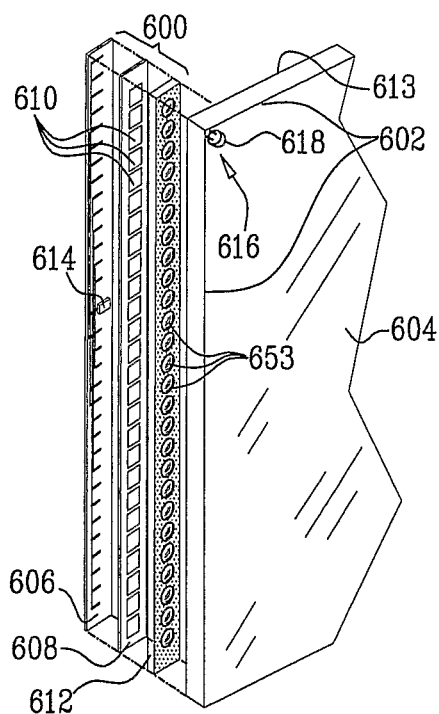

Reference is now made to FIG. 10D, which differs from that of FIGS. 10B and 10C in that the apertures in FIGS. 10B and 10C are replaced by lenses 653. Lenses 653 may be integrally formed with cover layer 612 or may be discrete elements fitted within suitably sized and positioned apertures in cover layer 612. Lenses 653 may be associated with tunnel-defining apertures or may comprise an array of microlenses aligned with one or more of detector elements 610.

Field-of-view limiting functionality may be desirable in this context because it enhances resolution by limiting overlap between the fields-of-view of adjacent detector elements 610. Extent of field-of-view limiting may be controlled by the size, pitch and arrangement of lenses 653 and their locations with respect to and distances from detector elements 610. In accordance with a preferred embodiment, the field-of-view limiting functionality limits the field-of-view of at least one of detector elements 610 to a solid angle of less than or equal to 15 degrees. In accordance with another preferred embodiment, the field-of-view limiting functionality limits the field-of-view of at least one of detector elements 610 to a solid angle of less than or equal to 7 degrees.

Reference is now made to FIGS. 11A, 11B, 11C and 11D, which are simplified illustrations of four alternative embodiments of a portion of an input device constructed and operative in accordance with a further preferred embodiment of the present invention, employing forward-facing detector elements arranged behind edges of a display element.

In the structure of FIGS. 11A-11D, at least one detector assembly 700 is arranged behind at least one edge 702 of a viewing plane defining plate 704 to sense light impinging on plate 704 and propagating within the plate to the edges 702 thereof. Viewing plane defining plate 704 may be a single or multiple layer plate and may have one or more coating layers associated therewith. Preferably, detector assemblies 700 are provided behind at least two mutually perpendicular edges 702, though detector assemblies 700 may be provided behind all or most of edges 702. Alternatively, a single detector assembly 700 may be provided behind plate 704 at only one edge thereof.

In accordance with a preferred embodiment of the present invention, the detector assembly 700 comprises a support substrate 706 onto which is mounted a linear arrangement 708 of detector elements 710. As distinct from the embodiments of FIGS. 4-7, in the embodiments of FIGS. 11A-11D, the detector assembly 700 and the detector elements 710 are generally forward facing, in the sense illustrated generally in FIG. 1B and described hereinabove with respect thereto. Also as distinct from the embodiments of FIGS. 10A-10D, the cover layer is obviated and its functionality is provided by suitable conditioning of a rearward facing surface 711 of plate 704 at the edge 702 lying in front of the linear arrangement 708. This functionality may provide multiple functions including physical protection, light intensity limitation and field-of-view limitation, and may have optical power.

The support substrate 706 may be mounted onto a display housing (not shown) or may be integrally formed therewith. The support substrate 706 may alternatively be mounted onto the rearward facing surface 711 of plate 704 at the edge 702. The support substrate 706 may be formed of a ceramic material, a material such as FR-4 which is commonly used for PCBs, glass, plastic or a metal such as aluminum. The support substrate may also provide mounting for and electrical connections to the detector elements 710. A processor 714 for processing the outputs of the detector elements 710 may also be mounted on the support substrate 706.

It is a particular feature of this embodiment of the present invention that the detector assembly 700 is extremely thin, preferably under 1 mm overall. Accordingly, the support substrate 706 is preferably 50-200 microns in thickness and the linear arrangement 708 of detector elements 710 is preferably 100-400 microns in thickness.

The input devices shown in FIG. 11A-11D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 716 which typically includes one or more electromagnetic radiation emitting sources, here shown as a single IR emitting LED 718. The illumination subassembly 716 preferably forms part of the integrated display and input device. Examples of various suitable configurations of illumination subassembly 716 are described hereinbelow in FIGS. 18A-18F. Optionally, the light emitted by LED 718 may be modulated by modulating circuitry (not shown).

Figure 11A:
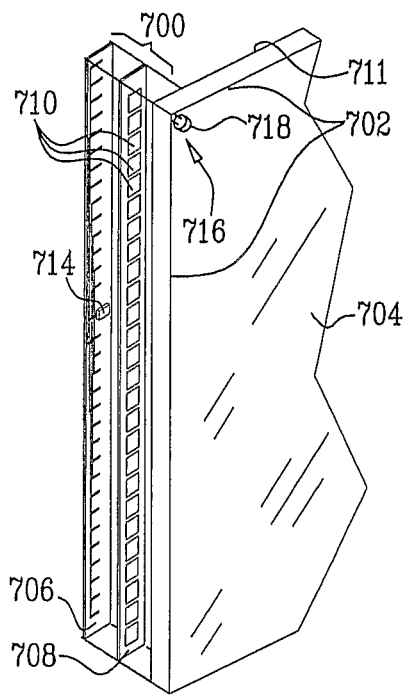
FIGS. 11A, 11B, 11C and 11D are simplified illustrations of four alternative embodiments of a portion of an input device constructed and operative in accordance with a further preferred embodiment of the present invention, employing forward-facing detectors arranged behind edges of a display element.

In the embodiment of FIG. 11A, the rearward facing surface 711 of plate 704 at the edge 702 lying in front of the linear arrangement 708 is uniformly polished for unimpeded light transmission therethrough to linear arrangement 708 of detector elements 710.

Figure 11B:
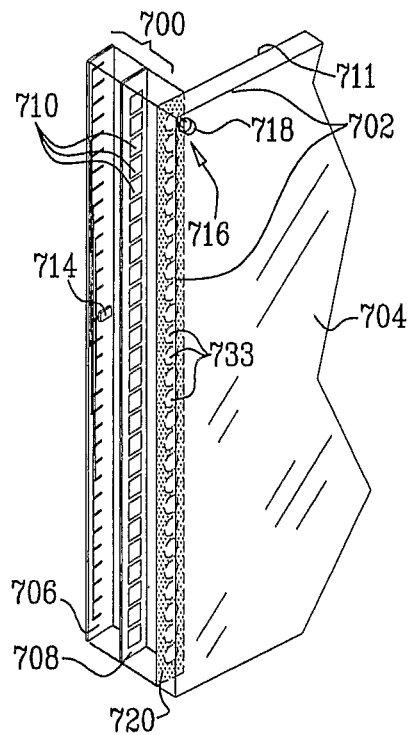

Reference is now made to FIG. 11B, in which it is seen that the rearward facing surface 711 of plate 704 at the edge 702 lying in front of the linear arrangement 708 is conditioned to define a field-of-view defining mask 720 having apertures 733 formed therein in sizes and arrangements which provide desired fields-of-view for the various corresponding detector elements 710. Each detector element 710 may have associated therewith a single aperture 733 as shown or a plurality of smaller apertures.

Field-of-view limiting functionality may be desirable in this context because it enhances resolution by limiting overlap between the fields-of-view of adjacent detector elements 710. Extent of field-of-view limiting may be controlled by the size, pitch and arrangement of apertures 733 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Figure 11C:
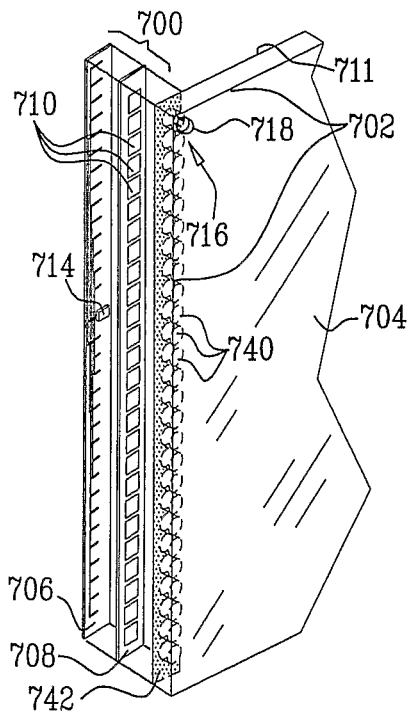

Reference is now made to FIG. 11C, which differs from that of FIG. 11B in that apertures 733 in mask 720 are replaced by light collimating tunnel-defining apertures 740 in a mask 742.

Each detector element 710 may have associated therewith a single tunnel-defining aperture 740 as shown or a plurality of smaller tunnel-defining apertures.

Field-of-view limiting functionality may be desirable in this context because it enhances resolution by limiting overlap between the fields-of-view of adjacent detector elements 710. Extent of field-of-view limiting may be controlled by the size, pitch and arrangement of apertures 740 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Figure 11D:
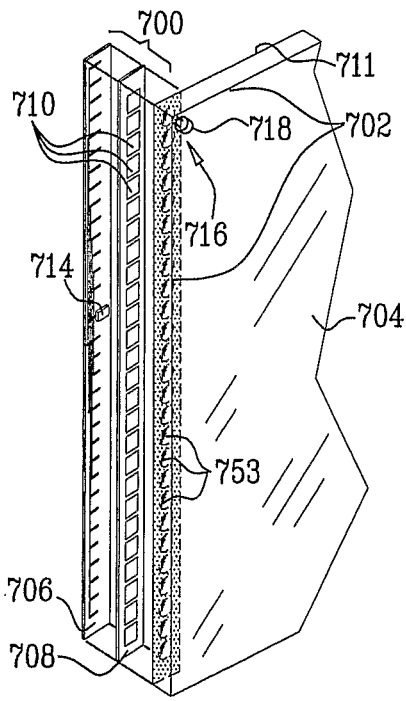

Reference is now made to FIG. 11D, which differs from that of FIGS. 11B and 11C in that the apertures in FIGS. 11B and 11C are replaced by lenses 753. Lenses 753 may be integrally formed at edges 702 or may be discrete elements fitted within suitably sized and positioned apertures in plate 704. Lenses 753 may be associated with tunnel-defining apertures or may comprise an array of microlenses aligned with one or more of detector elements 710.

Field-of-view limiting functionality may be desirable in this context because it enhances resolution by limiting overlap between the fields-of-view of adjacent detector elements 710. Extent of field-of-view limiting may be controlled by the size, pitch and arrangement of lenses 753 and their locations with respect to and distances from detector elements 710. In accordance with a preferred embodiment, the field-of-view limiting functionality limits the field-of-view of at least one of detector elements 710 to a solid angle of less than or equal to 15 degrees. In accordance with another preferred embodiment, the field-of-view limiting functionality limits the field-of-view of at least one of detector elements 710 to a solid angle of less than or equal to 7 degrees.

Reference is now made to FIGS. 12A, 12B, 12C and 12D, which are simplified illustrations of four alternative embodiments of a portion of an input device constructed and operative in accordance with a yet further preferred embodiment of the present invention, employing detector elements arranged along edges of a display element.

In the structure of FIGS. 12A-12D, at least one detector assembly 800 is arranged along at least one edge 802 of a viewing plane defining plate 804 to sense light impinging on plate 804 and propagating within the plate to the edges 802 thereof. Viewing plane defining plate 804 may be a single or multiple layer plate and may have one or more coating layers associated therewith. Preferably, detector assemblies 800 are provided along at least two mutually perpendicular edges 802, though detector assemblies 800 may be provided along all or most of edges 802. Alternatively, a single detector assembly 800 may be provided along only one edge 802 of plate 804.

The detector assembly 800 includes a linear arrangement 808 of detector elements 810. As distinct from the embodiments of FIGS. 8A-8D, the detector assembly 800 does not comprise a support substrate onto which is mounted a linear arrangement of detector elements. In the embodiments of FIGS. 12A-12D, the support substrate of FIGS. 8A-8D is replaced by a portion of a peripheral housing 812. Similarly to the embodiments of FIGS. 4-7 there is provided a cover layer 814 which provides multiple functions including physical protection, light intensity limitation and field-of-view limitation, and may have optical power.

The peripheral housing 812 may be formed of any suitable material including, for example, ceramic material, a material such as FR-4 which is commonly used for PCBs, glass, plastic or a metal such as aluminum. The peripheral housing 812 may also provide mounting for and electrical connections to the detector elements 810. A processor 816 for processing the outputs of the detector elements 810 may also be mounted on the peripheral housing 812.

It is a particular feature of this embodiment of the present invention that the detector assembly 800 is extremely thin, preferably under 1 mm overall. Accordingly, the linear arrangement 808 of detector elements 810 is preferably 100-400 microns in thickness.

The input devices shown in FIG. 12A-12D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 817 which typically includes one or more electromagnetic radiation emitting sources, here shown as a single IR emitting LED 818. The illumination subassembly 817 preferably forms part of the integrated display and input device. Examples of various suitable configurations of illumination subassembly 817 are described hereinbelow in FIGS. 18A-18F. Optionally, the light emitted by LED 818 may be modulated by modulating circuitry (not shown).

Figure 12A:
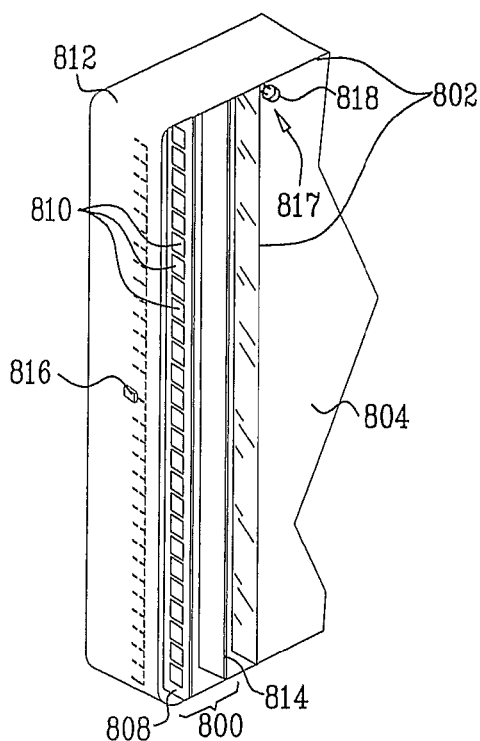
FIGS. 12A, 12B, 12C and 12D are simplified illustrations of four alternative embodiments of a portion of an input device constructed and operative in accordance with a yet further preferred embodiment of the present invention, employing detectors arranged along edges of a display element.

In the embodiment of FIG. 12A, cover layer 814 provides generally unimpeded light transmission therethrough to linear arrangement 808 of detector elements 810.

Figure 12B:
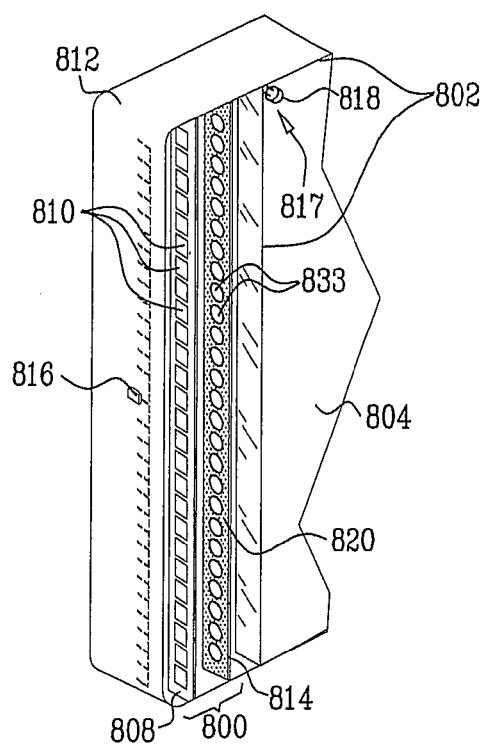

Reference is now made to FIG. 12B, in which it is seen that cover layer 814 defines a field-of-view defining mask 820 having apertures 833 formed therein in sizes and arrangements which provide desired fields-of-view for the various corresponding detector elements 810. Each detector element 810 may have associated therewith a single aperture 833 as shown or a plurality of smaller apertures.

Field-of-view limiting functionality may be desirable in this context because it enhances resolution by limiting overlap between the fields-of-view of adjacent detector elements 810. Extent of field-of-view limiting may be controlled by the size, pitch and arrangement of apertures 833 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Figure 12C:
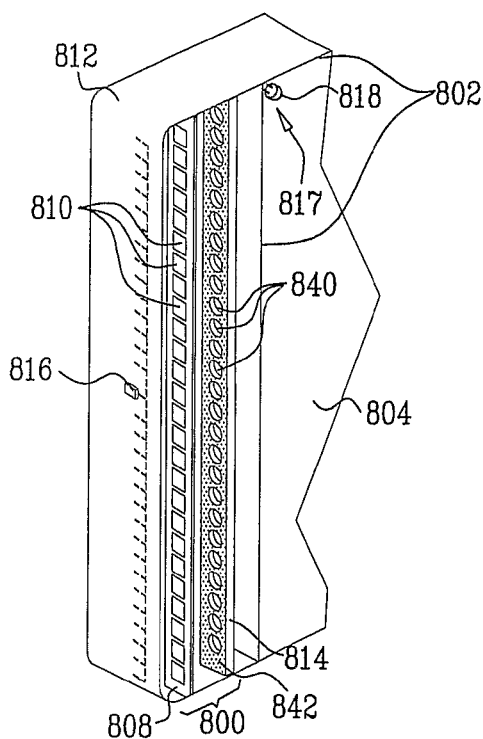

Reference is now made to FIG. 12C, which differs from that of FIG. 12B in that apertures 833 in mask 820 are replaced by light collimating tunnel-defining apertures 840 in a mask 842.

Each detector element 810 may have associated therewith a single tunnel-defining aperture 840 as shown or a plurality of smaller tunnel-defining apertures.

Field-of-view limiting functionality may be desirable in this context because it enhances resolution by limiting overlap between the fields-of-view of adjacent detector elements 810. Extent of field-of-view limiting may be controlled by the size, pitch and arrangement of apertures 840 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Figure 12D:
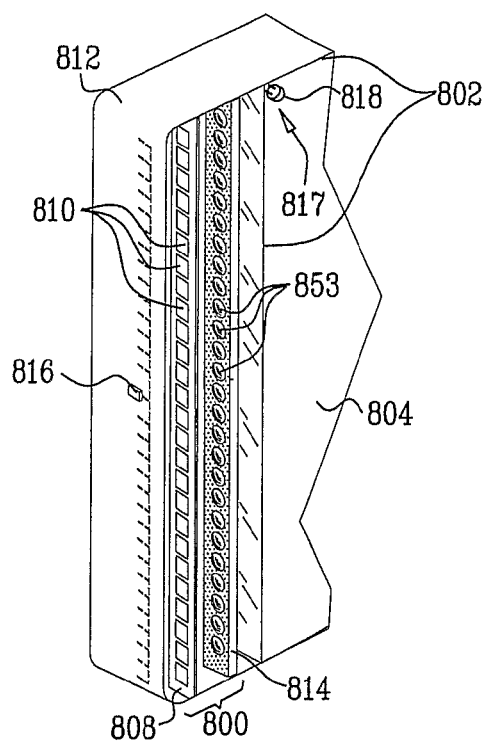

Reference is now made to FIG. 12D, which differs from that of FIGS. 12B and 12C in that the apertures in FIGS. 12B and 12C are replaced by lenses 853. Lenses 853 may be integrally formed at edges 802 or may be discrete elements fitted within suitably sized and positioned apertures in plate 804. Lenses 853 may be associated with tunnel-defining apertures or may comprise an array of microlenses aligned with one or more of detector elements 810.

Field-of-view limiting functionality may be desirable in this context because it enhances resolution by limiting overlap between the fields-of-view of adjacent detector elements 810. Extent of field-of-view limiting may be controlled by the size, pitch and arrangement of lenses 853 and their locations with respect to and distances from detector elements 810. In accordance with a preferred embodiment, the field-of-view limiting functionality limits the field-of-view of at least one of detector elements 810 to a solid angle of less than or equal to 15 degrees. In accordance with another preferred embodiment, the field-of-view limiting functionality limits the field-of-view of at least one of detector elements 810 to a solid angle of less than or equal to 7 degrees.

Reference is now made to FIGS. 13A, 13B, 13C and 13D, which are simplified illustrations of four alternative embodiments of a portion of an input device constructed and operative in accordance with a still further preferred embodiment of the present invention, employing detector elements arranged along edges of a display element.

In the structure of FIGS. 13A-13D, at least one detector assembly 860 is arranged along at least one edge 862 of a viewing plane defining plate 864 to sense light impinging on plate 864 and propagating within the plate to the edges 862 thereof. Viewing plane defining plate 864 may be a single or multiple layer plate and may have one or more coating layers associated therewith. Preferably, detector assemblies 860 are provided along at least two mutually perpendicular edges 862, though detector assemblies 860 may be provided along all or most of edges 862. Alternatively, a single detector assembly 860 may be provided along only one edge 862 of plate 864.

The detector assembly 860 includes a linear arrangement 868 of detector elements 870. As distinct from the embodiments of FIGS. 12A-12D, in the embodiments of FIGS. 13A-13D, the cover layer is obviated and its functionality is provided by suitable conditioning of edge 862 of viewing plane defining plate 864. This functionality may provide multiple functions including physical protection, light intensity limitation and field-of-view limitation, and may have optical power.

As in the embodiment of FIGS. 13A-13D, detector assembly 860 does not comprise a support substrate onto which is mounted a linear arrangement of detector elements. In the embodiments of FIGS. 13A-13D, the support substrate of FIGS. 8A-8D is replaced by a portion of a peripheral housing 872.

The peripheral housing 872 may be formed of any suitable material including, for example, ceramic material, a material such as FR-4 which is commonly used for PCBs, glass, plastic or a metal such as aluminum. The peripheral housing 872 may also provide mounting for and electrical connections to the detector elements 870. A processor 876 for processing the outputs of the detector elements 870 may also be mounted on the peripheral housing 872.

It is a particular feature of this embodiment of the present invention that the detector assembly 860 is extremely thin, preferably under 1 mm overall. Accordingly, the linear arrangement 868 of detector elements 870 is preferably 100-400 microns in thickness.

The input devices shown in FIG. 13A-13D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 877 which typically includes one or more electromagnetic radiation emitting sources, here shown as a single IR emitting LED 878. The illumination subassembly 877 preferably forms part of the integrated display and input device. Examples of various suitable configurations of illumination subassembly 877 are described hereinbelow in FIGS. 18A-18F. Optionally, the light emitted by LED 878 may be modulated by modulating circuitry (not shown).

Figure 13A:
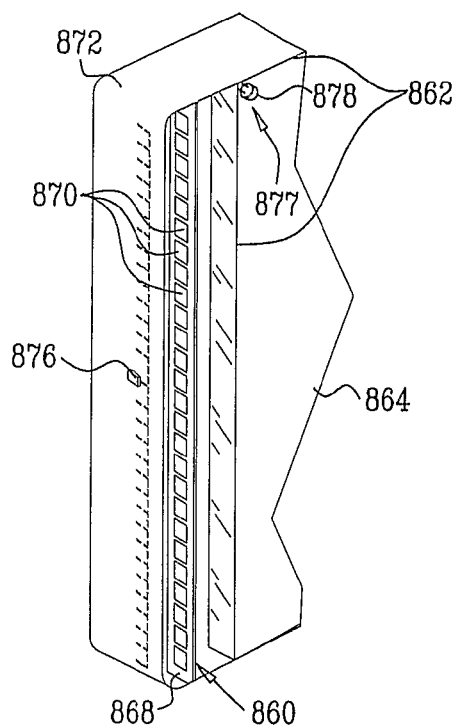
FIGS. 13A, 13B, 13C and 13D are simplified illustrations of four alternative embodiments of a portion of an input device constructed and operative in accordance with a still further preferred embodiment of the present invention, employing detectors arranged along edges of a display element.

In the embodiment of FIG. 13A, edge 862 is uniformly polished for unimpeded light transmission therethrough to linear arrangement 868 of detector elements 870.

Figure 13B:
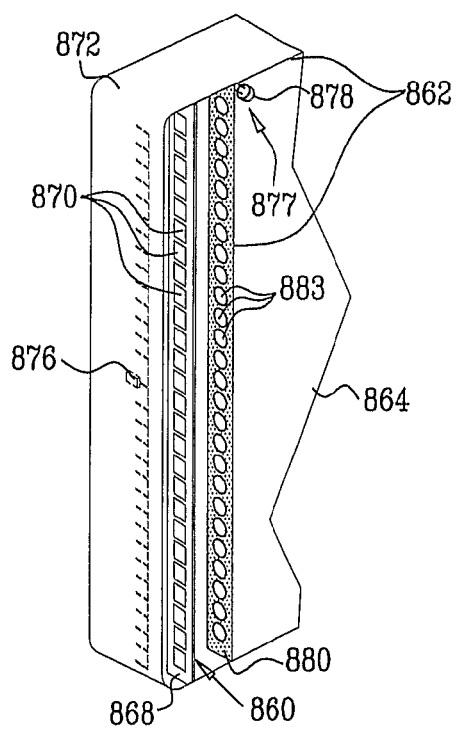

Reference is now made to FIG. 13B, in which it is seen that edge 862 is conditioned to define a field-of-view defining mask 880 having apertures 883 formed therein in sizes and arrangements which provide desired fields-of-view for the various corresponding detector elements 870. Each detector element 870 may have associated therewith a single aperture 883 as shown or a plurality of smaller apertures.

Field-of-view limiting functionality may be desirable in this context because it enhances resolution by limiting overlap between the fields-of-view of adjacent detector elements 870. Extent of field-of-view limiting may be controlled by the size, pitch and arrangement of apertures 883 and their locations with respect to and distances from detector elements 870. In accordance with a preferred embodiment, the field-of-view limiting functionality limits the field-of-view of at least one of detector elements 870 to a solid angle of less than or equal to 15 degrees. In accordance with another preferred embodiment, the field-of-view limiting functionality limits the field-of-view of at least one of detector elements 870 to a solid angle of less than or equal to 7 degrees.

Figure 13C:
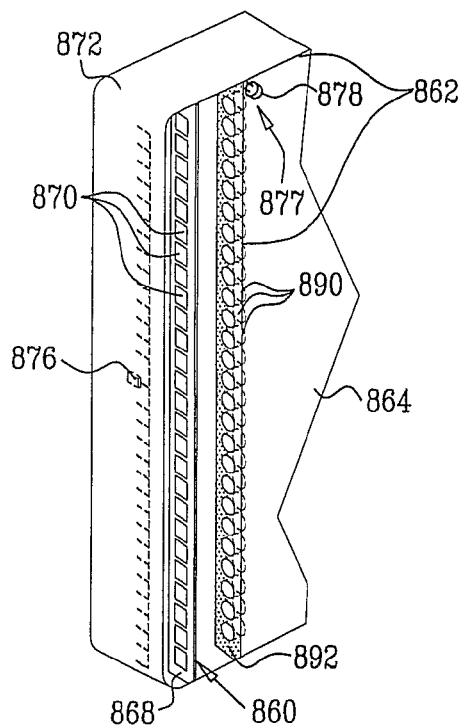

Reference is now made to FIG. 13C, which differs from that of FIG. 13B in that apertures 883 in mask 880 are replaced by light collimating tunnel-defining apertures 890 in a mask 892.

Each detector element 870 may have associated therewith a single tunnel-defining aperture 890 as shown or a plurality of smaller tunnel-defining apertures.

Field-of-view limiting functionality may be desirable in this context because it enhances resolution by limiting overlap between the fields-of-view of adjacent detector elements 870. Extent of field-of-view limiting may be controlled by the size, pitch and arrangement of apertures 890 and their locations with respect to and distances from detector elements 870. In accordance with a preferred embodiment, the field-of-view limiting functionality limits the field-of-view of at least one of detector elements 870 to a solid angle of less than or equal to 15 degrees. In accordance with another preferred embodiment, the field-of-view limiting functionality limits the field-of-view of at least one of detector elements 870 to a solid angle of less than or equal to 7 degrees.

Figure 13D:
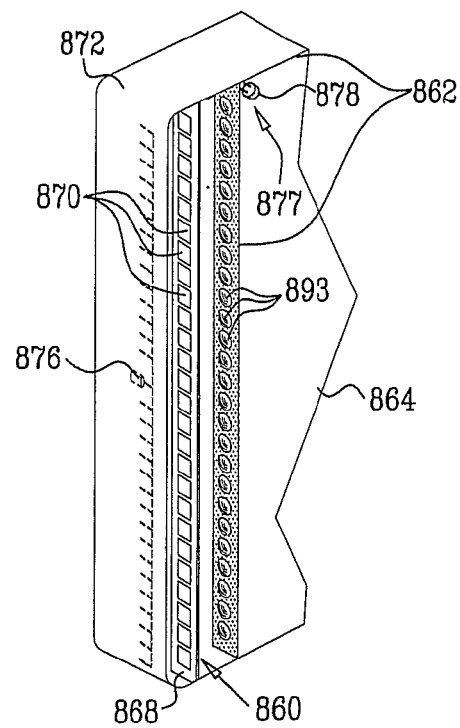

Reference is now made to FIG. 13D, which differs from FIGS. 13B and 13C in that the apertures in FIGS. 13B and 13C are replaced by lenses 893. Lenses 893 may be integrally formed at edges 862 or may be discrete elements fitted within suitably sized and positioned apertures in plate 864. Lenses 893 may be associated with tunnel-defining apertures or may comprise an array of microlenses aligned with one or more of detector elements 870.

Field-of-view limiting functionality may be desirable in this context because it enhances resolution by limiting overlap between the fields-of-view of adjacent detector elements 870. Extent of field-of-view limiting may be controlled by the size, pitch and arrangement of lenses 893 and their locations with respect to and distances from detector elements 870. In accordance with a preferred embodiment, the field-of-view limiting functionality limits the field-of-view of at least one of detector elements 870 to a solid angle of less than or equal to 15 degrees. In accordance with another preferred embodiment, the field-of-view limiting functionality limits the field-of-view of at least one of detector elements 870 to a solid angle of less than or equal to 7 degrees.

Reference is now made to FIGS. 14A, 14B, 14C and 14D, which are simplified illustrations of four alternative embodiments of a portion of an input device constructed and operative in accordance with an additional preferred embodiment of the present invention, employing forward-facing detector elements arranged about edges of a display element.

In the structure of FIGS. 14A-14D, at least one detector assembly 900 is arranged about at least one edge 902 of a viewing plane defining plate 904 to sense light impinging directly onto detector assembly 900. Viewing plane defining plate 904 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A. Preferably, detector assemblies 900 are provided along at least two mutually perpendicular edges 902, though detector assemblies 900 may be provided along all or most of edges 902. Alternatively, a single detector assembly 900 may be provided along only one edge 902 of plate 904.

The detector assembly 900 includes a linear arrangement 908 of detector elements 910. As distinct from the embodiments of FIGS. 9A-9D, the detector assembly 900 does not comprise a support substrate onto which is mounted a linear arrangement of detector elements. In the embodiments of FIGS. 14A-14D, the support substrate of FIGS. 9A-9D is replaced by a portion of a peripheral housing 912. Similarly to the embodiments of FIGS. 9A-9D there is provided a cover layer 914 which provides multiple functions including physical protection, light intensity limitation and field-of-view limitation, and may have optical power.

The peripheral housing 912 may be formed of any suitable material including, for example, ceramic material, a material such as FR-4 which is commonly used for PCBs, glass, plastic or a metal such as aluminum. The peripheral housing 912 may also provide mounting for and electrical connections to the detector elements 910. A processor 916 for processing the outputs of the detector elements 910 may also be mounted on the peripheral housing 912.

It is a particular feature of this embodiment of the present invention that the detector assembly 900 is extremely thin, preferably under 1 mm overall. Accordingly, the linear arrangement 908 of detector elements 910 is preferably 100-400 microns in thickness and the cover layer 914 is preferably 100-500 microns in thickness.

The input devices shown in FIG. 14A-14D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 917 which typically includes one or more electromagnetic radiation emitting sources, here shown as a single IR emitting LED 918. The illumination subassembly 917 preferably forms part of the integrated display and input device. Examples of various suitable configurations of illumination subassembly 917 are described hereinbelow in FIGS. 18A-18F. Optionally, the light emitted by LED 918 may be modulated by modulating circuitry (not shown).

Figure 14A:
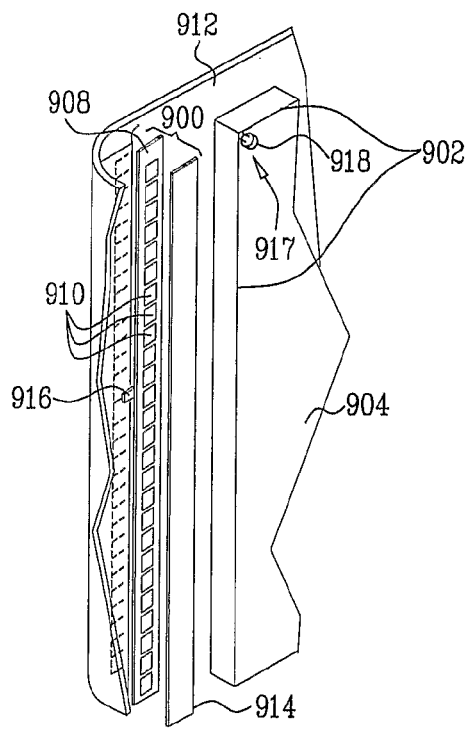
FIGS. 14A, 14B, 14C and 14D are simplified illustrations of four alternative embodiments of a portion of an input device constructed and operative in accordance with an additional preferred embodiment of the present invention, employing forward-facing detectors arranged about edges of a display element.

In the embodiment of FIG. 14A, cover layer 914 is formed of glass or any other suitable light transparent material.

Figure 14B:
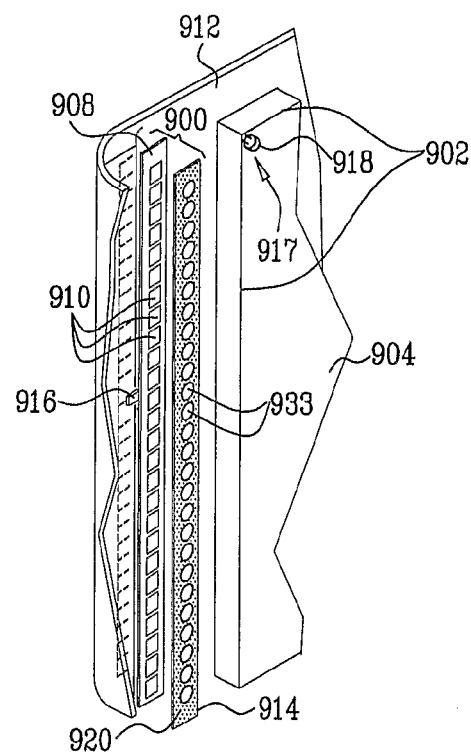

Reference is now made to FIG. 14B, in which it is seen that cover layer 914 includes a field-of-view defining mask 920 having apertures 933 formed therein in sizes and arrangements which provide desired fields-of-view for the various corresponding detector elements 910. Each detector element 910 may have associated therewith a single aperture 933 as shown or a plurality of smaller apertures.

Field-of-view limiting functionality may be desirable in this context because it enhances resolution by limiting overlap between the fields-of-view of adjacent detector elements 910. Extent of field-of-view limiting may be controlled by the size, pitch and arrangement of apertures 933 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees.

Figure 14C:
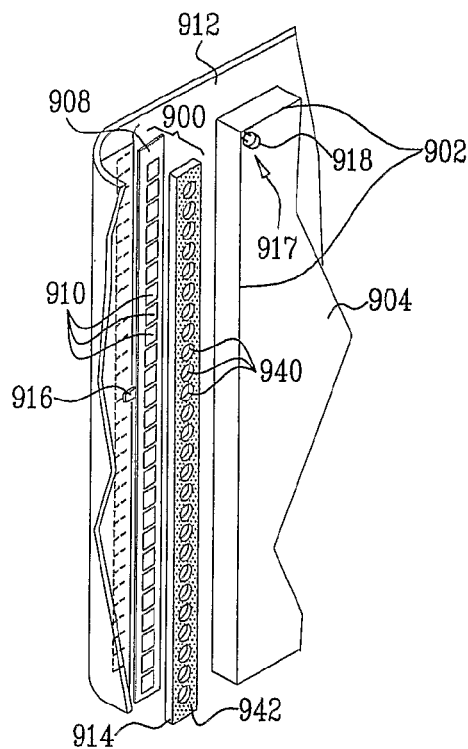

Reference is now made to FIG. 14C, which differs from that of FIG. 14B in that apertures 933 in mask 920 are replaced by light collimating tunnel-defining apertures 940 in a mask 942.

Each detector element 910 may have associated therewith a single tunnel-defining aperture 940 as shown or a plurality of smaller tunnel-defining apertures.

Field-of-view limiting functionality may be desirable in this context because it enhances resolution by limiting overlap between the fields-of-view of adjacent detector elements 910. Extent of field-of-view limiting may be controlled by the size, pitch and arrangement of apertures 940 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees.

Figure 14D:
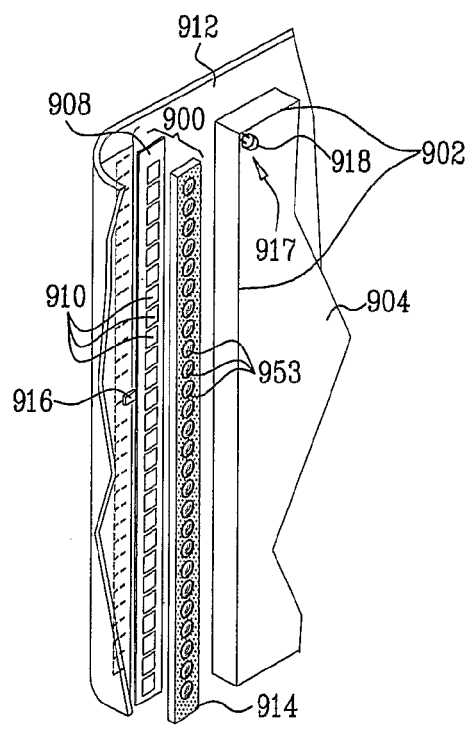

Reference is now made to FIG. 14D, which differs from that of FIGS. 14B and 14C in that the apertures in FIGS. 14B and 14C are replaced by lenses 953. Lenses 953 may be integrally formed with cover layer 914 or may be discrete elements fitted within suitably sized and positioned apertures in cover layer 914. Lenses 953 may be associated with tunnel-defining apertures or may comprise an array of microlenses aligned with one or more of detector elements 910.

Field-of-view limiting functionality may be desirable in this context because it enhances resolution by limiting overlap between the fields-of-view of adjacent detector elements 910. Extent of field-of-view limiting may be controlled by the size, pitch and arrangement of lenses 953 and their locations with respect to and distances from detector elements 910. In accordance with a preferred embodiment, the field-of-view limiting functionality limits the field-of-view of at least one of detector elements 910 to a solid angle of less than or equal to 15 degrees. In accordance with another preferred embodiment, the field-of-view limiting functionality limits the field-of-view of at least one of detector elements 910 to a solid angle of less than or equal to 7 degrees.

Reference is now made to FIGS. 15A, 15B, 15C and 15D, which are simplified illustrations of four alternative embodiments of a portion of an input device constructed and operative in accordance with another preferred embodiment of the present invention, employing forward-facing detector elements arranged behind edges of a display element.

In the structure of FIGS. 15A-15D, at least one detector assembly 960 is arranged behind at least one edge 962 of a viewing plane defining plate 964 to sense light impinging onto detector assembly 960 after propagating through plate 964. Viewing plane defining plate 964 may be a single or multiple layer plate and may have one or more coating layers associated therewith. The light, preferably including light in the IR band, is emitted by a light beam emitter such as light beam emitter 128 in the embodiment of FIG. 1B or a light reflecting object as in the embodiment of FIG. 1A. Preferably, detector assemblies 960 are provided behind at least two mutually perpendicular edges 962, though detector assemblies 960 may be provided behind all or most of edges 962. Alternatively, a single detector assembly 960 may be provided behind only one of edges 962.

The detector assembly 960 includes a linear arrangement 968 of detector elements 970. As distinct from the embodiments of FIGS. 10A-10D, the detector assembly 960 does not comprise a support substrate onto which is mounted a linear arrangement of detector elements. In the embodiments of FIGS. 15A-15D, the support substrate of FIGS. 10A-10D is replaced by a portion of a peripheral housing 972. Similarly to the embodiments of FIGS. 10A-10D there is provided a cover layer 974 which provides multiple functions including physical protection, light intensity limitation and field-of-view limitation, and may have optical power.

The peripheral housing 972 may be formed of any suitable material including, for example, ceramic material, a material such as FR-4 which is commonly used for PCBs, glass, plastic or a metal such as aluminum. The peripheral housing 972 may also provide mounting for and electrical connections to the detector elements 970. A processor 976 for processing the outputs of the detector elements 970 may also be mounted on the peripheral housing 972.

It is a particular feature of this embodiment of the present invention that the detector assembly 960 is extremely thin, preferably under 1 mm overall. Accordingly, the linear arrangement 968 of detector elements 970 is preferably 100-400 microns in thickness and the cover layer 974 is preferably 100-500 microns in thickness.

The input devices shown in FIG. 15A-15D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly 977 which typically includes one or more electromagnetic radiation emitting sources, here shown as a single IR emitting LED 978. The illumination subassembly 977 preferably forms part of the integrated display and input device. Examples of various suitable configurations of illumination subassembly 977 are described hereinbelow in FIGS. 18A-18F. Optionally, the light emitted by LED 978 may be modulated by modulating circuitry (not shown).

Figure 15A:
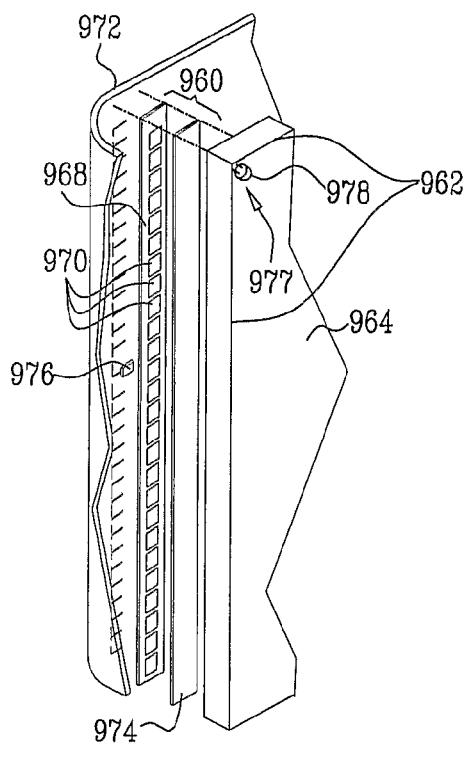
FIGS. 15A, 15B, 15C and 15D are simplified illustrations of four alternative embodiments of a portion of an input device constructed and operative in accordance with another preferred embodiment of the present invention, employing forward-facing detectors arranged behind edges of a display element.

In the embodiment of FIG. 15A, cover layer 974 is formed of glass or any other suitable light transparent material.

Figure 15B:
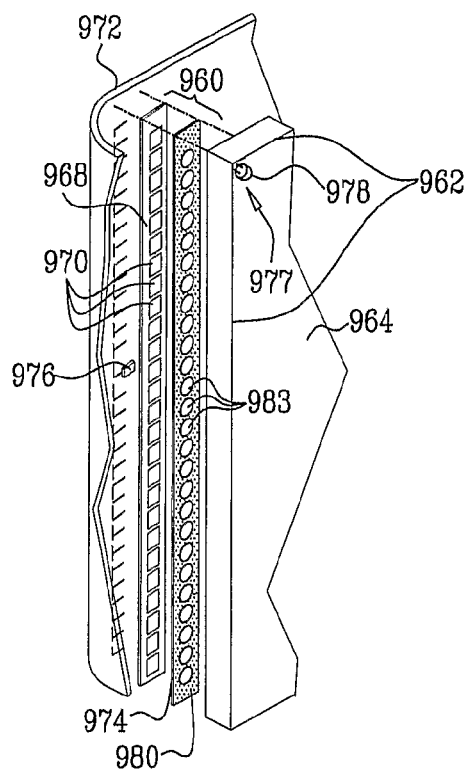

Reference is now made to FIG. 15B, in which it is seen that cover layer 974 includes a field-of-view defining mask 980 having apertures 983 formed therein in sizes and arrangements which provide desired fields-of-view for the various corresponding detector elements 970. Each detector element 970 may have associated therewith a single aperture 983 as shown or a plurality of smaller apertures.

Field-of-view limiting functionality may be desirable in this context because it enhances resolution by limiting overlap between the fields-of-view of adjacent detector elements 970. Extent of field-of-view limiting may be controlled by the size, pitch and arrangement of apertures 983 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees.

Figure 15C:
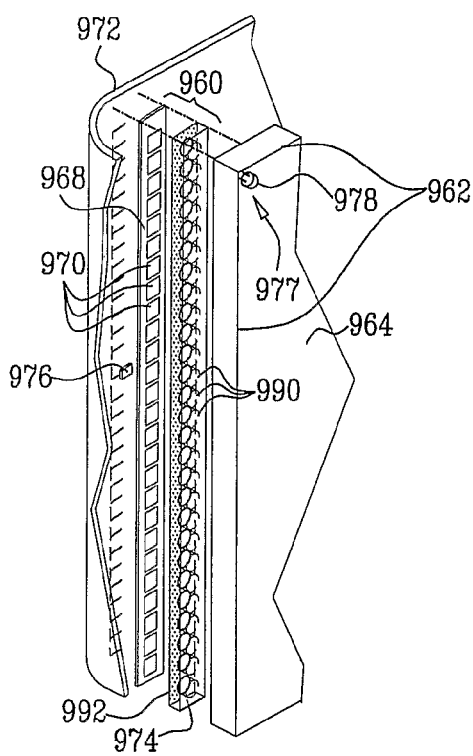

Reference is now made to FIG. 15C, which differs from that of FIG. 15B in that apertures 983 in mask 980 are replaced by light collimating tunnel-defining apertures 990 in a mask 992.

Each detector element 970 may have associated therewith a single tunnel-defining aperture 990 as shown or a plurality of smaller tunnel-defining apertures.

Field-of-view limiting functionality may be desirable in this context because it enhances resolution by limiting overlap between the fields-of-view of adjacent detector elements 970. Extent of field-of-view limiting may be controlled by the size, pitch and arrangement of apertures 990 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees.

Figure 15D:
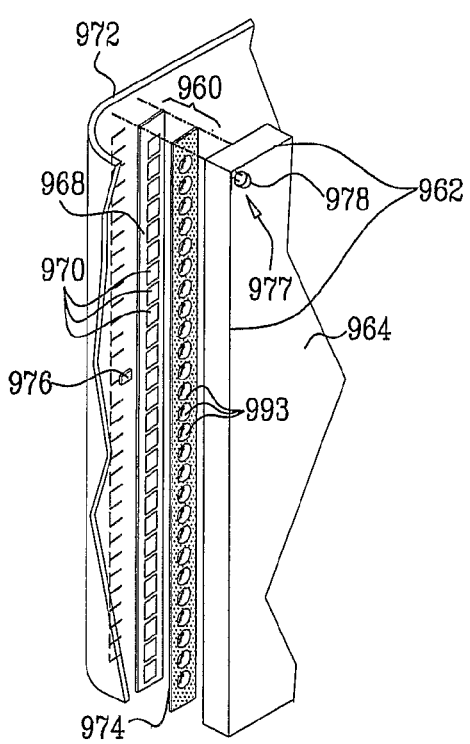

Reference is now made to FIG. 15D, which differs from that of FIGS. 15B and 15C in that the apertures in FIGS. 15B and 15C are replaced by lenses 993. Lenses 993 may be integrally formed with cover layer 974 or may be discrete elements fitted within suitably sized and positioned apertures in cover layer 974. Lenses 993 may be associated with tunnel-defining apertures or may comprise an array of microlenses aligned with one or more of detector elements 970.

Field-of-view limiting functionality may be desirable in this context because it enhances resolution by limiting overlap between the fields-of-view of adjacent detector elements 970. Extent of field-of-view limiting may be controlled by the size, pitch and arrangement of lenses 993 and their locations with respect to and distances from detector elements 970. In accordance with a preferred embodiment, the field-of-view limiting functionality limits the field-of-view of at least one of detector elements 970 to a solid angle of less than or equal to 15 degrees. In accordance with another preferred embodiment, the field-of-view limiting functionality limits the field-of-view of at least one of detector elements 970 to a solid angle of less than or equal to 7 degrees.

Reference is now made to FIGS. 16A, 16B, 16C and 16D, which are simplified illustrations of four alternative embodiments of a portion of an input device constructed and operative in accordance with yet another preferred embodiment of the present invention, employing forward-facing detector elements arranged behind edges of a display element.

In the structure of FIGS. 16A-16D, at least one detector assembly 1000 is arranged behind at least one edge 1002 of a viewing plane defining plate 1004 to sense light impinging on plate 1004 and propagating within the plate to the edges 1002 thereof. Viewing plane defining plate 1004 may be a single or multiple layer plate and may have one or more coating layers associated therewith. Preferably, detector assemblies 1000 are provided behind at least two mutually perpendicular edges 1002, though detector assemblies 1000 may be provided behind all or most of edges 1002. Alternatively, a single detector assembly 1000 may be provided behind plate 1004 at only one edge thereof.

The detector assembly 1000 includes a linear arrangement 1008 of detector elements 1010. As distinct from the embodiments of FIGS. 15A-15D, in the embodiments of FIGS. 16A-16D, the cover layer is obviated and its functionality is provided by suitable conditioning of edge 1002 of viewing plane defining plate 1004. This functionality may provide multiple functions including physical protection, light intensity limitation and field-of-view limitation, and may have optical power.

As in the embodiment of FIGS. 15A-15D, detector assembly 1000 does not comprise a support substrate onto which is mounted a linear arrangement of detector elements. In the embodiments of FIGS. 16A-16D, the support substrate of FIGS. 11A-11D is replaced by a portion of a peripheral housing 1012.

The peripheral housing 1012 may be formed of any suitable material including, for example, ceramic material, a material such as FR-4 which is commonly used for PCBs, glass, plastic or a metal such as aluminum. The peripheral housing 1012 may also provide mounting for and electrical connections to the detector elements 1010. A processor 1016 for processing the outputs of the detector elements 1010 may also be mounted on the peripheral housing 1012.

It is a particular feature of this embodiment of the present invention that the detector assembly 1000 is extremely thin, preferably under 1 mm overall. Accordingly, the linear arrangement 1008 of detector elements 1010 is preferably 100-400 microns in thickness.

The input devices shown in FIG. 16A-16D may also include a source of light which is preferably external to the input device, for example as shown in FIG. 19. Suitable external light sources include sunlight, artificial room lighting and IR illumination emitted from a human body or other heat source. In an alternate preferred embodiment, the source of light may comprise an illumination subassembly which typically includes one or more electromagnetic radiation emitting sources, here shown as a single IR emitting LED 1019. The illumination subassembly preferably forms part of the integrated display and input device. Examples of various suitable configurations of the illumination subassembly are described hereinbelow in FIGS. 18A-18F. Optionally, the light emitted by LED 1019 may be modulated by modulating circuitry (not shown).

Figure 16A:
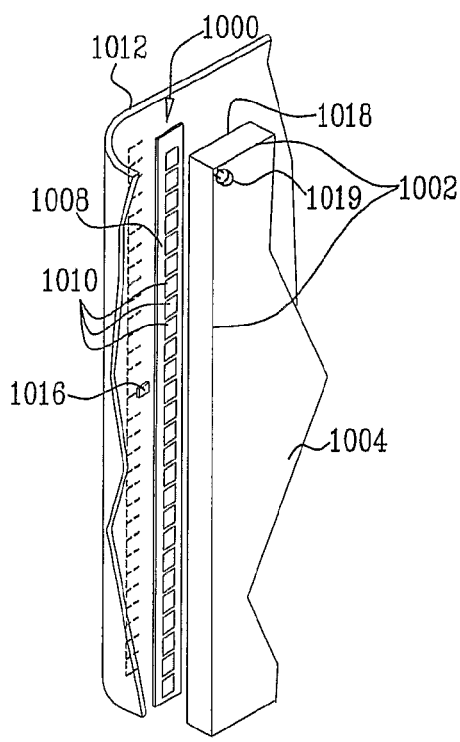
FIGS. 16A, 16B, 16C and 16D are simplified illustrations of four alternative embodiments of a portion of an input device constructed and operative in accordance with yet another preferred embodiment of the present invention, employing forward-facing detectors arranged behind edges of a display element.

In the embodiment of FIG. 16A, a rearward facing surface 1018 of plate 1004 at the edge 1002 lying in front of the linear arrangement 1008 is uniformly polished for unimpeded light transmission therethrough to linear arrangement 1008 of detector elements 1010.

Figure 16B:
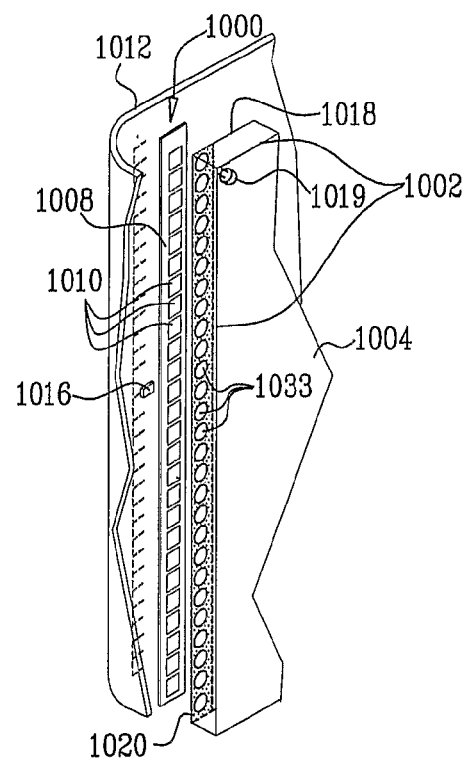

Reference is now made to FIG. 16B, in which it is seen that the rearward facing surface 1018 of plate 1004 at the edge 1002 lying in front of the linear arrangement 1008 is conditioned to define a field-of-view defining mask 1020 having apertures 1033 formed therein in sizes and arrangements which provide desired fields-of-view for the various corresponding detector elements 1010. Each detector element 1010 may have associated therewith a single aperture 1033 as shown or a plurality of smaller apertures.

Field-of-view limiting functionality may be desirable in this context because it enhances resolution by limiting overlap between the fields-of-view of adjacent detector elements 1010. Extent of field-of-view limiting may be controlled by the size, pitch and arrangement of apertures 1033 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Figure 16C:
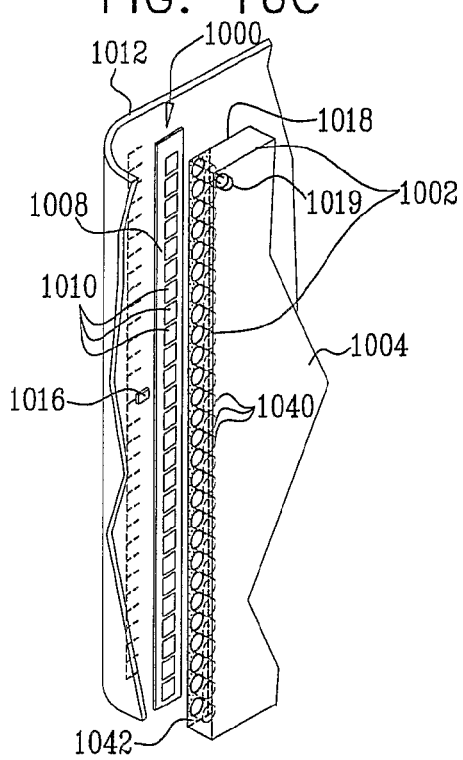

Reference is now made to FIG. 16C, which differs from that of FIG. 16B in that apertures 1033 in mask 1020 are replaced by light collimating tunnel-defining apertures 1040 in a mask 1042.

Each detector element 1010 may have associated therewith a single tunnel-defining aperture 1040, as shown, or a plurality of smaller tunnel-defining apertures.

Field-of-view limiting functionality may be desirable in this context because it enhances resolution by limiting overlap between the fields-of-view of adjacent detector elements 1010. Extent of field-of-view limiting may be controlled by the size, pitch and arrangement of apertures 1040 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Figure 16D:
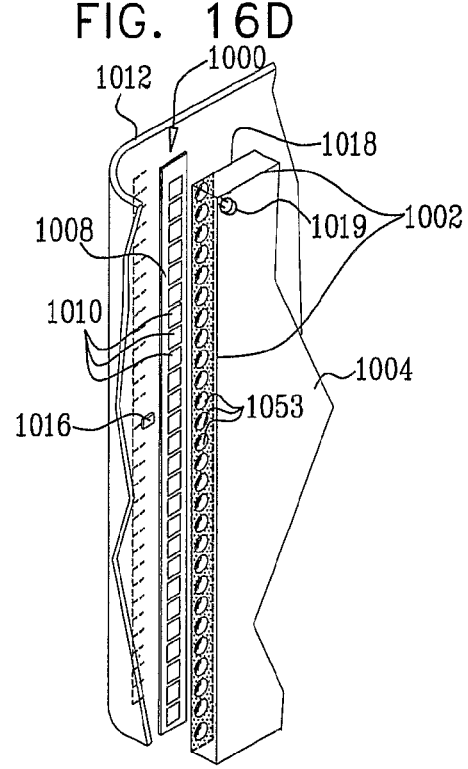

Reference is now made to FIG. 16D, which differs from that of FIGS. 16B and 16C in that the apertures in FIGS. 16B and 16C are replaced by lenses 1053. Lenses 1053 may be integrally formed at edges 1002 or may be discrete elements fitted within suitably sized and positioned apertures in plate 1004. Lenses 1053 may be associated with tunnel-defining apertures or may comprise an array of microlenses aligned with one or more of detector elements 1010.

Field-of-view limiting functionality may be desirable in this context because it enhances resolution by limiting overlap between the fields-of-view of adjacent detector elements 1010. Extent of field-of-view limiting may be controlled by the size, pitch and arrangement of lenses 1053 and their locations with respect to and distances from detector elements 1010. In accordance with a preferred embodiment, the field-of-view limiting functionality limits the field-of-view of at least one of detector elements 1010 to a solid angle of less than or equal to 15 degrees. In accordance with another preferred embodiment, the field-of-view limiting functionality limits the field-of-view of at least one of detector elements 1010 to a solid angle of less than or equal to 7 degrees.

Figure 17A:
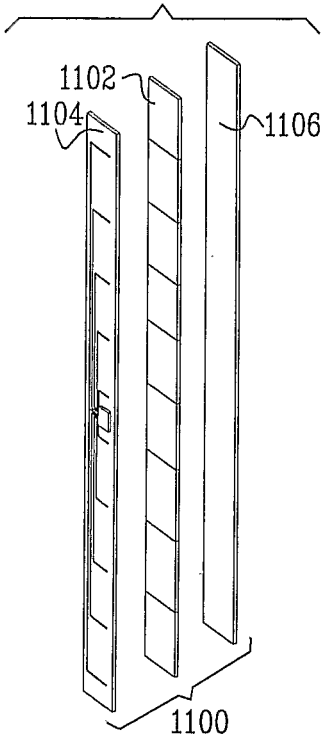
FIGS. 17A, 17B and 17C are simplified illustrations of three alternative embodiments of a detector assembly forming part of an integrated display and input device constructed and operative in accordance with a preferred embodiment of the present invention.
Figure 17B:
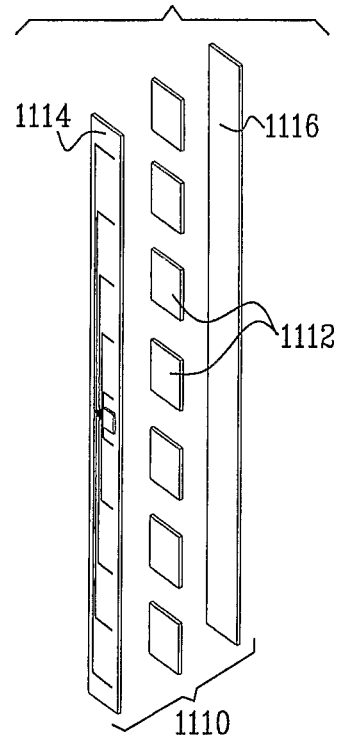
Figure 17C:
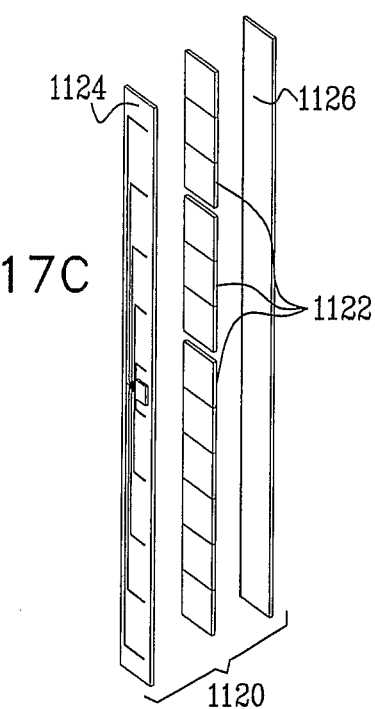

Reference is now made to FIGS. 17A, 17B and 17C, which are simplified illustration of three alternative embodiments of a detector assembly forming part of an integrated display and input device constructed and operative in accordance with a preferred embodiment of the present invention.

In the structure of FIGS. 17A-17C, at least one detector assembly is arranged about at least one edge (not shown) of a viewing plane defining plate (not shown). The detector assemblies of FIGS. 17A-17C may be employed in any of the embodiments of the present invention described hereinabove and illustrated in FIGS. 1A-16D. Preferably, detector assemblies are provided along at least two mutually perpendicular edges of the plate, though detector assemblies may be provided along all or most of the edges. Alternatively, a single detector assembly may be provided along only one edge of the plate.

In accordance with a preferred embodiment of the present invention, the detector assembly comprises a support substrate onto which is mounted a linear arrangement of detector elements. Preferably, a cover layer is placed over the arrangement of detector elements and may provide multiple functions including physical protection, light intensity limitation and field-of-view limitation, and may have optical power.

The support substrate may be mounted onto a display housing (not shown) or may be integrally formed therewith. The support substrate may alternatively be mounted onto an edge of the plate. The support substrate may be formed of a ceramic material, a material such as FR-4 which is commonly used for PCBs, glass, plastic or a metal such as aluminum. The support substrate may also provide mounting for and electrical connections to the detector elements. A processor for processing the outputs of the detector elements may also be mounted on the support substrate.

It is a particular feature of this embodiment of the present invention that the detector assembly is extremely thin, preferably under 1 mm overall. Accordingly, the support substrate is preferably 50-200 microns in thickness and the linear arrangement of detector elements is preferably 100-400 microns in thickness and the cover layer is preferably 100-500 microns in thickness.

In the embodiment of FIG. 17A, the detector assembly, here designated by reference numeral 1100, includes an integrally formed multi-element detector array 1102. The detector array 1102 is preferably mounted onto a support substrate 1104 and overlaid with a cover layer 1106.

In the embodiment of FIG. 17B, the detector assembly, here designated by reference numeral 1110, includes a plurality of discrete single-element detector elements 1112 such as Solderable Silicon Photodiodes commercially available from Advanced Photonix Incorporated of Camarillo, Calif., USA under catalog designator PDB-C601-1. The discrete detector elements 1112 are preferably mounted onto a support substrate 1114 and overlaid with a cover layer 1116.

In the embodiment of FIG. 17C, the detector assembly, here designated by reference numeral 1120, includes a plurality of discrete multi-element detector elements 1122. The discrete multi-element detector elements 1122 need not be all of the same size and are preferably all mounted onto a support substrate 1124 and overlaid with a cover layer 1126.

Reference is now made to FIGS. 18A, 18B, 18C, 18D, 18E and 18F, which are simplified illustrations of four alternative embodiments of an illumination subassembly forming part of an integrated display and input device constructed and operative in accordance with preferred embodiments of the present invention. Alternatively or additionally, a touch responsive input functionality may preferably be operative to detect the position of a stylus (not shown) or any other suitable reflective object.

FIGS. 18A-18F show an integrated display and input device having touch responsive input functionality, which is useful for application selection and operation, such as email communication and internet surfing. The input functionality may incorporate any one or more features of assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

FIGS. 18A-18F illustrate object detection functionality of the type described hereinabove with reference to FIGS. 1A to 1D. As shown, a position of a user's finger is detected by means of a touch responsive input functionality operative in accordance with preferred embodiments of the present invention.

Figure 18A:
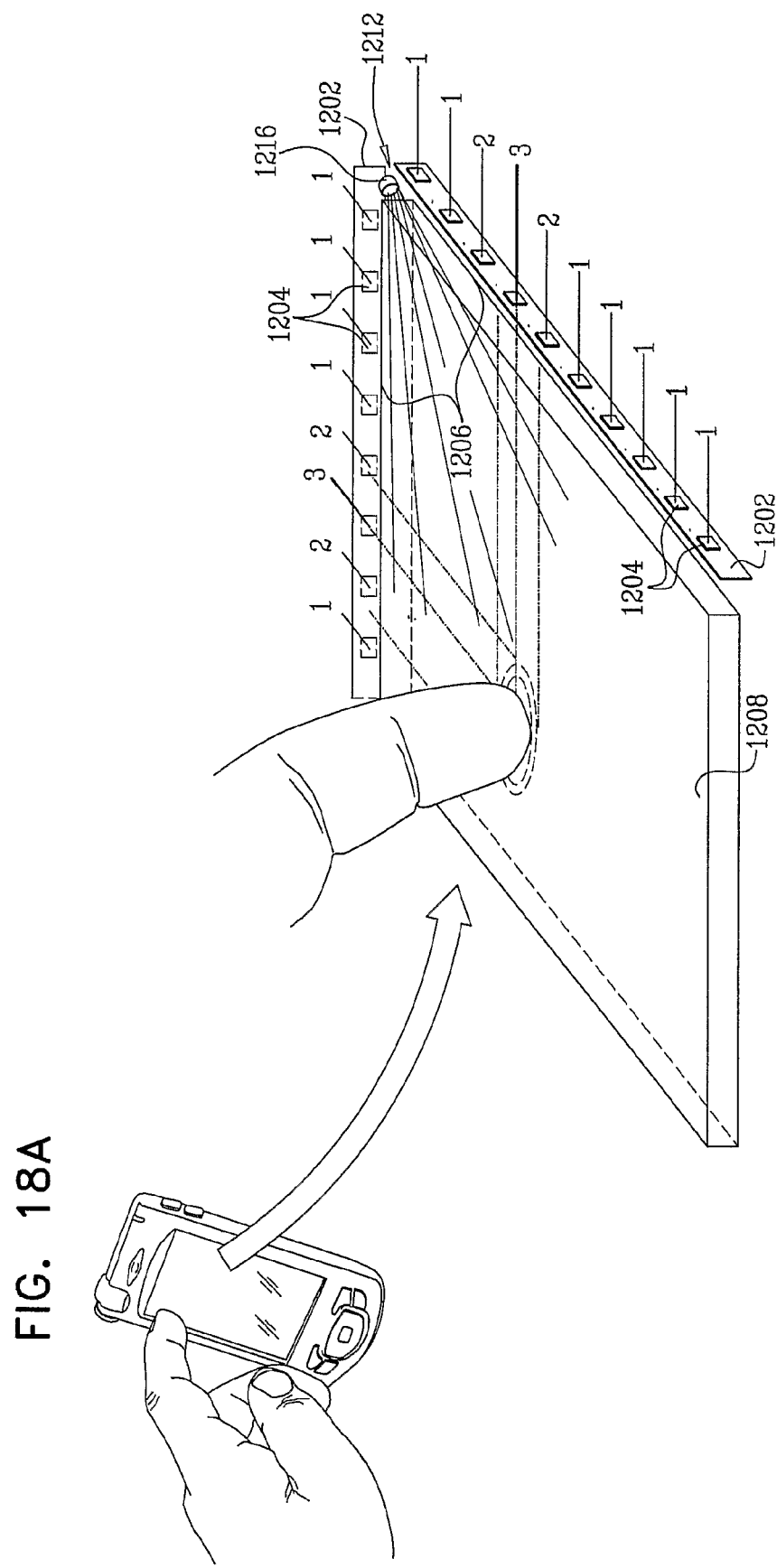
Figure 19:
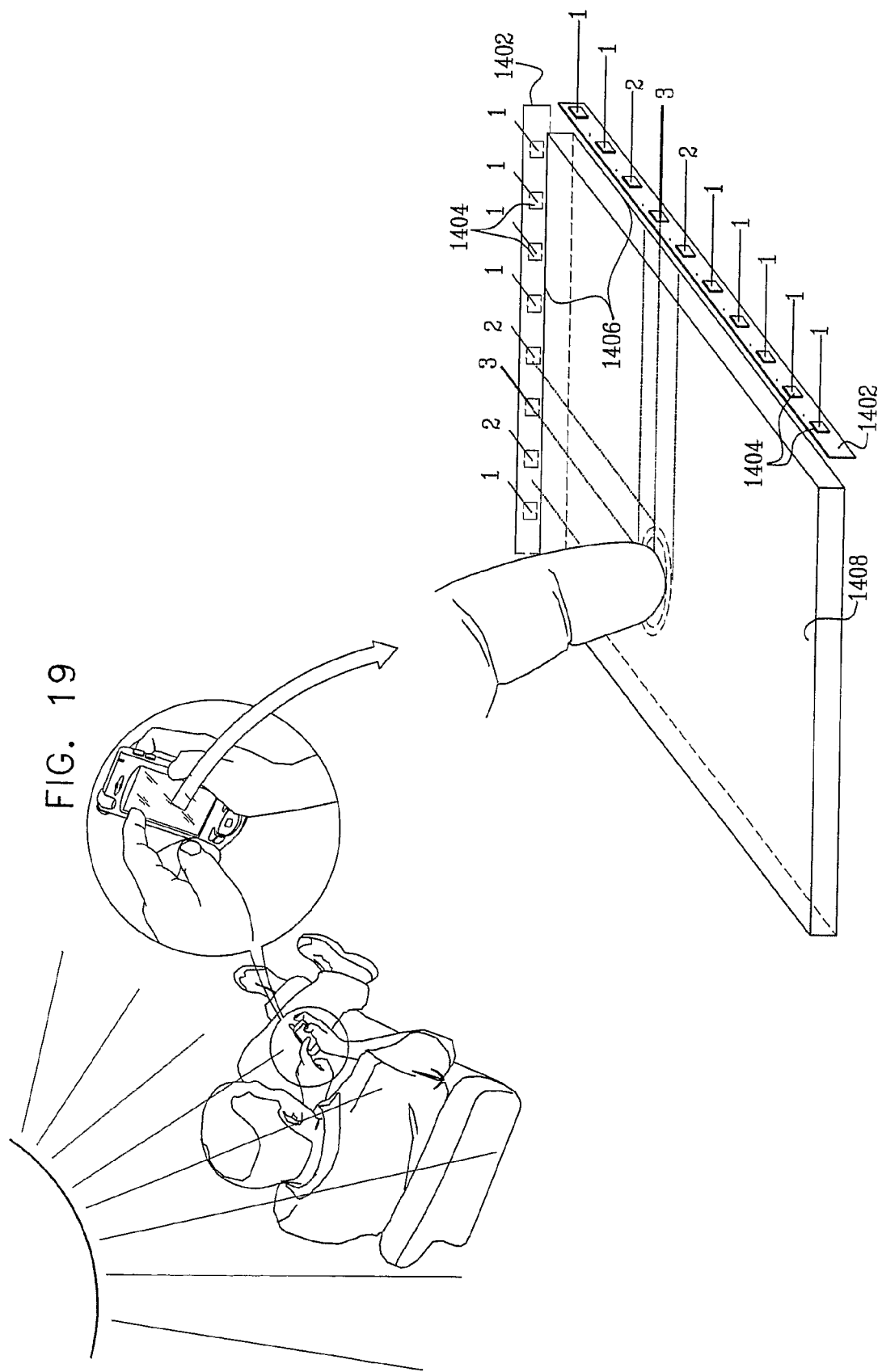
FIG. 19 is a simplified illustration of an integrated display and input device constructed and operative in accordance with a preferred embodiment of the present invention, utilizing electromagnetic radiation from a source external to the integrated display and input device.

Turning specifically to FIG. 18A, it is seen that arrays 1202 of light detector elements 1204 are arranged at least two mutually perpendicular edge surfaces 1206 of a viewing plane defining plate 1208. Alternatively, detector arrays 1202 may be provided along all or most of the edges 1206. As a further alternative, a single detector array 1202 may be provided along only one edge 1206 of the plate 1208. Viewing plane defining plate 1208 may be a single or multiple layer plate and may have one or more coating layers associated therewith.

It is to be appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18A preferably includes an illumination subassembly 1212 which typically includes one or more electromagnetic radiation emitting sources. The illumination subassembly 1212 preferably provides a baseline illumination level which is typically detected by detector elements 1204.

In accordance with a preferred embodiment of the present invention, shown in FIG. 18A, a single IR emitting LED 1216 is provided at or generally adjacent to an intersection of the mutually perpendicular edges 1206 along which detector elements 1214 are arranged. The LED 1216 is arranged such that light emitted therefrom is projected generally across the surface of plate 1208. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1216 may be affected by the specific placement of LED 1216 relative to detector arrays 1202 and the interaction between a light beam emitted from the LED 1216 and the various components of the integrated display and input device, including the plate 1208, the detector elements 1204 and other layers of the integrated display and input device. Optionally, the light emitted by LED 1216 may be modulated by modulating circuitry (not shown).

Light, preferably including light in the IR band emitted by illumination subassembly 1212, is reflected from a user's finger, a stylus (not shown) or any other suitable reflective object, touching or located in propinquity to plate 1208. The reflected light is propagated within plate 1208 and is detected by one or more of detector elements 1204. Alternatively or additionally, the reflected light is propagated above the surface of plate 1208 and is detected by one or more of detector elements 1204, which may extend slightly above edge surfaces 1206. Furthermore, additionally or alternatively, the reflected light may propagate or be transmitted through plate 1208 directly to one or more of detector elements 1204 and detected thereby.

When the user's finger touches or is located in propinquity to plate 1208, the light reflected from the finger is detected by one or more of detector elements 1204, as described hereinabove, in addition to the baseline level of light detected by the detector elements 1204. Detector analyzing processing circuitry (not shown) preferably receives outputs of the detector elements 1204 on detector arrays 1202, digitally processes these outputs and determines whether the absolute amount of light detected by each of the detector elements 1204 or the change in the amount of light detected by each of the detector elements 1204 exceeds a predetermined threshold.

The amount of light detected by the individual detector elements 1204 on a given detector array 1202, as determined by the detector analyzing processing circuitry, is further processed to provide an array detection output. The array detection output includes information corresponding to the location of an impingement point of the user's finger relative to the given detector array 1202. Typically, the location of at least one detector element 1204, in which the amount of light measured or the change in the amount of light measured exceeds a predetermined threshold, corresponds to the location of the user's finger along an axis parallel to the given detector array 1202.

In the configuration shown in FIG. 18A, two-dimensional location determining circuitry (not shown) preferably calculates the two-dimensional position of the impingement point of the user's finger on or above plate 1208 by combining the array detection outputs of at least two detector arrays, typically arranged along at least two mutually perpendicular edges 1206 of plate 1208.

Reference is now made to FIG. 18B, which shows arrays 1222 of light detector elements 1224 arranged at least two mutually perpendicular edge surfaces 1226 of a viewing plane defining plate 1228. Alternatively, detector arrays 1222 may be provided along all or most of the edges 1226. As a further alternative, a single detector array 1222 may be provided along only one edge 1226 of the plate 1228. Viewing plane defining plate 1228 may be a single or multiple layer plate and may have one or more coating layers associated therewith.

It is to be appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18B preferably includes an illumination subassembly 1232 which typically includes one or more electromagnetic radiation emitting sources. The illumination subassembly 1232 preferably provides a baseline illumination level which is typically detected by detector elements 1224.

In accordance with a preferred embodiment of the present invention, shown in FIG. 18B, a single IR emitting LED 1236 is provided at or generally adjacent to an intersection of mutually perpendicular edges 1226 along which detector elements 1224 are not arranged. The LED 1236 is arranged such that light emitted therefrom is projected generally across the surface of plate 1228. A suitable IR emitting LED is, for example, an IR-emitting SMD-LED commercially available from OSA Opto Light GmbH of Berlin, Germany under catalog designator OIS-210-X-T. It is appreciated that selection of a specific shape and size of LED 1236 may be affected by the specific placement of LED 1236 relative to detector arrays 1222 and the interaction between a light beam emitted from the LED 1236 and the various components of the integrated display and input device, including the plate 1228, the detector elements 1224 and other layers of the integrated display and input device. Optionally, the light emitted by LED 1236 may be modulated by modulating circuitry (not shown).

Light, preferably including light in the IR band emitted by illumination subassembly 1232, is propagated generally across the surface of plate 1228 and is detected by one or more of detector elements 1224. Alternatively or additionally, the light is propagated above the surface of plate 1228 and is detected by one or more of detector elements 1224, which may optionally extend slightly above edge surfaces 1226. Furthermore, additionally or alternatively, the light may propagate or be transmitted through plate 1228 directly to one or more of detector elements 1224 and detected thereby.

The light is deflected by a user's finger, a stylus (not shown) or any other suitable object, touching or located in propinquity to plate 1228. When the user's finger touches or is located in propinquity to plate 1228, the amount of light detected by one or more of detector elements 1224 is typically reduced relative to the baseline level of light detected by the detector elements 1224. Detector analyzing processing circuitry (not shown) preferably receives outputs of the detector elements 1224 on detector arrays 1222, digitally processes these outputs and determines whether the absolute amount of light detected by each of the detector elements 1224 is below a predetermined threshold, or whether the change in the amount of light detected by each of the detector elements 1224 exceeds a predetermined threshold.

The amount of light detected by the individual detector elements 1224 on a given detector array 1222, as determined by the detector analyzing processing circuitry, is further processed to provide an array detection output. The array detection output includes information corresponding to the location of an impingement point of the user's finger relative to the given detector array 1222. Typically, the location of at least one detector element 1224, in which the amount of light measured is below a predetermined threshold or the change in the amount of light measured exceeds a predetermined threshold, corresponds to the location of the user's finger along an axis parallel to the given detector array 1222.

In the configuration shown in FIG. 18B, two-dimensional location determining circuitry (not shown) preferably calculates the two-dimensional position of the impingement point of the user's finger on or above plate 1228 by combining the array detection outputs of at least two detector arrays, typically arranged along at least two mutually perpendicular edges 1226 of plate 1228.

Figure 18C:
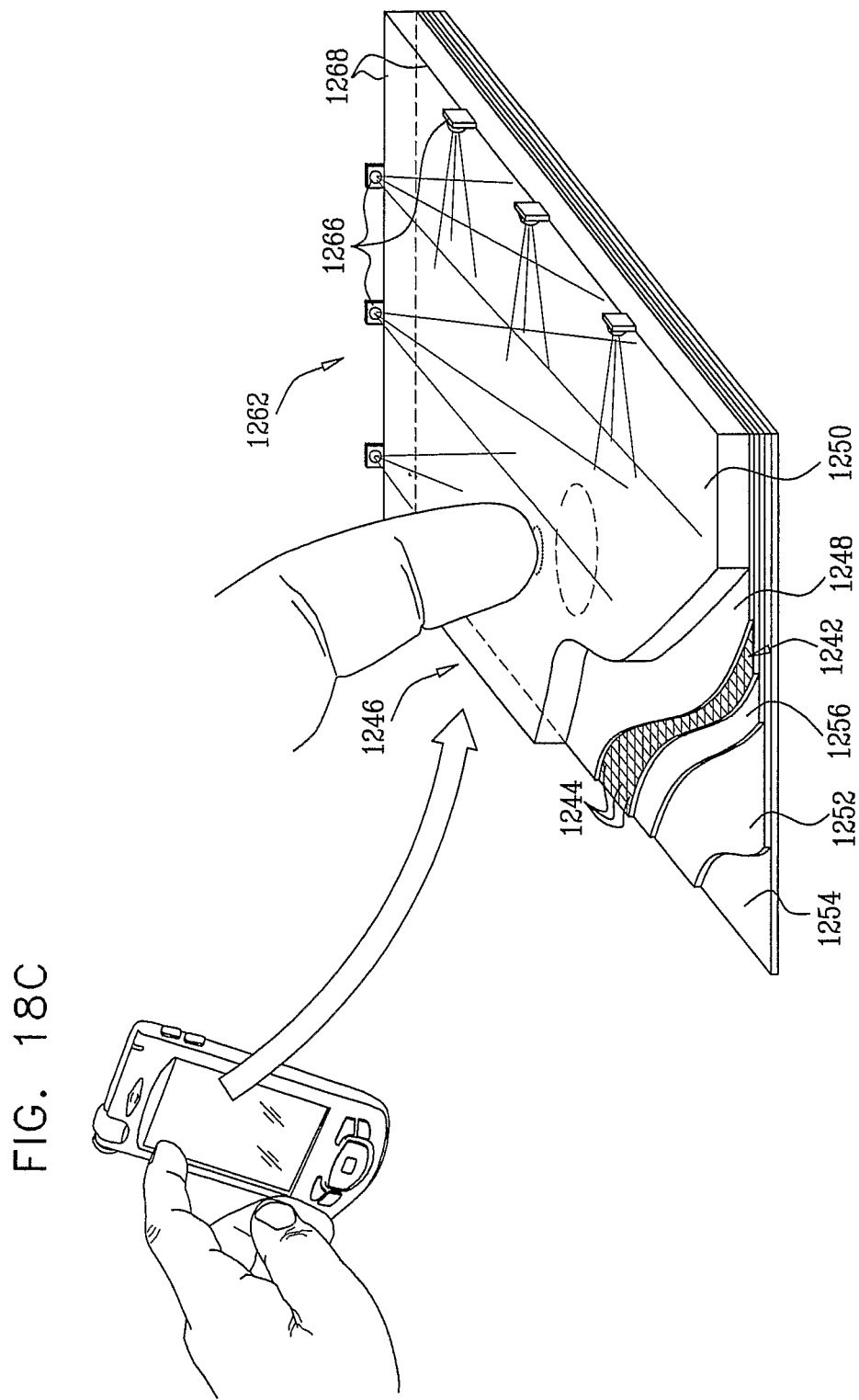

Reference is now made to FIG. 18C, which shows an array 1242 of detector elements 1244 arranged in a plane, parallel to a viewing plane 1246. As seen in FIG. 18C, in one example of a display and input device structure, detector array 1242 is arranged behind an IR transmissive display panel 1248, such as a panel including LCD or OLED elements, underlying a viewing plane defining plate 1250. In accordance with a preferred embodiment of the present invention the array 1242 is formed of a plurality of discrete detector elements 1244 placed on a plane integrally formed therewith. Alternatively, the array 1242 may be formed of one or more CCD or CMOS arrays, or may created by photolithography.

Viewing plane defining plate 1250 may be a single or multiple layer plate and may have one or more coating layers associated therewith. In one example of an integrated display and input system employing an LCD, there are provided one or more light diffusing layers 1252 overlying a reflector 1254. One or more collimating layers 1256 are typically interposed between reflector 1254 and IR transmissive display panel 1248.

The integrated display and input device shown in FIG. 18C preferably includes an illumination subassembly 1262 which typically includes one or more electromagnetic radiation emitting sources. The illumination subassembly 1262 preferably provides a baseline illumination level which is typically detected by detector elements 1244.

In accordance with a preferred embodiment of the present invention, shown in FIG. 18C, a generally linear arrangement of multiple IR emitting LEDs 1266 is provided, in parallel with one or more of edges 1268 of the integrated display and input device. The LEDs 1266 are arranged such that light emitted therefrom is projected generally across the surface of plate 1208. Suitable IR emitting LEDs are, for example, IR-emitting SMD-LEDs commercially available from OSA Opto Light GmbH of Berlin, Germany under catalog designator OIS-210-X-T. It is appreciated that selection of a specific shapes and sizes of LEDs 1266 may be affected by the specific placement of the LEDs 1266 relative to array 1242 and the interaction between light beams emitted from the LEDs 1266 and the various components of the integrated display and input device, including the plate 1250, the detector elements 1244, the diffusing layers 1252, collimating layers 1256, reflecting layers 1254 and other layers of the integrated display and input device. Optionally, the light emitted by LEDs 1266 may be modulated by modulating circuitry (not shown).

Light, preferably including light in the IR band emitted by illumination subassembly 1262, is reflected from a user's finger, a stylus (not shown) or any other suitable reflective object, touching or located in propinquity to plate 1250. The reflected light is propagated through plate 1250 and is detected by one or more of detector elements 1244.

When the user's finger touches or is located in propinquity to plate 1250, the light reflected from the finger is detected by one or more of detector elements 1244, as described hereinabove, in addition to the baseline level of light detected by the detector elements 1244. Detector analyzing processing circuitry (not shown) preferably receives outputs of the detector elements 1244 on detector array 1242, digitally processes these outputs and determines whether the absolute amount of light detected by each of the detector elements 1244 or the change in the amount of light detected by each of the detector elements 1244 exceeds a predetermined threshold.

The amount of light detected by the individual detector elements 1244 as determined by the detector analyzing processing circuitry, is further processed to provide an array detection output. The array detection output includes information corresponding to the location of an impingement point of the user's finger relative to array 1242. Typically, the location of at least one detector element 1244, in which the amount of light measured or the change in the amount of light measured exceeds a predetermined threshold, corresponds to the two-dimensional location of the user's finger in a plane parallel to array 1242.

In the configuration shown in FIG. 18C, optional three-dimensional location determining circuitry (not shown) may be provided to calculate the three-dimensional (X, Y, Z and/or angular orientation) position of the impingement point of the user's finger on or above plate 1250 by processing the detector element outputs of at least two detector elements to define the shape and size of an impingement area, as described in assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

Figure 18D:
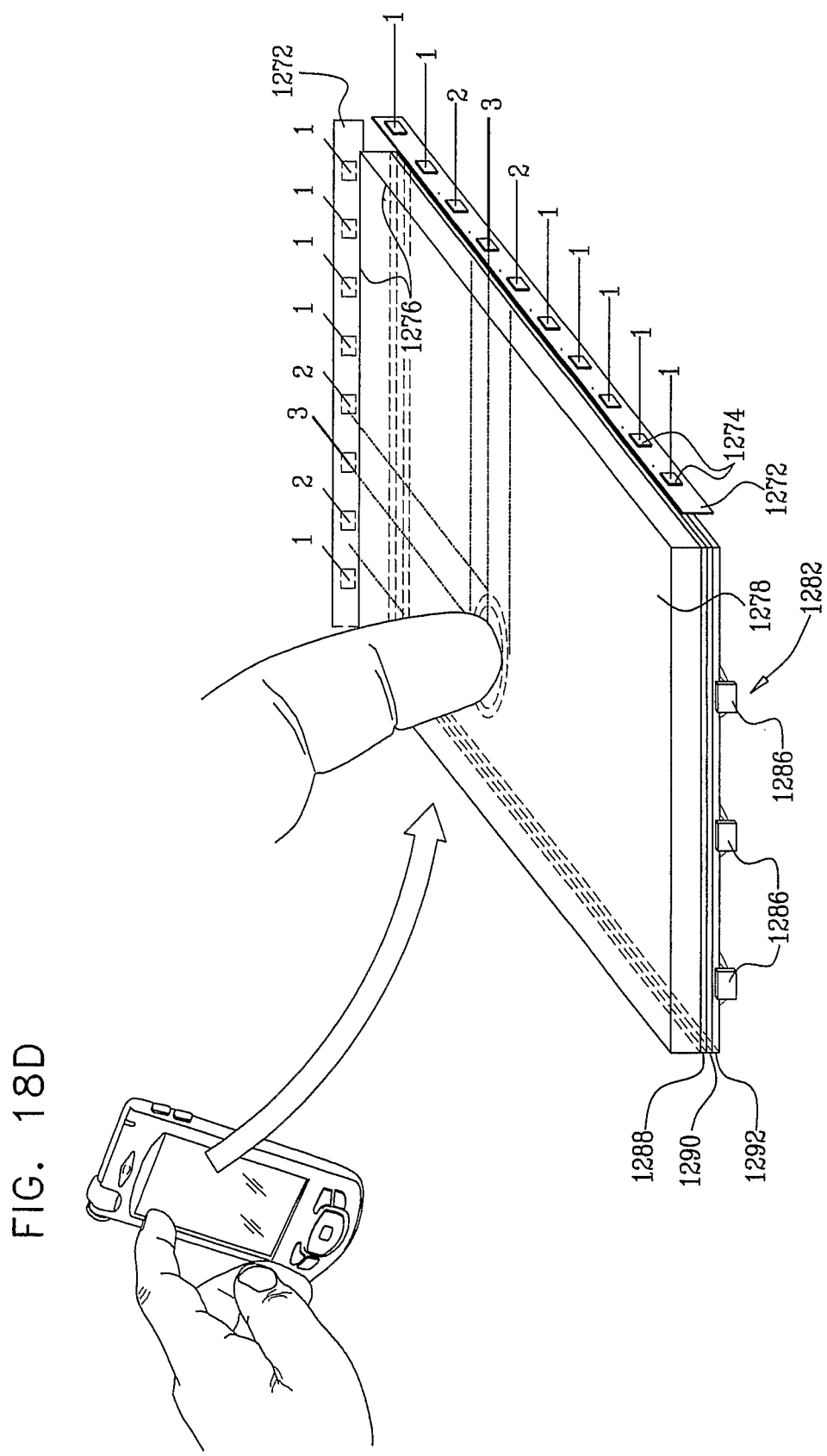

Reference is now made FIG. 18D, which shows arrays 1272 of light detector elements 1274 arranged at least two mutually perpendicular edge surfaces 1276 of a viewing plane defining plate 1278. Alternatively, detector arrays 1272 may be provided along all or most of the edges 1276. As a further alternative, a single detector array 1272 may be provided along only one edge 1276 of the plate 1278. Viewing plane defining plate 1278 may be a single or multiple layer plate and may have one or more coating layers associated therewith. Optionally, one or more of detector arrays 1272 may be arranged such that the detector elements 1274 thereof extend slightly above the surface of viewing plane defining plate 1278.

It is to be appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18D preferably includes an illumination subassembly 1282 which typically includes one or more electromagnetic radiation emitting sources. The illumination subassembly 1282 preferably provides a baseline illumination level which is typically detected by detector elements 1274.

In accordance with a preferred embodiment of the present invention, shown in FIG. 18D, one or more IR emitting LEDs 1286 is provided at, generally adjacent to, or interspersed among, a linear arrangement of display backlight LEDs (not shown), typically provided underlying and aligned with edges of a plane of an IR transmissive display panel 1288, such as an LCD or OLED, which underlies and is generally parallel to a viewing plane defining plate 1278.

A suitable IR emitting LED is, for example, an SMD type IR GaAs LED commercially available from Marubeni America Corporation of Santa Clara, Calif., USA under catalog designator SMC940. It is appreciated that selection of a specific shapes and sizes of LEDs 1286 may be affected by the specific placement of LEDs 1286 relative to detector arrays 1272 and the interaction between light beams emitted from the LEDs 1286, light beams emitted from other backlight LEDs, and the various components of the integrated display and input device, including backlight LEDs, the plate 1278, the detector elements 1274 and other layers of the integrated display and input device. Optionally, the light emitted by LED 1286 may be modulated by modulating circuitry (not shown).

In one preferred embodiment of the present invention, the detector elements 1274 are operative to detect visible wavelengths of light emitted from visible light-emitting backlight LEDs. In another preferred embodiment of the present invention, backlight LEDs are selected to provide both IR and visible light wavelength emanations.

The IR emitting LEDs 1286 are arranged such that light emitted therefrom is projected generally through one or more diffusing and/or collimating layers 1290 typically underlying the IR transmissive display panel 1288. The IR emitting LEDs 1286 may additionally or alternatively be arranged such that light emitted therefrom is reflected by one or more reflecting layers 1292, underlying and generally parallel to the plane of the IR transmissive display panel 1288. Typically, both diffusing layers 1290 and reflecting layers 1292 are provided, to aid in propagating the backlight and IR light through the transmissive display panel 1288.

Light, preferably including light in the IR band emitted by illumination subassembly 1282, is reflected from a user's finger, a stylus (not shown) or any other suitable reflective object, touching or located in propinquity to plate 1278. The reflected light is propagated within plate 1278 and is detected by one or more of detector elements 1274. Alternatively or additionally, the reflected light is propagated above the surface of plate 1278 and is detected by one or more of detector elements 1274, which may extend slightly above edge surfaces 1276. Furthermore, additionally or alternatively, the reflected light may propagate or be transmitted through plate 1278 directly to one or more of detector elements 1274 and detected thereby.

When the user's finger touches or is located in propinquity to plate 1278, the light reflected from the finger is detected by one or more of detector elements 1274, as described hereinabove, in addition to the baseline level of light detected by the detector elements 1274. Detector analyzing processing circuitry (not shown) preferably receives outputs of the detector elements 1274 on detector arrays 1272, digitally processes these outputs and determines whether the absolute amount of light detected by each of the detector elements 1274 or the change in the amount of light detected by each of the detector elements 1274 exceeds a predetermined threshold.

The amount of light detected by the individual detector elements 1274 on a given detector array 1272, as determined by the detector analyzing processing circuitry, is further processed to provide an array detection output. The array detection output includes information corresponding to the location of an impingement point of the user's finger relative to the given detector array 1272. Typically, the location of at least one detector element 1274, in which the amount of light measured or the change in the amount of light measured exceeds a predetermined threshold, corresponds to the location of the user's finger along an axis parallel to detector array 1272.

In the configuration shown in FIG. 18D, two-dimensional location determining circuitry (not shown) preferably calculates the two-dimensional position of the impingement point of the user's finger on or above plate 1278 by combining the array detection outputs of at least two arrays, typically arranged along at least two mutually perpendicular edges 1276 of plate 1278.

Figure 18E:
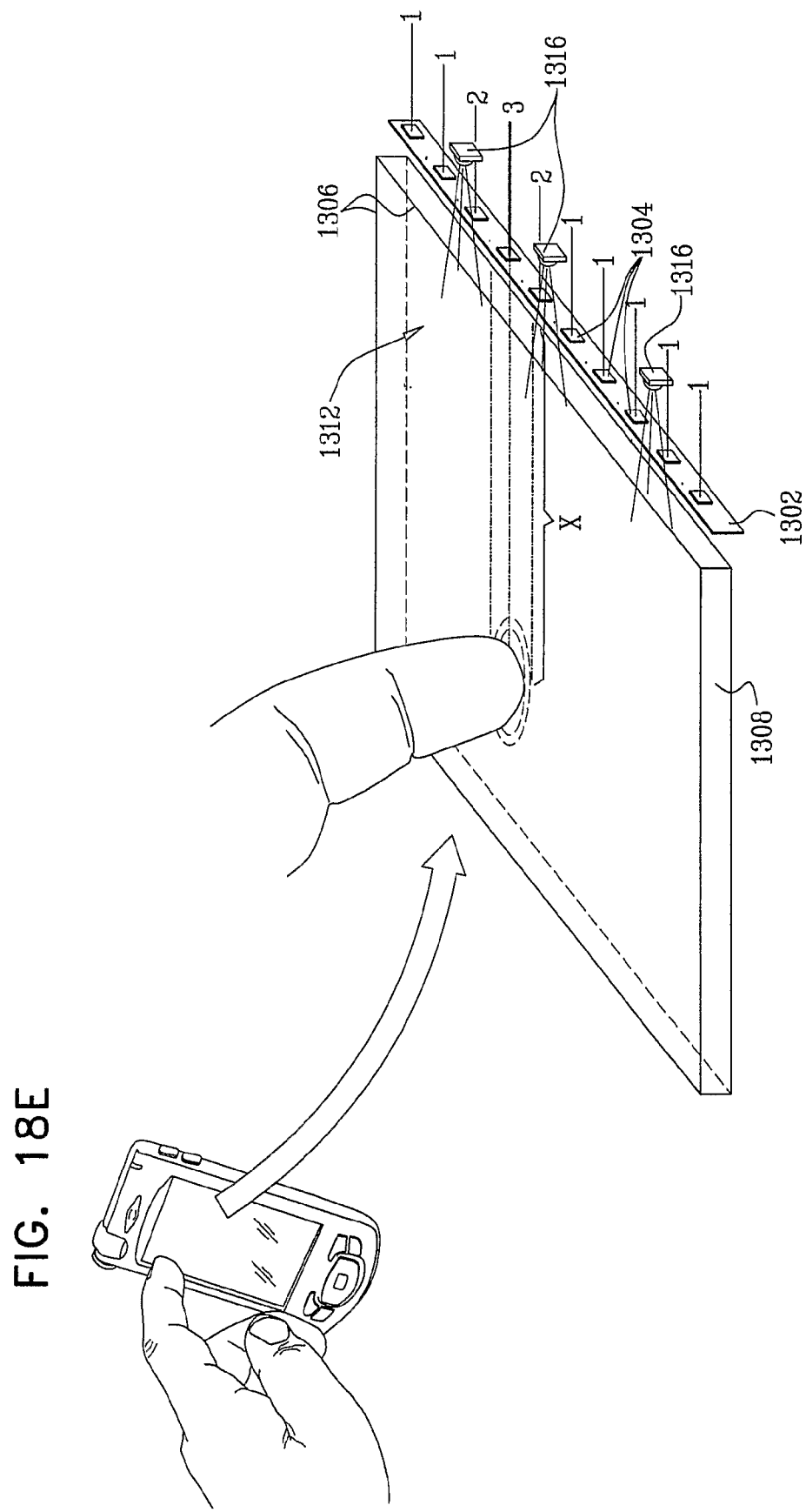

Reference is now made to FIG. 18E, which shows a single array 1302 of light detector elements 1304 arranged at an edge surface 1306 of a viewing plane defining plate 1308. Viewing plane defining plate 1308 may be a single or multiple layer plate and may have one or more coating layers associated therewith.

It is to be appreciated that the phrase "at an edge" is to be interpreted broadly as including structures which are located behind an edge, as in the embodiments shown in FIGS. 10A-10D, 11A-11D, 15A-15D and 16A-16D, about an edge as in the embodiments shown in FIGS. 9A-9D and 14A-14D, and along an edge as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, Calif., USA under catalog designator PDB-C601-1.

The integrated display and input device shown in FIG. 18E preferably includes an illumination subassembly 1312 which typically includes one or more electromagnetic radiation emitting sources. The illumination subassembly 1312 preferably provides a baseline illumination level which is typically detected by detector elements 1304.

In accordance with a preferred embodiment of the present invention, shown in FIG. 18E, a generally linear arrangement of multiple IR emitting LEDs 1316 is provided, in parallel with one or more of edges 1306. The LEDs 1316 are arranged such that light emitted therefrom is projected generally across the surface of plate 1308. Illumination subassembly 1312 may be arranged in parallel to detector array 1302, at an edge perpendicular to detector array 1302, or may be arranged at an edge opposite or otherwise not adjacent or perpendicular to detector array 1302.

Suitable IR emitting LEDs are, for example, the IR-emitting SMD-LEDs commercially available from OSA Opto Light GmbH of Berlin, Germany under catalog designator OIS-210-X-T. It is appreciated that selection of a specific shapes and sizes of LEDs 1316 may be affected by the specific placement of the illumination subassembly 1312 relative to detector array 1302 and the interaction between light beams emitted from the LEDs 1316 and the various components of the integrated display and input device, including the plate 1308, the detector elements 1304 and other layers of the integrated display and input device. Optionally, the light emitted by LEDs 1316 may be modulated by modulating circuitry (not shown).

Light, preferably including light in the IR band emitted by illumination subassembly 1312, is reflected from a user's finger, a stylus (not shown) or any other suitable reflective object, touching or located in propinquity to plate 1308. The reflected light is propagated within plate 1308 and is detected by one or more of detector elements 1304. Alternatively or additionally, the reflected light is propagated above the surface of plate 1308 and is detected by one or more of detector elements 1304, which may extend slightly above edge surfaces 1306. Furthermore, additionally or alternatively, the reflected light may propagate or be transmitted through plate 1308 directly to one or more of detector elements 1304 and detected thereby.

When the user's finger touches or is located in propinquity to plate 1308, the light reflected from the finger is detected by one or more of detector elements 1304, as described hereinabove, in addition to the baseline level of light detected by the detector elements 1304. Detector analyzing processing circuitry (not shown) preferably receives outputs of the detector elements 1304 on detector array 1302, digitally processes these outputs and determines whether the absolute amount of light detected by each of the detector elements 1304 or the change in the amount of light detected by each of the detector elements 1304 exceeds a predetermined threshold.

The amount of light detected by the individual detector elements 1304 on array 1302, as determined by the detector analyzing processing circuitry, is further processed to provide an array detection output. The array detection output includes information corresponding to the location of an impingement point of the user's finger relative to detector array 1302. Typically, the location of at least one detector element 1304, in which the amount of light measured or the change in the amount of light measured exceeds a predetermined threshold, corresponds to the location of the user's finger along an axis parallel to array 1302.

In the configuration shown in FIG. 18E, two-dimensional location determining circuitry (not shown) preferably calculates the two-dimensional position of the impingement point of the user's finger on or above plate 1308 by further utilizing the array detection output and the information corresponding to the location of the impingement point of the user's finger relative to the array included therein, as described hereinbelow.

Whereas the location of at least one detector element 1304 on array 1302, in which the amount of light measured or the change in the amount of light measured exceeds a predetermined threshold, corresponds to the location of the user's finger along an axis parallel to array 1302, the strength of the signal output of that detector element 1304 decreases as the distance of the impingement point of the user's finger from array 1302 along an axis generally perpendicular to the axis of the array 1302 increases. Conversely, the strength of the signal output of the detector element 1304 increases as the distance of the impingement point of the user's finger from array 1302 along an axis generally perpendicular to the axis of the array 1302 decreases. These characteristics of the various components of the integrated display and input device are employed by the two-dimensional location determining circuitry to calculate the two-dimensional position of the impingement point of the user's finger on the plate 1308 or above it.

Figure 18F:
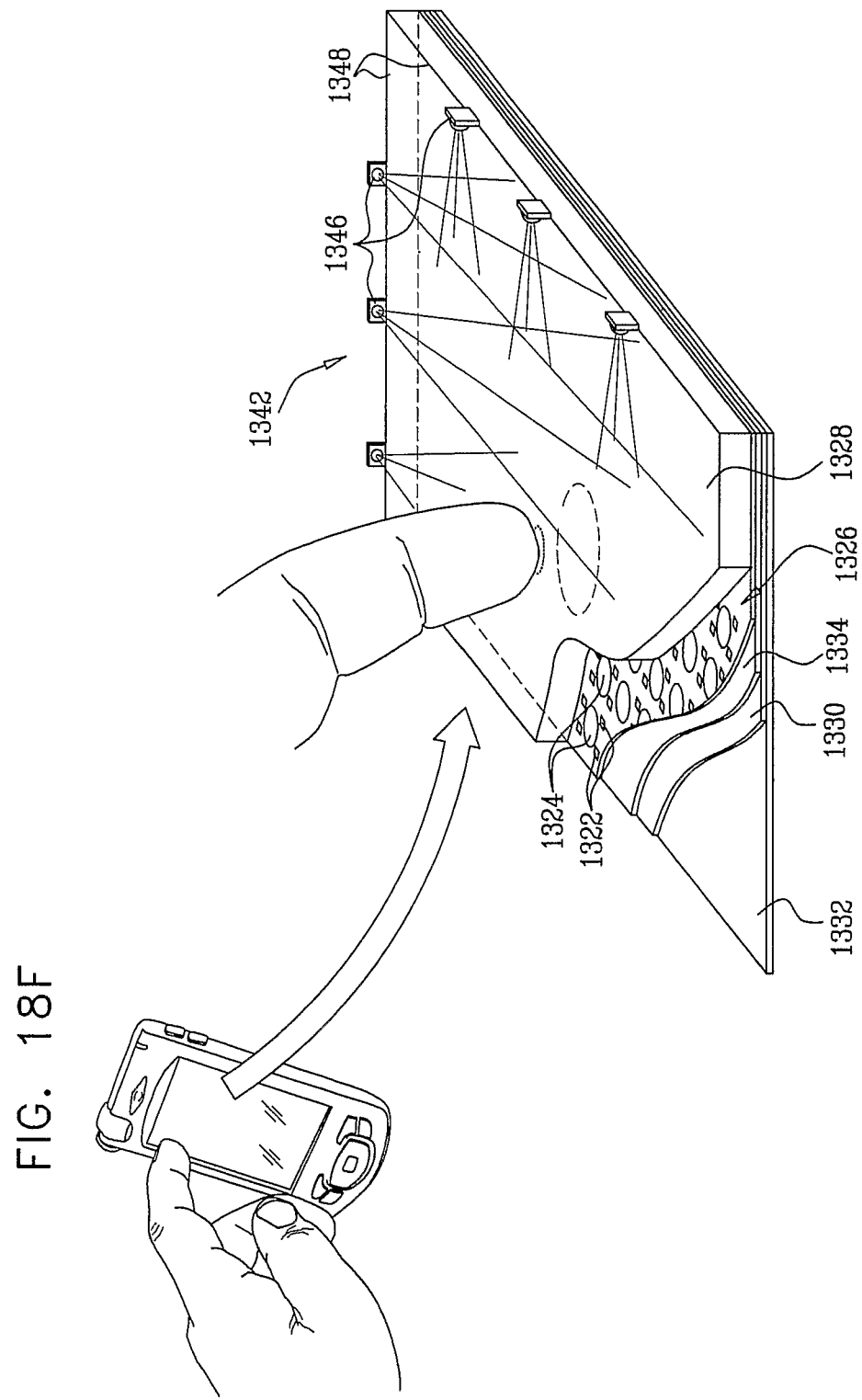

Reference is now made to FIG. 18F, which shows an integrated display and input device having touch responsive input functionality. As seen in FIG. 18F, a multiplicity of light detector elements 1322 are interspersed among light emitters 1324 arranged in a plane 1326 underlying a viewing plane defining plate 1328. Examples of such a structure are described in U.S. Pat. No. 7,034,866 and U.S. Patent Application Publication Nos. 2006/0132463A1, 2006/0007222A1 and 2004/00012565A1, the disclosures of which are hereby incorporated by reference.

Viewing plane defining plate 1328 may be a single or multiple layer plate and may have one or more coating layers associated therewith. In one example of an integrated display and input system employing light detector elements interspersed among light emitting elements, there are provided one or more light diffusing layers 1330 overlying a reflector 1332. One or more collimating layers 1334 may be interposed between reflector 1332 and the plane 1326 which includes the light detector and light emitting elements.

The integrated display and input device shown in FIG. 18F preferably includes an illumination subassembly 1342 which typically includes one or more electromagnetic radiation emitting sources. The illumination subassembly 1342 preferably provides a baseline illumination level which is typically detected by detector elements 1322.

In accordance with a preferred embodiment of the present invention, shown in FIG. 18F, a generally linear arrangement of multiple IR emitting LEDs 1346 is provided, generally in parallel with one or more of edges 1348 of plate 1328. The LEDs 1246 are arranged such that light emitted therefrom is projected generally across the surface of plate 1328. Suitable IR emitting LEDs are, for example, IR-emitting SMD-LEDs commercially available from OSA Opto Light GmbH of Berlin, Germany under catalog designator OIS-210-X-T. It is appreciated that selection of a specific shapes and sizes of LEDs 1346 may be affected by the specific placement of the LEDs 1346 relative to plane 1326 and the interaction between one or more light beams emitted from LEDs 1346 and the various components of the integrated display and input device including the plate 1328, the detector elements 1322, diffusing layers 1330, collimating layers 1334, reflecting layers 1332 and other layers of the integrated display and input device. Optionally, the light emitted by LEDs 1346 may be modulated by modulating circuitry (not shown).

Light, preferably including light in the IR band emitted by illumination subassembly 1342, is reflected from a user's finger, a stylus (not shown) or any other suitable reflective object, touching or located in propinquity to plate 1328. The reflected light is propagated through plate 1328 and is detected by one or more of detector elements 1322.

When the user's finger touches or is located in propinquity to plate 1328, the light reflected from the finger is detected by one or more of detector elements 1322, in addition to the baseline level of light detected by the detector elements 1322. Detector analyzing processing circuitry preferably receives outputs of the detector elements 1322, digitally processes these outputs and determines whether the absolute amount of light detected by each of the detector elements 1322 or the change in the amount of light detected by each of the detector elements 1322 exceeds a predetermined threshold.

The amount of light detected by the individual detector elements 1322, as determined by the detector analyzing processing circuitry, is further processed to provide an array detection output. The array detection output includes information corresponding to the location of an impingement point of the user's finger. Typically, the location of at least one detector element 1322, in which the amount of light measured or the change in the amount of light measured exceeds a predetermined threshold, corresponds to the two-dimensional location of the user's finger on or above plate 1328 and parallel to plane 1326.

In the configuration shown in FIG. 18F, optional three-dimensional location determining circuitry (not shown) may be provided to calculate the three-dimensional (X, Y, Z and/or angular orientation) position of the impingement point of the user's finger on or above plate 1328 by processing the detector element outputs of at least two detector elements to define the shape and size of an impingement area, as described in assignee's U.S. Provisional Patent Application Nos. 60/715,546; 60/734,027; 60/789,188 and 60/682,604, U.S. Patent Application Publication No. 2005/0156914A1 and PCT Patent Application Publication No. WO 2005/094176, the disclosures of which are hereby incorporated by reference.

It is appreciated that any of the configurations of the illumination subassemblies shown in the embodiments of FIGS. 18A-18F may be combined with any of the detector array configurations shown in FIGS. 1-18F.

Reference is now made to FIG. 19, which is a simplified illustration of an integrated display and input device constructed and operative in accordance with a preferred embodiment of the present invention, utilizing electromagnetic radiation from a source external to the integrated display and input device.

As seen in FIG. 19, arrays 1402 of light detector elements 1404 are arranged at least two mutually perpendicular edge surfaces 1406 of a viewing plane defining plate 1408. Alternatively, detector arrays 1402 may be provided along all or most of the edges 1406. As a further alternative, a single detector array 1402 may be provided along only one edge 1406 of the plate 1408. Viewing plane defining plate 1408 may be a single or multiple layer plate and may have one or more coating layers associated therewith.

It is to be appreciated that the phrase "at edges" is to be interpreted broadly as including structures which are located behind edges, as in the embodiments shown in FIGS. 10A-10D, 11A-11D, 15A-15D and 16A-16D, about edges as in the embodiments shown in FIGS. 9A-9D and 14A-14D, and along edges as in the embodiments shown in FIGS. 4-7, 8A-8D, 12A-12D and 13A-13D.

Suitable detector elements are, for example, Solderable Silicon Photodiodes commercially available from Advanced Photonix Incorporated of Camarillo, Calif., USA under catalog designator PDB-C601-1.

Light incident upon the viewing plate 1408, preferably including light in the IR band emitted by one or more sources of illumination external to the integrated display and input device, is propagated within plate 1408 and is detected by one or more of detector elements 1404. Alternatively or additionally, the incident light is propagated above the surface of plate 1408 and is detected by one or more of detector elements 1404, which may extend slightly above edge surfaces 1406. Furthermore, additionally or alternatively, the incident light may propagate or be transmitted through plate 1408 directly to one or more of detector elements 1404 and detected thereby. The detection of incident light by detector elements 1404 defines a baseline illumination level therefore.

Light, preferably including light in the IR band emitted by one or more sources of illumination external to the integrated display and input device, is reflected from a user's finger, a stylus (not shown) or any other suitable reflective object, touching or located in propinquity to plate 1408. The reflected light is propagated within plate 1408 and is detected by one or more of detector elements 1404. Alternatively or additionally, the reflected light is propagated above the surface of plate 1408 and is detected by one or more of detector elements 1404, which may extend slightly above edge surfaces 1406. Furthermore, additionally or alternatively, the reflected light may propagate or be transmitted through plate 1408 directly to one or more of detector elements 1404 and detected thereby.

Suitable external light sources include sunlight, artificial room lighting and IR illumination emitted from a human body or other heat source. In an alternate preferred embodiment, the quantity or intensity of the reflected light may be augmented by the addition of an illumination subassembly 1412 which typically includes one or more electromagnetic radiation emitting sources. Examples of various suitable configurations of illumination subassembly 1412 are described hereinabove with reference to FIGS. 18A-18F.

When the user's finger touches or is located in propinquity to plate 1408, the light reflected from the finger is detected by one or more of detector elements 1404, as described hereinabove, in addition to the baseline level of light detected by the detector elements 1404. Detector analyzing processing circuitry (not shown) preferably receives outputs of the detector elements 1404 on arrays 1402, digitally processes these outputs and determines whether the absolute amount of light detected by each of the detector elements 1404 or the change in the amount of light detected by each of the detector elements 1404 exceeds a predetermined threshold.

The amount of light detected by the individual detector elements 1404 on a given array 1402, as determined by the detector analyzing processing circuitry, is further processed to provide an array detection output. The array detection output includes information corresponding to the location of an impingement point of the user's finger relative to the given array 1402. Typically, the location of at least one detector element 1404, in which the amount of light measured or the change in the amount of light measured exceeds a predetermined threshold, corresponds to the location of the user's finger along an axis parallel to array 1402.

In the configuration shown in FIG. 19, two-dimensional location determining circuitry (not shown) preferably calculates the two-dimensional position of the impingement point of the user's finger on or above plate 1408 by combining the array detection outputs of at least two arrays, typically arranged along at least two mutually perpendicular edges 1406 of plate 1408.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. An integrated display and input device comprising:
 a display panel for displaying information to a user;
 a pixel array having a plurality of detectors for receiving electromagnetic radiation, each detector of the plurality of detectors operative to detect a change in the electromagnetic radiation caused by an object in propinquity to the display panel and provide an output corresponding to the change; and
 circuitry for receiving the output from each detector of the plurality of detectors, the circuitry operative to:
  determine at least one impingement point for the object relative to the pixel array corresponds to a location of at least one detector of the plurality of detectors when the output from the at least one detector indicates the change in the electromagnetic radiation exceeds a threshold;
  determine a position for the object with respect to the display panel based on the output from the at least one detector and the location of the at least one detector; and
  provide a non-imagewise input, including the position of the object, to utilization circuitry of the integrated display and input device.

2. An integrated display and input device comprising:
 a first pixel array operative to display information to a user;
 a second pixel array including detectors for receiving electromagnetic radiation, each detector operative to detect a change in the electromagnetic radiation caused by an object in propinquity to the first array and provide an output corresponding to the change; and
 circuitry for receiving the output from said each detector, the processing circuitry operative to:
  determine at least one impingement point for the object relative to the second pixel array corresponds to a location of at least one detector of the plurality of detectors when the output from the at least one detector indicates the change in the electromagnetic radiation exceeds a threshold;
  determine a position for the object with respect to the first pixel array based on the output from the at least one detector and the location of the at least one detector; and
  provide a non-imagewise input, including the position of the object, to utilization circuitry of the integrated display and input device.

3. The integrated display and input device according to claim 2 further comprising the utilization circuitry, wherein the utilization circuitry is configured to provide portable communicator functionality.

4. The integrated display and input device according to claim 2 further comprising the utilization circuitry, wherein the utilization circuitry is configured to provide interactive television functionality.

5. The integrated display and input device according to claim 2 further comprising the utilization circuitry, wherein the utilization circuitry is configured to provide portable computer functionality.

6. A position sensing assembly comprising:
 a plate defining a surface; and
 at least one pixel array comprising a plurality of detector elements, each detector element of the plurality of detector elements operative to detect a change in electromagnetic radiation relative to a baseline level, the change caused by an object in propinquity to the surface, said at least one pixel array operative to provide an output that indicates the change detected by least one detector element exceeds a predetermined threshold;
 circuitry for receiving the output from the at least one pixel array, the processing circuitry further operative to:
  determine at least one impingement point for the object relative to the pixel array corresponds to a location of the at least one detector element;
  determine a position for the object with respect to the display panel based on the output from the at least one pixel array and the location of the at least one detector element; and
  provide a non-imagewise input, including the position of the object, to utilization circuitry of the position sensing assembly.

7. The position sensing assembly according to claim 6, wherein the at least one pixel array detects the change in electromagnetic radiation caused by reflected light from the object in propinquity to the surface.

8. The position sensing assembly according to claim 7, wherein the plate is further configured to propagate the reflected light incident on the surface to one or more of the plurality of detector elements.

9. The position sensing assembly according to claim 7, wherein the least one pixel array is further configured to detect the reflected light above said surface.

10. The position sensing assembly according to claim 7, wherein the plate is further configured to transmit the reflected light through said plate directly to one or more of the plurality of detector elements.

* * * * *